(12) United States Patent  
Satoh

(10) Patent No.: US 8,902,466 B2  
(45) Date of Patent: Dec. 2, 2014

(54) COLOR MEASURING DEVICE, IMAGE FORMING APPARATUS, IMAGE FORMING METHOD, AND COMPUTER-READABLE STORAGE MEDIUM

(75) Inventor: Nobuyuki Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 62 days.

(21) Appl. No.: 13/558,648

(22) Filed: Jul. 26, 2012

(65) Prior Publication Data

US 2013/0027720 A1    Jan. 31, 2013

(30) Foreign Application Priority Data

Jul. 29, 2011  (JP) ................................. 2011-167409  
Jun. 7, 2012  (JP) ................................. 2012-130193

(51) Int. Cl.
| | | |
|---|---|---|
| H04N 1/40 | (2006.01) | |
| H04N 1/46 | (2006.01) | |
| G03F 3/08 | (2006.01) | |
| G02B 13/24 | (2006.01) | |
| H04N 1/60 | (2006.01) | |
| G02B 27/12 | (2006.01) | |
| G02B 27/10 | (2006.01) | |

(52) U.S. Cl.  
CPC ............... *H04N 1/60* (2013.01); *G02B 27/123* (2013.01); *G02B 13/24* (2013.01); *G02B 27/1066* (2013.01)  
USPC ............ 358/1.9; 358/448; 358/505; 358/518; 358/525

(58) Field of Classification Search  
None  
See application file for complete search history.

(56) References Cited

U.S. PATENT DOCUMENTS

| | | | |
|---|---|---|---|
| 6,650,438 B1 * | 11/2003 | Kress et al. ..................... | 358/1.9 |
| 2009/0128870 A1 * | 5/2009 | Yamashita et al. ............. | 358/518 |
| 2010/0134858 A1 * | 6/2010 | Minamino et al. ............. | 358/504 |
| 2010/0149567 A1 * | 6/2010 | Kanazawa et al. ............. | 358/1.9 |

FOREIGN PATENT DOCUMENTS

| | | |
|---|---|---|
| JP | 3129502 | 11/2000 |
| JP | 2002-290757 | 10/2002 |
| JP | 2003-24283 | 1/2003 |
| JP | 2009-239419 | 10/2009 |
| JP | 2012-61756 | 3/2012 |
| JP | 2012-63270 | 3/2012 |
| JP | 2012-63271 | 3/2012 |

OTHER PUBLICATIONS

U.S. Appl. No. 13/560,309, filed Jul. 27, 2012, Kobayashi, et al.

* cited by examiner

*Primary Examiner* — Fan Zhang  
*Assistant Examiner* — Haris Sabah  
(74) *Attorney, Agent, or Firm* — Oblon, Spivak, McClelland, Maier & Neustadt, L.L.P.

(57) ABSTRACT

A color measuring device include an illuminating unit configured to illuminate an image-capturing range; an image capturing unit configured to capture an image of the image-capturing range containing a patch and an object; an extracting unit configured to extract image data of a surrounding region in a predetermined color from the image data output by the image capturing unit; an interpolating unit configured to interpolate at least one target region that is at least one of regions of the patch and the object based on the image data of the surrounding region; a storage unit configured to store therein, as correction data, interporting data that is interporated; a correcting unit configured to correct the image data output by the image capturing unit by using the correction data; and a calculating unit configured to calculate a colorimetric value of the object based on the corrected image data.

6 Claims, 36 Drawing Sheets

FIG.12A $XYZ \Rightarrow Lab$ $$f_x = \begin{cases} \sqrt[3]{x_r} & x_r > 0.008856 \\ (903.3 \times x_r + 16)/116 & x_r \leq 0.008856 \end{cases}$$

$$f_y = \begin{cases} \sqrt[3]{y_r} & y_r > 0.008856 \\ (903.3 \times y_r + 16)/116 & y_r \leq 0.008856 \end{cases}$$

$$f_z = \begin{cases} \sqrt[3]{z_r} & z_r > 0.008856 \\ (903.3 \times z_r + 16)/116 & z_r \leq 0.008856 \end{cases}$$

$x_r = X/X_r$
$y_r = Y/Y_r$
$z_r = Z/Z_r$
$L = 116 \times f_y - 16$
$a = 500 \times (f_x - f_y)$
$b = 200 \times (f_y - f_z)$

FIG.12B $Lab \Rightarrow XYZ$ $$x_r = \begin{cases} f_x^3 & f_x^3 > 0.008856 \\ (116 \times f_x - 16)/903.3 & f_x^3 \leq 0.008856 \end{cases}$$

$$y_r = \begin{cases} ((L + 16)/116)^3 & L > 903.3 \times 0.008856 \\ L/903.3 & L \leq 903.3 \times 0.008856 \end{cases}$$

$$z_r = \begin{cases} f_z^3 & f_z^3 > 0.008856 \\ (116 \times f_z - 16)/903.3 & f_z^3 \leq 0.008856 \end{cases}$$

$f_x = \dfrac{a}{500} + f_y$ $$f_y = \begin{cases} (L + 16)/116 & y_r > 0.008856 \\ (903.3 \times y_r + 16)/116 & y_r \leq 0.008856 \end{cases}$$

$f_z = f_y - \dfrac{b}{200}$ $X = x_r \times X_r$
$Y = y_r \times Y_r$
$Z = z_r \times Z_r$

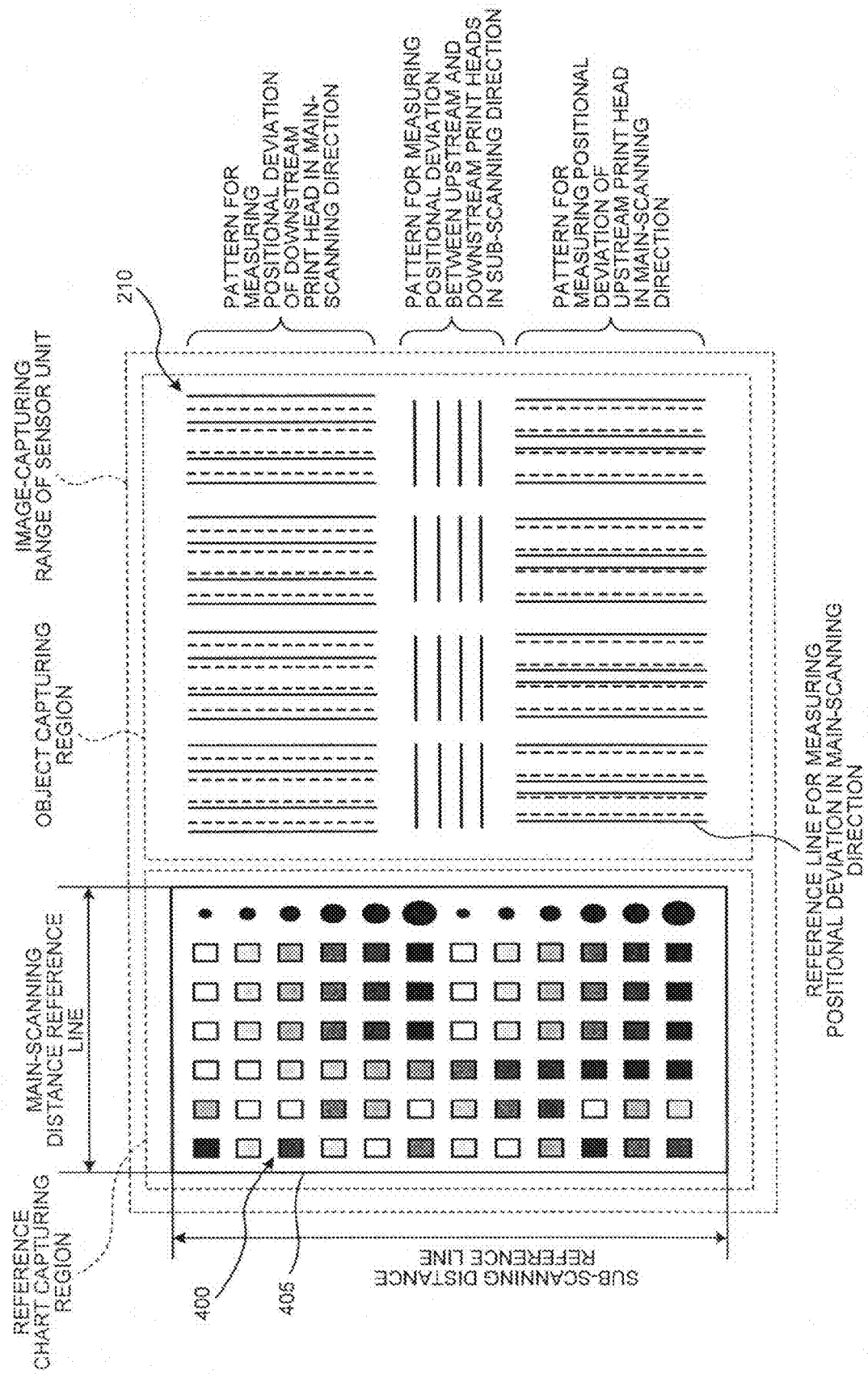

FIG.17

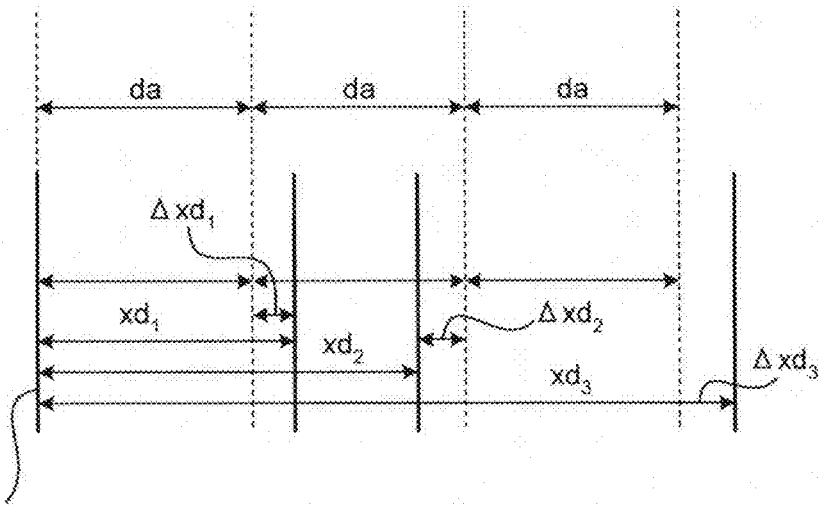

REFERENCE LINE FOR MEASURING POSITIONAL DEVIATION IN MAIN-SCANNING DIRECTION

FIG.18

FIRST BLACK VERTICAL LINE FORMED ON LEFTMOST SIDE IN MAIN-SCANNING POSITIONAL DEVIATION MEASUREMENT PATTERN FOR DOWNSTREAM PRINT HEAD

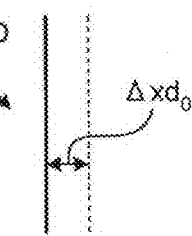

FIRST BLACK VERTICAL LINE FORMED ON LEFTMOST SIDE IN MAIN-SCANNING POSITIONAL DEVIATION MEASUREMENT PATTERN FOR UPSTREAM PRINT HEAD

REFERENCE LINE FOR MEASURING MAIN-SCANNING POSITIONAL DEVIATION

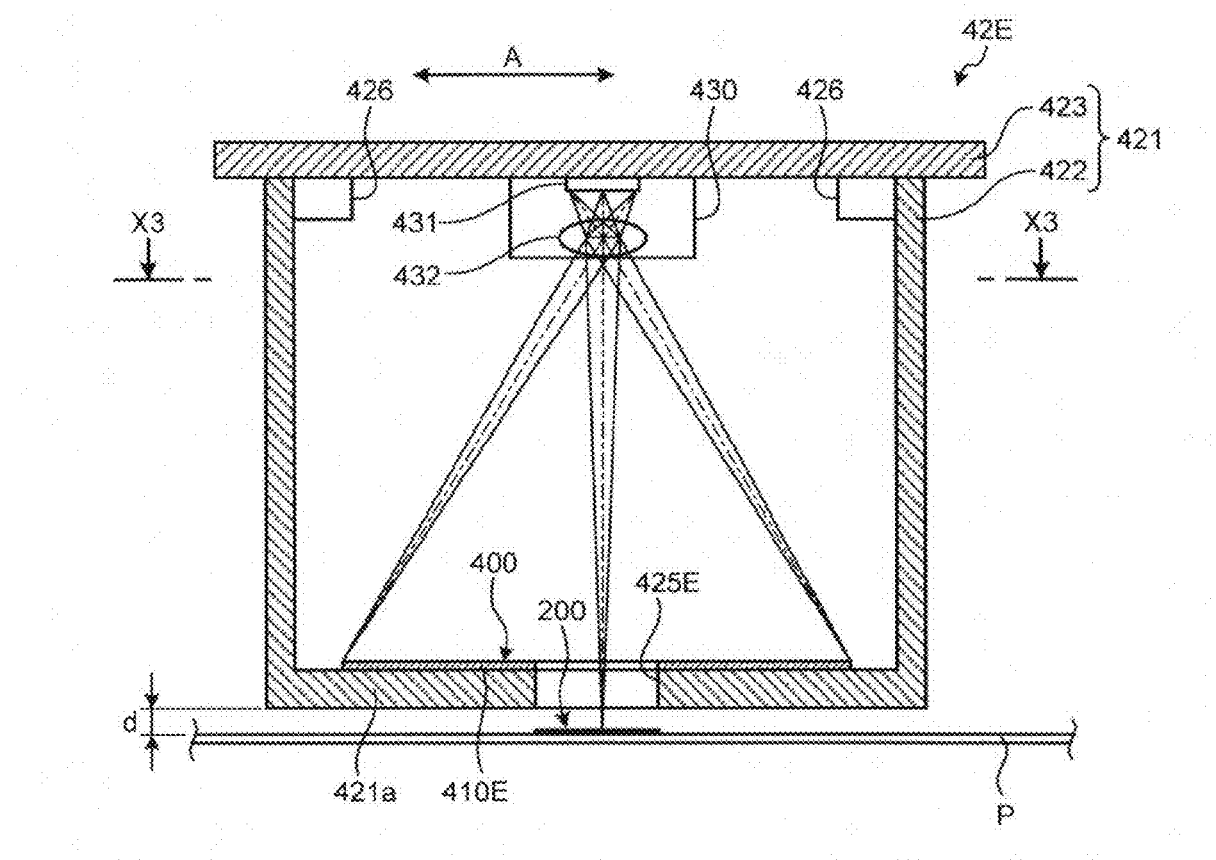

COLOR MEASURING DEVICE, IMAGE FORMING APPARATUS, IMAGE FORMING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2011-167409 filed in Japan on Jul. 29, 2011 and Japanese Patent Application No. 2012-130193 filed in Japan on Jun. 7, 2012.

BACKGROUND OF THE INVENTION

1. Field of the Invention

The present invention relates to a color measuring device, an image forming apparatus, an image forming method, and a computer-readable storage medium.

2. Description of the Related Art

Image forming apparatuses, such as printers, perform a process called color management to prevent a variation in output due to device-specific characteristics in order to improve reproducibility of output with respect to input. The color management is performed by, for example, the following manner. First, an image forming apparatus actually outputs an image of a color chart (patch) in a reference color (hereinafter, the image of the patch output by the image forming apparatus is referred to as "a patch image"), and measures colors of the patch image by using a color measuring device. Then, a color conversion parameter is generated based on a difference between a colorimetric value of the patch image (measured color value) and a color value of a corresponding reference color in the standard color space, and the color conversion parameter is set in the image forming apparatus. Thereafter, when outputting an image of input image data, the image forming apparatus performs color conversion on the input image data based on the set color conversion parameter and outputs an image based on image data obtained by the color conversion. Therefore, the image forming apparatus can output images with high reproducibility while preventing a variation in output due to device-specific characteristics.

In the color management as described above, a spectrophotometer is widely used as a color measuring device for measuring colors of a patch image. The spectrophotometer can acquire spectral reflectance per wavelength, so that it can measure colors with high accuracy. However, the spectrophotometer includes a number of sensors and is therefore expensive. Therefore, there is a need to enable colorimetry to be performed with high accuracy by a device that is reasonable in price.

As one example of a method for realizing colorimetry at low costs, there is a method to capture an image of an object to be measured (color measurement target) by an image capturing device having an image sensor and convert an RGB value of the object obtained by image capturing into a color value in the standard color space. For example, Japanese Patent No. 3129502 discloses a technology, in which a reference color chart to be compared with an object is disposed near the object being the color measurement target, images of the object and the reference color chart are simultaneously captured by a color video camera, RGB data of the object is corrected by using RGB data of the color reference chart obtained by image capturing, and the RGB data of the object is converted into a color value in the standard color space.

However, in the technology disclosed in Japanese Patent No. 3129502, it is difficult to maintain a positional relation among the object, a light source, and the color video camera, so that an image capturing condition may vary every time an image is captured. Therefore, it is sometimes impossible to measure colors with high accuracy.

Therefore, there is a need to provide a color measuring device, an image forming apparatus, an image forming method, and a computer-readable storage medium capable of measuring colors with high accuracy.

SUMMARY OF THE INVENTION

It is an object of the present invention to at least partially solve the problems in the conventional technology.

According to an embodiment, there is provided a color measuring device that includes an illuminating unit configured to illuminate an image-capturing range; an image capturing unit configured to capture an image of the image-capturing range containing a patch and an object to output image data of the image; an extracting unit configured to extract image data of a surrounding region in a predetermined color from the image data output by the image capturing unit, the surrounding region being at a periphery of at least one of the patch and the object; an interpolating unit configured to interpolate at least one target region that is at least one of regions of the patch and the object by assuming that the one of the regions is in the predetermined color, based on the image data of the surrounding region; a storage unit configured to store therein, as correction data, interporating data that is interpolated by the interpolating unit; a correcting unit configured to correct the image data output by the image capturing unit by using the correction data; and a calculating unit configured to calculate a colorimetric value of the object based on image data of the region of the patch and image data of the region of the object contained in the image data corrected by the correcting unit.

According to another embodiment, there is provided an image forming apparatus that includes an image output unit configured to output an image to a recording medium; and the color measuring device according to the above embodiment, the color measuring device being configured to perform color measurement on the image output by the image output unit.

According to still another embodiment, there is provided an image forming method that includes illuminating, by an illuminating unit of the color measurement device, an image-capturing range; capturing, by an image capturing unit of the color measurement device, an image of the image-capturing range containing a patch and an object to output image data of the image; extracting image data of a surrounding region in a predetermined color from the image data output by the image capturing unit, the surrounding region being at a periphery of at least one of the patch and the object; interpolating at least one target region that is at least one of regions of the patch and the object by assuming that the one of the regions is in the predetermined color, based on the image data of the surrounding region; storing, as correction data, interporating data that is interporated at the interporating, in a storage unit; correcting the image data output by the image capturing unit by using the correction data; and calculating a colorimetric value of the object based on image data of the region of the patch and image data of the region of the object contained in the corrected image data.

According to still another embodiment, there is provided a non-transitory computer-readable storage medium with an executable program stored thereon. The program instructs a processor of a color measurement device to perform illuminating, by an illuminating unit of the color measurement device, an image-capturing range; capturing, by an image capturing unit of the color measurement device, an image of the image-capturing range containing a patch and an object to output image data of the image; extracting image data of a surrounding region in a predetermined color from the image data output by the image capturing unit, the surrounding region being at a periphery of at least one of the patch and the object; interpolating at least one target region that is at least one of regions of the patch and the object by assuming that the one of the regions is in the predetermined color, based on the image data of the surrounding region; storing, as correction data, interporating data that is interporated at the interporating, in a storage unit; correcting the image data output by the image capturing unit by using the correction data; and calculating a colorimetric value of the object based on image data of the region of the patch and image data of the region of the object contained in the corrected image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 12A and 12B illustrate conversion equations used for conversion between an L*a*b* value and an XYZ value;

FIG. 16 is a diagram illustrating an example of image data obtained by simultaneously capturing images of the reference chart and a test pattern by the sensor unit;

FIG. 17 is a diagram for explaining a method for measuring positional deviation in an image in a main-scanning direction;

FIG. 18 is another diagram for explaining the method for measuring positional deviation in the image in the main-scanning direction;

FIG. 25A is a vertical cross-sectional view of a color measuring camera according to a fifth modification;

DETAILED DESCRIPTION OF THE PREFERRED EMBODIMENTS

Exemplary embodiments of a color measuring device, an image forming apparatus, an image forming method, and a program according to the present invention will be explained in detail below with reference to the accompanying drawings.

In the embodiments explained below, an inkjet printer is used as an example of the image forming apparatus to which the present invention is applied. However, the present invention is widely applicable to various types of image forming apparatuses that output an image to a recording medium.

Mechanical Configuration of an Image Forming Apparatus

Figure 1:
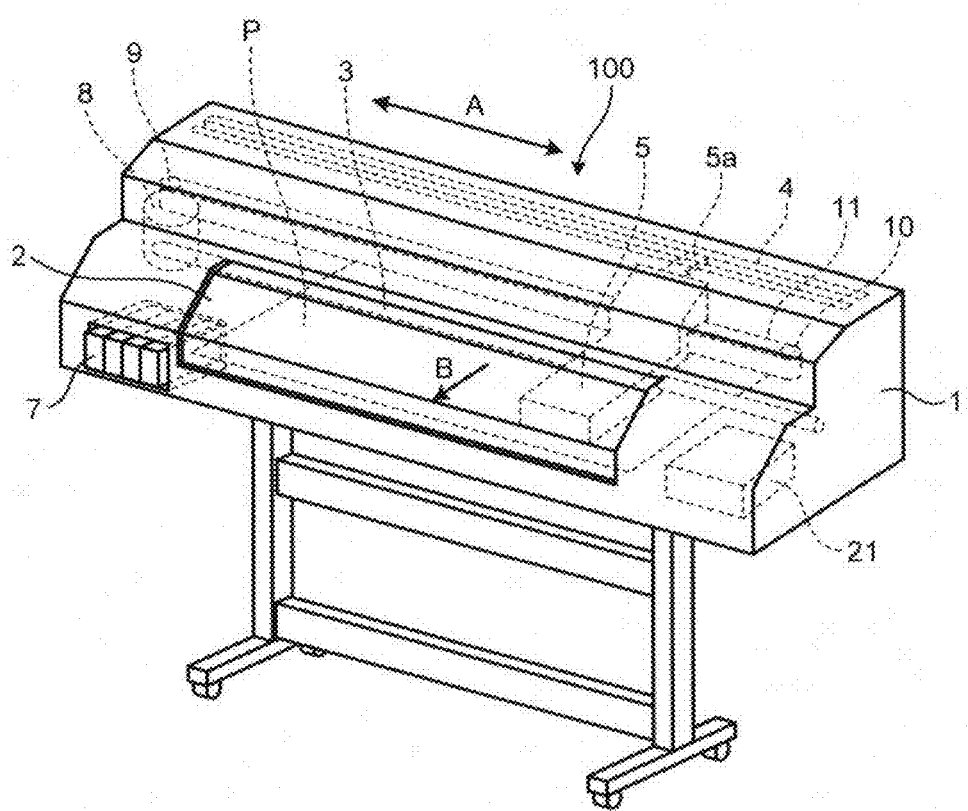
FIG. 1 is a transparent perspective view illustrating the inside of an image forming apparatus.
Figure 2:
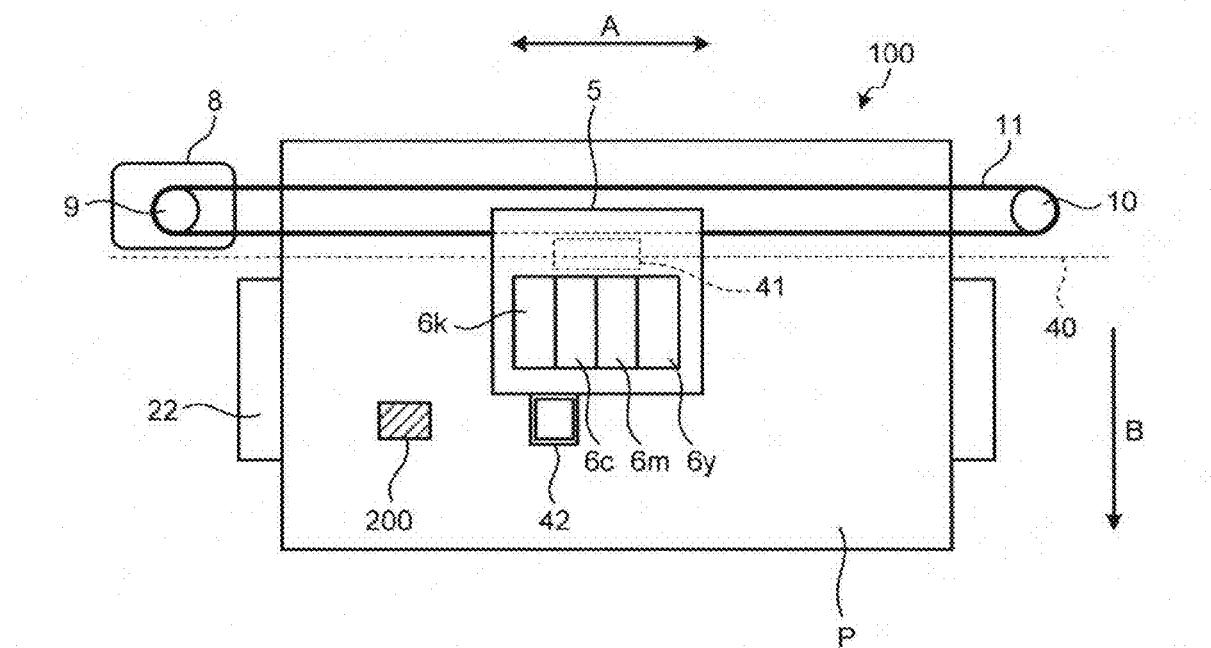
FIG. 2 is a top view of a mechanical configuration inside the image forming apparatus.
Figure 3:
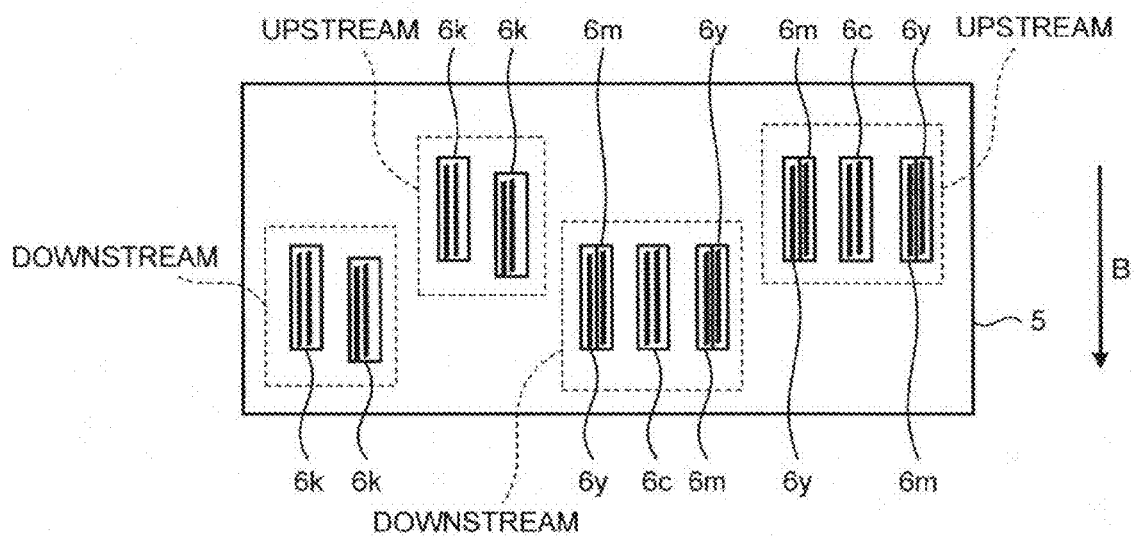
FIG. 3 is a diagram for explaining an example arrangement of print heads mounted on a carriage.

With reference to FIG. 1 to FIG. 3, a mechanical configuration of an image forming apparatus 100 according to an embodiment will be explained. FIG. 1 is a transparent perspective view illustrating the inside of the image forming apparatus 100 according to the embodiment. FIG. 2 is a top view of a mechanical configuration inside the image forming apparatus 100 according to the embodiment. FIG. 3 is a diagram for explaining an example arrangement of print heads 6 mounted on a carriage 5.

As illustrated in FIG. 1, the image forming apparatus 100 according to the embodiment includes the carriage 5 that reciprocates in a main-scanning direction (a direction of arrow A in FIG. 1) to form an image on a recording medium P that is intermittently conveyed in a sub-scanning direction (a direction of arrow B in FIG. 1). The carriage 5 is supported by a main guide rod 3 extending along the main-scanning direction. The carriage 5 includes a connection piece 5a. The connection piece 5a is engaged with a sub guide member 4 arranged parallel to the main guide rod 3 and stabilizes the posture of the carriage 5.

As illustrated in FIG. 2, the carriage 5 includes a print head 6y for ejecting yellow (Y) ink, a print head 6m for ejecting magenta (M) ink, a print head 6c for ejecting cyan (C) ink, and a plurality of print heads 6k for ejecting black (Bk) ink (hereinafter, the print heads 6y, 6m, 6c, and 6k may be collectively referred to as the print head 6). The print head 6 is mounted on the carriage 5 such that an ejection surface (nozzle surface) faces downward (toward the recording medium P).

A cartridge 7, which is an ink supplier for supplying ink to the print head 6, is not mounted on the carriage 5 but is arranged at a predetermined position in the image forming apparatus 100. The cartridge 7 and the print head 6 are connected by a pipe (not illustrated), and ink is supplied from the cartridge 7 to the print head 6 via the pipe.

The carriage 5 is connected to a timing belt 11 stretched between a driving pulley 9 and a driven pulley 10. The driving pulley 9 rotates by driving of a main-scanning motor 8. The driven pulley 10 has a mechanism for adjusting a distance between the driving pulley 9 and the driven pulley 10, and has a function to apply predetermined tension to the timing belt 11. The carriage 5 reciprocates in the main-scanning direction along with movement of the timing belt 11 caused by driving of the main-scanning motor 8. As illustrated in FIG. 2 for example, the movement of the carriage 5 in the main-scanning direction is controlled based on an encoder value that is obtained by an encoder sensor 41 mounted on the carriage 5 by detecting a mark of an encoder sheet 40.

The image forming apparatus 100 according to the embodiment further includes a maintenance mechanism 21 for maintaining reliability of the print head 6. The maintenance mechanism 21 performs cleaning and capping on the ejection surface of the print head 6 or causes the print head 6 to eject unnecessary ink.

As illustrated in FIG. 2, a platen 22 is arranged at a position opposite the ejection surface of the print head 6. The platen 22 supports the recording medium P when the print head 6 ejects ink onto the recording medium P. The image forming apparatus 100 according to the embodiment is a wide apparatus in which a moving distance of the carriage 5 in the main-scanning direction is long. Therefore, the platen 22 is formed of a plurality of plate members joined in the main-scanning direction (in a moving direction of the carriage 5). The recording medium P is nipped by conveying rollers driven by a sub-scanning motor (not illustrated) and is intermittently conveyed in the sub-scanning direction on the platen 22.

The print head 6 includes a plurality of nozzle arrays and ejects ink from the nozzle arrays onto the recording medium P conveyed on the platen 22, thereby forming an image on the recording medium P. In the embodiment, to ensure a large width of an image formed on the recording medium P in one scanning of the carriage 5, upstream print heads 6 located upstream and downstream print heads 6 located downstream are mounted on the carriage 5 as illustrated in FIG. 3. Furthermore, the print heads 6k that eject black ink are mounted on the carriage 5 twice as many as each of the print heads 6y, 6m, and 6c that eject color ink. Furthermore, the print heads 6y and 6m are arranged side by side in a manner separate from each other. This configuration is employed to maintain the order of colors to be superimposed during the reciprocation of the carriage 5 so that the order of colors is not changed between the forward movement and the backward movement. The arrangement of the print heads 6 illustrated in FIG. 3 is one example, and the arrangement of the print heads 6 is not limited to that illustrated in FIG. 3.

The above components of the image forming apparatus 100 according to the embodiment are arranged inside an exterior body 1. The exterior body 1 is provided with a cover member 2 arranged in an openable and closable manner. When maintenance is performed or a jam occurs in the image forming apparatus 100, the cover member 2 is opened to enable operations on the components arranged inside the exterior body 1.

The image forming apparatus 100 according to the embodiment intermittently conveys the recording medium P in the sub-scanning direction, and while the conveyance of the recording medium P in the sub-scanning direction is stopped, moves the carriage 5 in the main-scanning direction to eject ink from the nozzle arrays of the print head 6 mounted on the carriage 5 onto the recording medium P placed on the platen 22, thereby forming an image on the recording medium P.

In particular, when calibration is performed to adjust output characteristics of the image forming apparatus 100, the image forming apparatus 100 ejects ink from the nozzle arrays of the print head 6 mounted on the carriage 5 onto the recording medium P placed on the platen 22 to form a patch image 200 to be a color measurement target on the recording medium P. The patch image 200 is an image that the image forming apparatus 100 obtains by outputting a patch in a reference color and that reflects the output characteristics of the image forming apparatus 100. Therefore, the image forming apparatus 100 can output an image with high reproducibility by generating a color conversion parameter based on a difference between a colorimetric value of the patch image 200 and a color value of a corresponding reference color in the standard color space and by outputting an image based on image data on which color conversion is performed using the color conversion parameter.

The image forming apparatus 100 according to the embodiment includes a color measuring device for performing color measurement on the patch image 200 output to the recording medium P. The color measuring device includes a color measuring camera 42, for which the patch image 200 being the color measurement target formed on the recording medium P by the image forming apparatus 100 is determined as an object and which simultaneously captures images of the patch image 200 and a reference chart 400 to be described later. The color measuring device calculates a colorimetric value of the patch image 200 based on image data of the patch image 200 and the reference chart 400 obtained by image capturing by the color measuring camera 42. The color measuring device has a function to calculate the amount of positional deviation in an image output by the image forming apparatus 100 by using the image data obtained by image capturing by the color measuring camera 42, in addition to the function to calculate the colorimetric value of the patch image 200.

As illustrated in FIG. 2, the color measuring camera 42 is fixed to the carriage 5 and reciprocates in the main-scanning direction together with the carriage 5. The color measuring camera 42 determines an image formed on the recording medium P as an object (the patch image 200 as a color measurement target when color measurement is performed on the patch image 200), and when moving to a position opposite the object, simultaneously captures images of the object and the reference chart 400 to be a comparison target. The simultaneous capturing means that image data of one frame containing the object and the reference chart 400 is acquired. That is, even if a time lag in data acquisition occurs between pixels, images of the object and the reference chart 400 are considered to be captured simultaneously as long as image data containing the object and the reference chart 400 in one frame is acquired.

Specific Example of the Color Measuring Camera

Figure 4A:
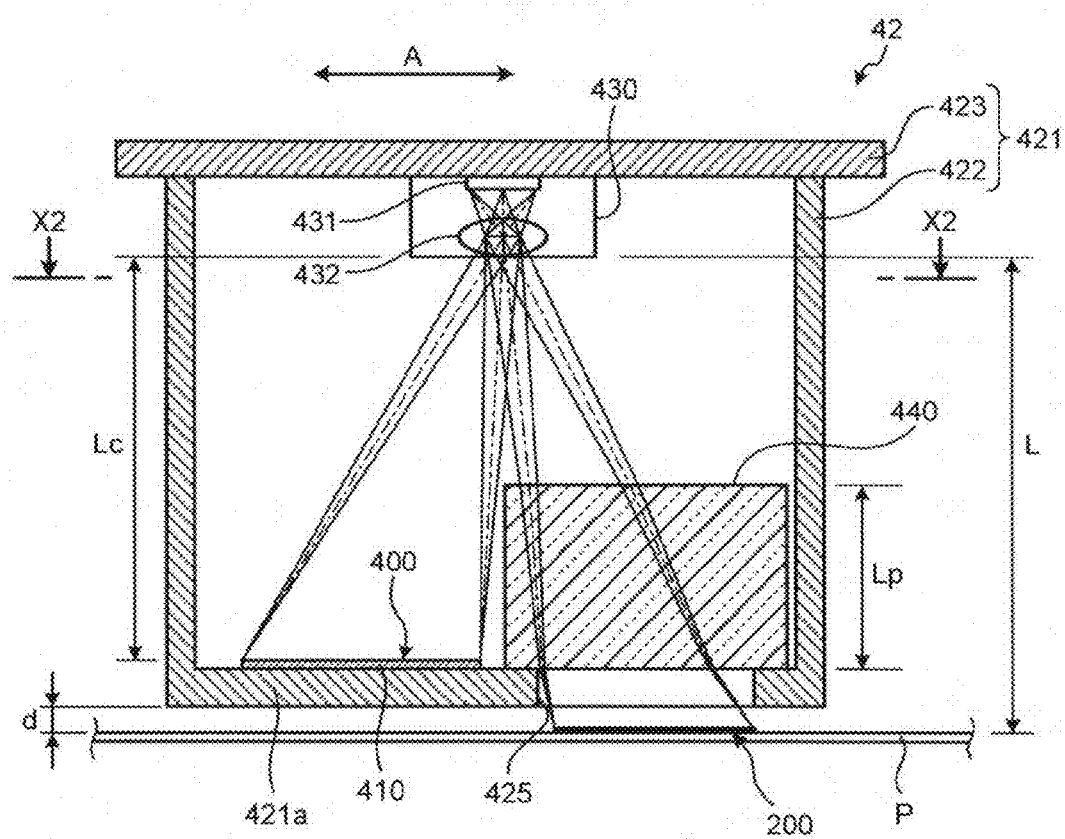
FIG. 4A is a vertical cross-sectional view of a color measuring camera (a cross-sectional view taken along line X1-X1 in FIG. 4B)
Figure 4B:
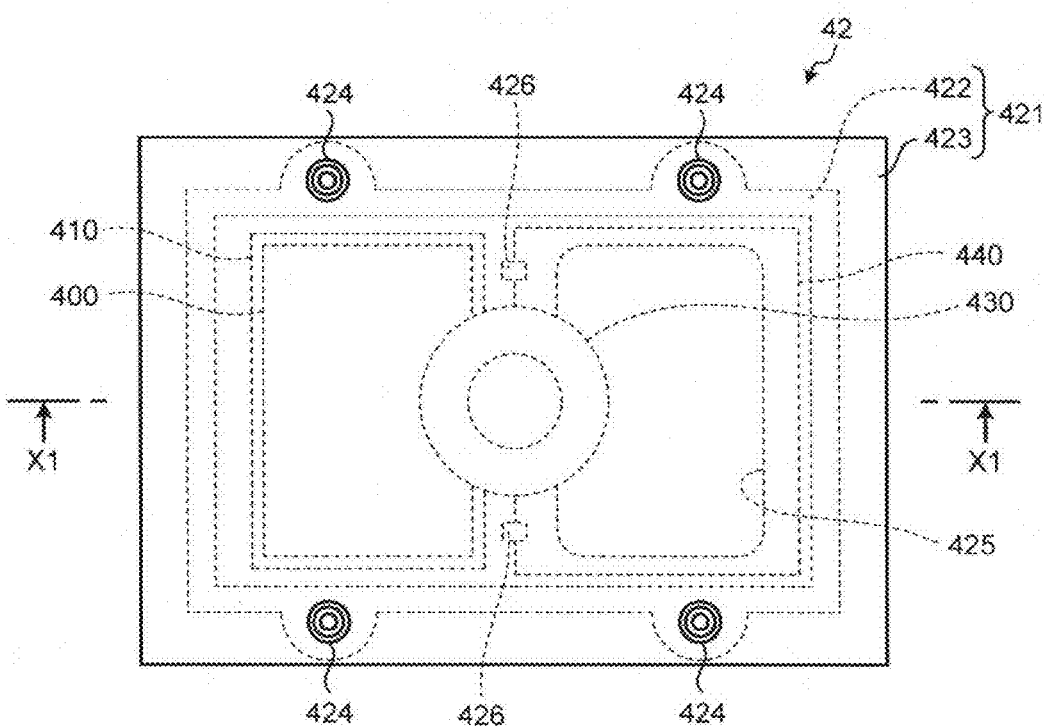
FIG. 4B is a transparent top view of the inside of the color measuring camera.
Figure 4C:
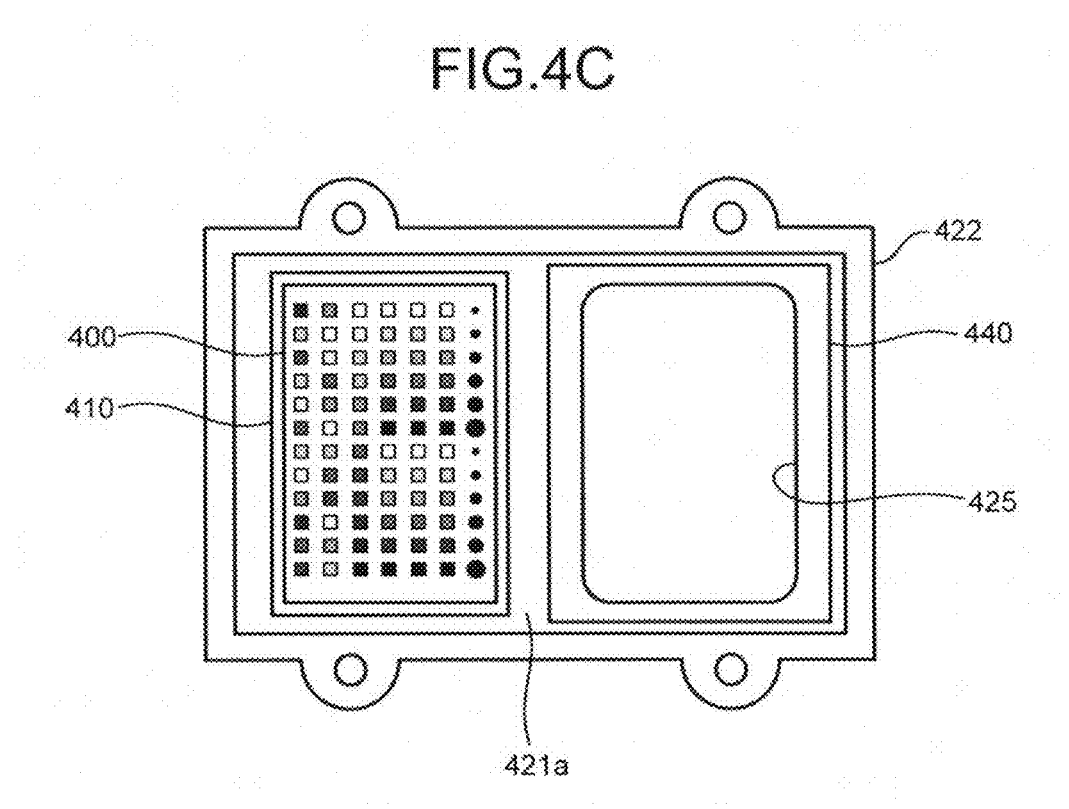
FIG. 4C is a plan view of a bottom surface of a housing viewed in X2 direction in FIG. 4A.

With reference to FIG. 4A to FIG. 4C, a specific example of the color measuring camera 42 will be explained in detail below. FIG. 4A to FIG. 4C are diagrams illustrating a specific example of the color measuring camera 42. FIG. 4A is a vertical cross-sectional view of the color measuring camera 42 (a cross-sectional view taken along line X1-X1 in FIG. 4B). FIG. 4B is a transparent top view illustrating the inside of the color measuring camera 42. FIG. 4C is a plan view of a bottom surface of a housing viewed in X2 direction in FIG. 4A.

The color measuring camera 42 includes a housing 421 formed by combining a frame body 422 and a base plate 423. The frame body 422 is formed in a tube shape with a bottom, in which one end side serving as an upper surface of the housing 421 is opened. The base plate 423 is fastened to the frame body 422 by fastening members 424 so as to close the open end of the frame body 422 to serve as the upper surface of the housing 421, and is integrated with the frame body 422.

The housing 421 is fixed to the carriage 5 such that a bottom surface 421a is located opposite the recording medium P on the platen 22 with a predetermined gap d. The bottom surface 421a of the housing 421 opposite the recording medium P has an opening 425 that enables an image of the object (the patch image 200) formed on the recording medium P to be captured from the inside of the housing 421.

A sensor unit 430 that captures an image is disposed inside the housing 421. The sensor unit 430 includes a two-dimensional image sensor 431, such as a charge-coupled device (CCD) sensor or a complementary metal oxide semiconductor (CMOS) sensor, and an imaging lens 432 that focuses an optical image in an image-capturing range of the sensor unit 430 onto a sensor surface of the two-dimensional image sensor 431. The two-dimensional image sensor 431 is mounted on, for example, the inner surface (a component mounting surface) of the base plate 423 such that the sensor surface faces the bottom surface 421a of the housing 421. The imaging lens 432 is fixed so as to be positioned with respect to the two-dimensional image sensor 431 and so that the positional relation determined based on the optical characteristics thereof can be maintained.

On the inner side of the bottom surface 421a of the housing 421 opposite the sensor unit 430, a chart plate 410, on which the reference chart 400 is formed, is disposed adjacent to the opening 425 provided on the bottom surface 421a. The chart plate 410 is bonded to the inner side of the bottom surface 421a of the housing 421 with an adhesive material or the like such that the surface opposite the surface on which the reference chart 400 is formed is used as a bonding surface, and is fixed to the housing 421. An image of the reference chart 400 is captured by the sensor unit 430 as a target to be compared with the object (the patch image 200), together with an image of the object (the patch image 200). That is, the sensor unit 430 captures an image of the object (the patch image 200) disposed outside the housing 421 via the opening 425 provided on the bottom surface 421a of the housing 421, and simultaneously captures an image of the reference chart 400 on the chart plate 410 disposed on the inner side of the bottom surface 421a of the housing 421. The reference chart 400 will be described in detail later.

The housing 421 also houses an optical-path-length changing member 440. The optical-path-length changing member 440 is an optical element having a refractive index n (n is an arbitrary number) for transmitting light. The optical-path-length changing member 440 is disposed in an optical path between the object (the patch image 200) disposed outside the housing 421 and the sensor unit 430, and has a function to bring the focal plane of an optical image of the object (the patch image 200) closer to the focal plane of an optical image of the reference chart 400. That is, in the color measuring camera 42 of the embodiment, the optical-path-length changing member 440 is disposed in the optical path between the object (the patch image 200) and the sensor unit 430 such that both the focal plane of the optical image of the object (the patch image 200) disposed outside the housing 421 and the focal plane of the reference chart 400 located inside the housing 421 coincide with the sensor surface of the two-dimensional image sensor 431 of the sensor unit 430. In FIG. 4A, an example is illustrated in which the optical-path-length changing member 440 is mounted on the bottom surface 421a of the housing 421. However, the optical-path-length changing member 440 is not necessarily mounted on the bottom surface 421a. It is sufficient that the optical-path-length changing member 440 is disposed in the optical path between the object (the patch image 200) disposed outside the housing 421 and the sensor unit 430.

When light passes through the optical-path-length changing member 440, the optical path length of the light is extended according to the refractive index n of the optical-path-length changing member 440. Consequently, an image appears such that the image is floating. The floating amount C of the image is obtained by Equation below:

$$C=Lp(1-1/n)$$

where Lp denotes the length of the optical-path-length changing member 440 in the optical axis direction.

A distance L between a principal point of the imaging lens 432 of the sensor unit 430 and a front focal plane (imaging plane) of an optical image that passes through the optical-path-length changing member 440 is obtained by Equation below:

$$L=Lc+Lp(1-1/n)$$

where Lc denotes a distance between the principal point of the imaging lens 432 and the reference chart 400.

When the refractive index n of the optical-path-length changing member 440 is set to 1.5, L=Lc+Lp/3, so that the optical path length of the optical image that passes through the optical-path-length changing member 440 can be extended by about one third of the length Lp of the opticalpath-length changing member 440 in the optical axis direction. In this case, when, for example, Lp=9 (mm), L=Lc+3 (mm). Therefore, when imaging is performed such that a difference between the distance from the sensor unit 430 to the reference chart 400 and the distance from the sensor unit 430 to the object (the patch image 200) becomes 3 mm, it becomes possible to coincide both the rear focal plane (imaging plane) of the optical image of the reference chart 400 and the rear focal plane (imaging plane) of the optical image of the object (the patch image 200) with the sensor surface of the two-dimensional image sensor 431 of the sensor unit 430.

The housing 421 also houses an illumination light source 426 that illuminates the object (the patch image 200) and the reference chart 400 when the sensor unit 430 simultaneously captures images of the object (the patch image 200) and the reference chart 400. As the illumination light source 426, for example, a light-emitting diode (LED) is used. In the embodiment, two LEDs are used as the illumination light sources 426. The two LEDs used as the illumination light sources 426 are mounted on, for example, the inner surface of the base plate 423 together with the two-dimensional image sensor 431 of the sensor unit 430. However, the illumination light sources 426 are not necessarily mounted on the base plate 423 directly as long as they are disposed at positions at which they can illuminate the object (the patch image 200) and the reference chart 400.

In the embodiment, as illustrated in FIG. 4B, the two LEDs used as the illumination light sources 426 are disposed such that the projected positions of the two LEDs on the bottom surface 421a vertically viewed from the base plate 423 side are within a region between the opening 425 and the reference chart 400 and such that the projected positions are symmetrically arranged with respect to the sensor unit 430. In other words, a line connecting the two LEDs used as the illumination light sources 426 passes through the center of the imaging lens 432 of the sensor unit 430, and the opening 425 and the reference chart 400 provided on the bottom surface 421a of the housing 421 are located at line-symmetric positions with respect to the line connecting the two LEDs. By arranging the two LEDs used as the illumination light sources 426 in this manner, it is possible to illuminate the object (the patch image 200) and the reference chart 400 under approximately the same conditions.

Meanwhile, to illuminate the object (the patch image 200) disposed outside the housing 421 under the same illumination conditions as those for the reference chart 400 located inside the housing 421, it is necessary to illuminate the object (the patch image 200) with only illumination light from the illumination light sources 426 by preventing the object (the patch image 200) from being irradiated with external light when the sensor unit 430 captures images. To prevent the object (the patch image 200) from being irradiated with external light, it is effective to reduce a gap d between the bottom surface 421a of the housing 421 and the recording medium P so that the housing 421 can block the external light coming toward the object (the patch image 200). However, if the gap d between the bottom surface 421a of the housing 421 and the recording medium P is too short, the recording medium P may come into contact with the bottom surface 421a of the housing 421 and the images cannot be captured appropriately. Therefore, in consideration of the flatness of the recording medium P, it is desirable to set the gap d between the bottom surface 421a of the housing 421 and the recording medium P to a small value within a range where the recording medium P does not come into contact with the bottom surface 421a of the housing 421. For example, when the gap d between the bottom surface 421a of the housing 421 and the recording medium P is set to about 1 mm to 2 mm, it is possible to effectively prevent the object (the patch image 200) formed on the recording medium P from being irradiated with external light while preventing the recording medium P from coming into contact with the bottom surface 421a of the housing 421.

To appropriately apply illumination light from the illumination light sources 426 to the object (the patch image 200), it is desirable to set the size of the opening 425 provided on the bottom surface 421a of the housing 421 to be greater than the object (the patch image 200) so that a shadow generated by an edge of the opening 425 blocking the illumination light is not projected on in the image of the object (the patch image 200).

Specific Example of the Reference Chart

Figure 5:
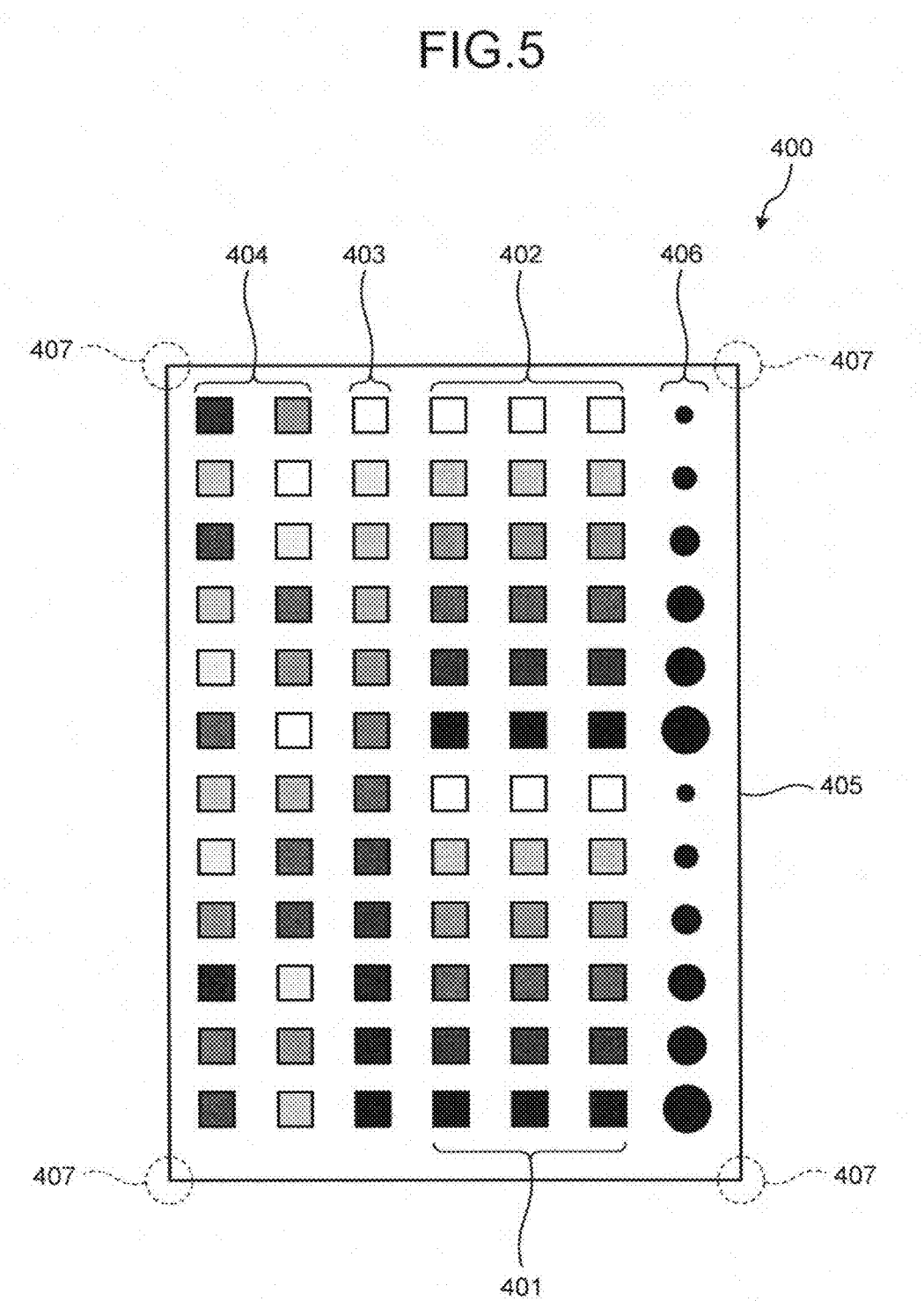
FIG. 5 is a diagram illustrating a specific example of a reference chart.

With reference to FIG. 5, the reference chart 400 on the chart plate 410 disposed inside the housing 421 of the color measuring camera 42 will be explained in detail below. FIG. 5 is a diagram illustrating a specific example of the reference chart 400.

The reference chart 400 illustrated in FIG. 5 includes a plurality of reference patch arrays 401 to 404 in which patches for color measurement are arranged, a dot-diameter measurement pattern array 406, a distance measurement line 405, and chart position specification markers 407. A region of the reference chart 400 excluding the patches contained in the reference patch arrays 401 to 404, patterns contained in the dot-diameter measurement pattern array 406, and the distance measurement line 405 is a background region in a predetermined color as a background of these arrays and line. In the embodiment, the background region of the reference chart 400 is colored in white that is a high-luminance achromatic color. The background region may be colored in a chromatic color or gray as long as it is uniform colored.

The reference patch arrays 401 to 404 include the patch array 401 in which patches in primary colors of YMC are arranged in order of scale, the patch array 402 in which patches of secondary colors of RGB are arranged in order of scale, the patch array (achromatic gradation pattern) 403 in which patches of a gray scale are arranged in order of scale, and the patch array 404 in which patches in a tertiary color are arranged. The dot-diameter measurement pattern array 406 is a pattern array, in which circular patterns with different sizes are arranged in order of size and which is used for measuring a geometric shape.

The distance measurement line 405 is formed as a rectangular frame surrounding the reference patch arrays 401 to 404 and the dot-diameter measurement pattern array 406. The chart position specification markers 407 are arranged at positions of four corners of the distance measurement line 405 and are used for specifying the position of each of the patches. By specifying the distance measurement line 405 and the chart position specification markers 407 at the four corners based from the image data of the reference chart 400 obtained by the color measuring camera 42, the position of the reference chart 400 and the position of each of the patterns can be specified.

Each of the patches in the reference patch arrays 401 to 404 for color measurement is used as a reference of colors in which imaging conditions of the color measuring camera 42 for performing imaging are reflected.

The configuration of the reference patch arrays 401 to 404 in the reference chart 400 for color measurement is not limited to the example arrangement illustrated in FIG. 5. Alternatively, arbitrary patch arrays may be applied. For example, it may be possible to use patches that can specify the widest possible color range. Alternatively, the patch array 401 in the primary colors of YMCK and the patch array 403 of a gray scale may be formed of patches having colorimetric values of the ink used in the image forming apparatus 100. Furthermore, the patch array 402 in the secondary colors of RGB in the reference chart 400 may be formed of patches having colorimetric values that can be produced by the ink used in the image forming apparatus 100. Moreover, a standard color chart that specifies colorimetric values, such as Japan Color, may be used.

Figure 6:
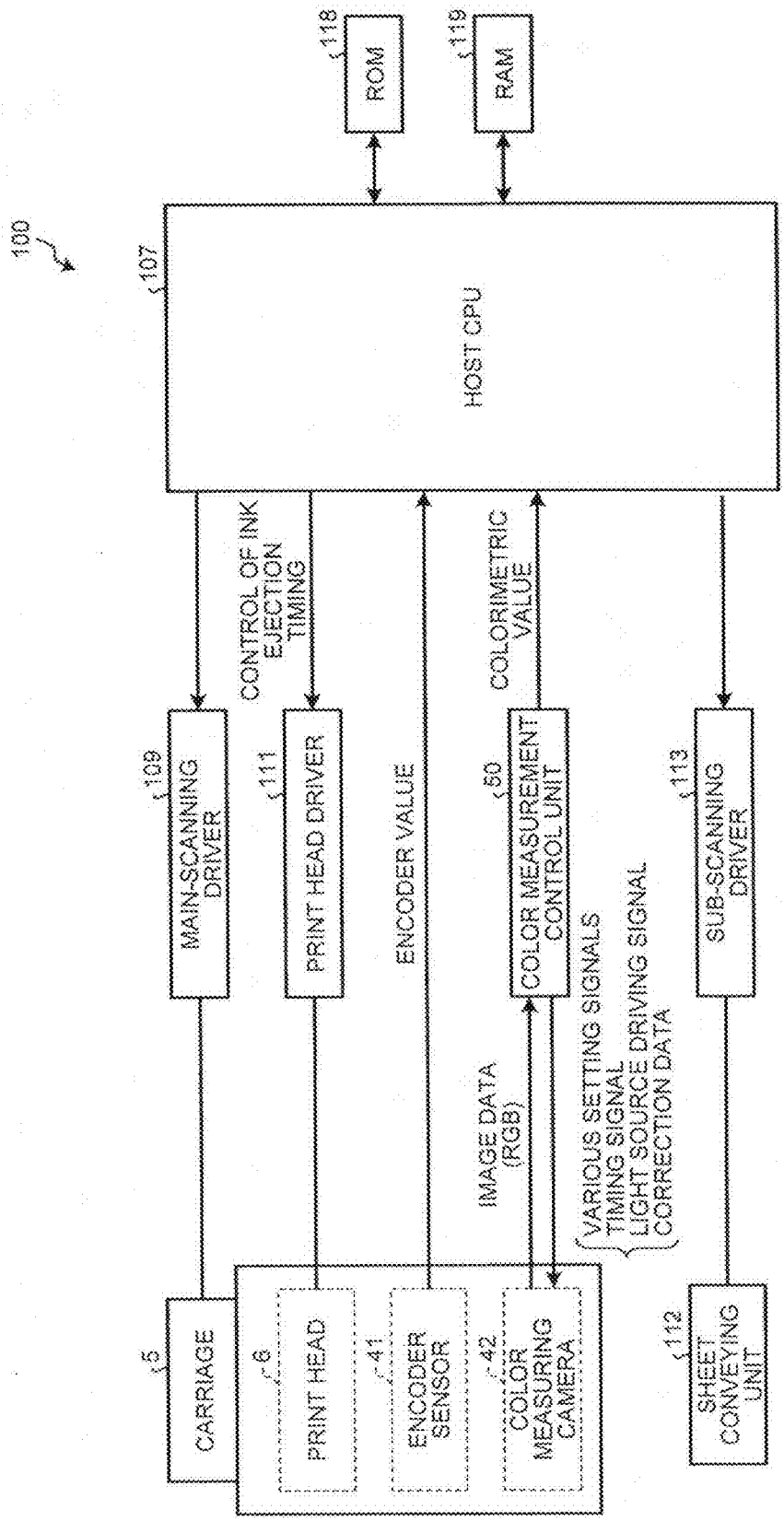
FIG. 6 is a block diagram of an overall configuration of a control mechanism of the image forming apparatus.

The reference chart 400 is disposed on the bottom surface 421a of the housing 421 of the color measuring camera 42 so as to be adjacent to the opening 425. Therefore, the sensor unit 430 can simultaneously capture an image of the reference chart 400 and an image of an object, such as the patch image 200. Overall configuration of a control mechanism of the image forming apparatus With reference to FIG. 6, an overall configuration of a control mechanism of the image forming apparatus 100 according to the embodiment will be explained. FIG. 6 is a block diagram of the overall configuration of the control mechanism of the image forming apparatus 100.

The control mechanism of the image forming apparatus 100 according to the embodiment includes a host CPU 107, a read-only memory (ROM) 118, a random access memory (RAM) 119, a main-scanning driver 109, a print head driver 111, a color measurement control unit 50, a sheet conveying unit 112, a sub-scanning driver 113, the print head 6, the encoder sensor 41, and the color measuring camera 42. The print head 6, the encoder sensor 41, and the color measuring camera 42 are mounted on the carriage 5 as described above.

The host CPU 107 supplies data of an image to be formed on the recording medium P and a drive control signal (pulse signal) to each of the drivers and controls the entire image forming apparatus 100. Specifically, the host CPU 107 controls drive of the carriage 5 in the main-scanning direction via the main-scanning driver 109. The host CPU 107 controls ink ejection timing of the print head 6 via the print head driver 111. The host CPU 107 controls drive of the sheet conveying unit 112 including a conveying roller and a sub-scanning motor via the sub-scanning driver 113.

The encoder sensor 41 outputs an encoder value that is obtained by detecting a mark on the encoder sheet 40 to the host CPU 107. Based on the encoder value obtained from the encoder sensor 41, the host CPU 107 controls drive of the carriage 5 in the main-scanning direction via the main-scanning driver 109.

As described above, the color measuring camera 42 simultaneously captures an image of the reference chart 400 disposed inside the housing 421 and an image of the patch image 200 formed on the recording medium P by using the sensor unit 430, and thereafter outputs image data of the reference chart 400 and image data of the patch image 200 to the color measurement control unit 50.

The color measurement control unit 50 calculates the colorimetric value of the patch image 200 (color value in the standard color space) based on the image data of the reference chart 400 and the image data of the patch image 200 acquired from the color measuring camera 42. The colorimetric value of the patch image 200 calculated by the color measurement control unit 50 is sent to the host CPU 107. The color measurement control unit 50 and the color measuring camera 42 form the color measuring device according to the embodiment.

The color measurement control unit 50 supplies various setting signals, a timing signal, a light source driving signal, and the like to the color measuring camera 42, and controls imaging performed by the color measuring camera 42. Examples of the various setting signals include a signal for setting an operation mode of the sensor unit 430 and a signal for setting an image capturing condition, such as a shutter speed or gain in automatic gain control (AGC). The color measurement control unit 50 acquires the setting signals from the host CPU 107 and supplies the signals to the color measuring camera 42. The timing signal is a signal for controlling timing of imaging performed by the sensor unit 430. The light source driving signal is a signal for controlling drive of the illumination light sources 426 that illuminates an image-capturing range of the sensor unit 430. The color measurement control unit 50 generates the timing signal and the light source driving signal and supplies the signals to the color measuring camera 42.

The color measurement control unit 50 generates correction data used for shading correction performed by the color measuring camera 42 (a process for correcting the influence of illuminance unevenness of illumination provided by the illumination light sources 426) and sends the correction data to the color measuring camera 42. Detailed configurations of the color measurement control unit 50 and the color measuring camera 42 will be explained later.

The ROM 118 stores therein, for example, a program containing a processing procedure or the like to be executed by the host CPU 107, various types of control data, and the like. The RAM 119 is used as a working memory of the host CPU 107.

Configuration of the Control Mechanism of the Color Measuring Device

Figure 7:
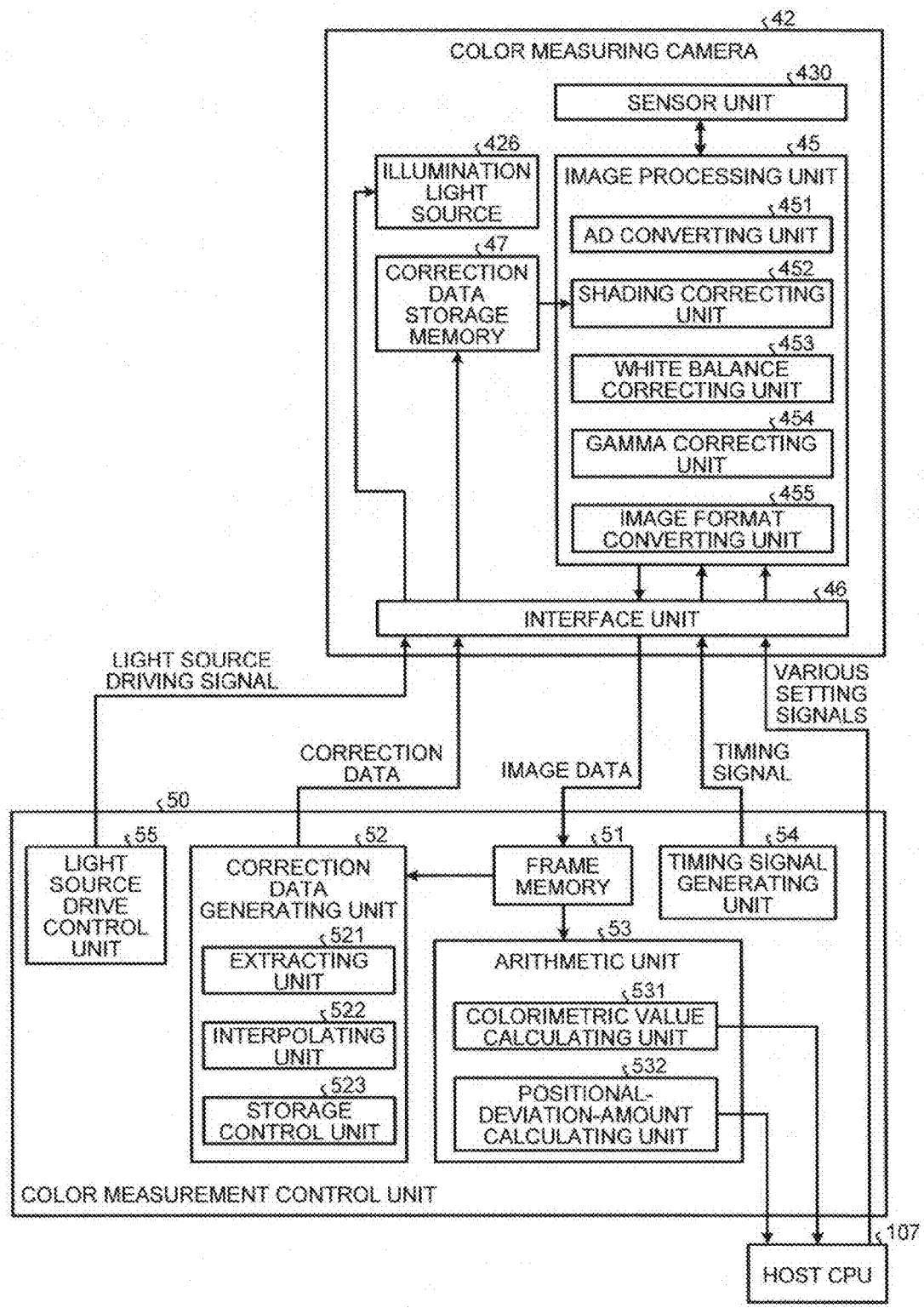
FIG. 7 is a block diagram of an example configuration of a control mechanism of a color measuring device.

With reference to FIG. 7, the control mechanism of the color measuring device according to the embodiment will be explained in detail below. FIG. 7 is a block diagram of a configuration example of the control mechanism of the color measuring device according to the embodiment.

The color measuring device according to the embodiment includes the color measuring camera 42 and the color measurement control unit 50. The color measuring camera 42 includes an image processing unit 45, an interface unit 46, a correction data storage memory 47 in addition to the sensor unit 430 and the illumination light sources 426 described above.

The image processing unit 45 processes image data of an image captured by the sensor unit 430, and includes an analog-to-digital (AD) converting unit 451, a shading correcting unit 452, a white balance correcting unit 453, a gamma correcting unit 454, and an image format converting unit 455.

The AD converting unit 451 converts an analog signal output by the sensor unit 430 to a digital signal.

The shading correcting unit 452 corrects an error in the image data caused by the illuminance unevenness in the illumination provided by the illumination light sources 426 with respect to the image-capturing range of the sensor unit 430, based on the correction data stored in the correction data storage memory 47.

The white balance correcting unit 453 corrects the white balance of the image data.

The gamma correcting unit 454 corrects the image data to compensate for the linearity in the sensitivity of the sensor unit 430.

The image format converting unit 455 converts the image data into a desired format.

The interface unit 46 is an interface by which the color measuring camera 42 acquires the various types of setting signals, the timing signal, the light-source control signal, and the correction data sent by the color measurement control unit 50, and by which the color measuring camera 42 sends the image data to the color measurement control unit 50.

The correction data storage memory 47 is a memory for storing the correction data acquired from the color measurement control unit 50 via the interface unit 46. The correction data stored in the correction data storage memory 47 is used by the shading correcting unit 452 for correcting an error in the image data caused by the illuminance unevenness in the illumination provided by the illumination light sources 426 as described above.

The color measurement control unit 50 includes a frame memory 51, a correction data generating unit 52, an arithmetic unit 53, a timing signal generating unit 54, and a light source drive control unit 55.

The frame memory 51 is a memory for temporarily storing the image data sent by the color measuring camera 42.

The correction data generating unit 52 generates the correction data to be stored in the correction data storage memory 47 of the color measuring camera 42. The correction data generating unit 52 includes, for example, a processor, such as a CPU, and causes the processor to execute a predetermined program to realize functional configurations of an extracting unit 521, an interpolating unit 522, and a storage control unit 523. In the embodiment, the extracting unit 521, the interpolating unit 522, and the storage control unit 523 of the correction data generating unit 52 are realized by software; however, a part or whole of the functional configurations may be realized by a dedicated hardware, such as an application specific integrated circuit (ASIC) or a field-programmable gate array (FPGA).

The extracting unit 521 extracts image data of a surrounding region, which is a region surrounding at least one of the patches arranged in the reference chart 400 and the object captured via the opening 425 and which is in a predetermined color (for example, white as a high-luminance achromatic color), from the image data output by the sensor unit 430 of the color measuring camera 42.

The interpolating unit 522 assumes that a region, in which image data has not been extracted by the extracting unit 521 (i.e., at least one of a patch region and an object region), is in the predetermined color (for example, white as a high-luminance achromatic color) and interpolates image data of the region based on the image data of the surrounding region extracted by the extracting unit 521.

The storage control unit 523 stores, as the correction data, data obtained by interporating the image data of at least one of the patch region and the object region based on the image data of the surrounding region by the interpolating unit 522 in the correction data storage memory 47 of the color measuring camera 42. A specific example of a process performed by the correction data generating unit 52 will be described in detail later.

The arithmetic unit 53 includes a colorimetric value calculating unit 531 and a positional-deviation-amount calculating unit 532.

The colorimetric value calculating unit 531 calculates, when the sensor unit 430 of the color measuring camera 42 simultaneously captures images of the reference chart 400 disposed inside the housing 421 and the patch image 200 being a color measurement target, the colorimetric value of the patch image 200 based on the image data of the patch image 200 and the image data of the reference chart 400 obtained by the image capturing. The colorimetric value of the patch image 200 calculated by the colorimetric value calculating unit 531 is sent to the host CPU 107. A specific example of a process performed by the colorimetric value calculating unit 531 will be described in detail later.

The positional-deviation-amount calculating unit 532 calculates, when the image forming apparatus 100 according to the embodiment outputs a predetermined image for measuring positional deviation to the recording medium P and when the sensor unit 430 of the color measuring camera 42 simultaneously captures the image of the reference chart 400 disposed inside the housing 421 and the image for measuring positional deviation output by the image forming apparatus 100, the amount of positional deviation in the image output by the image forming apparatus 100 based on the image data of the image for measuring positional deviation and the image data of the reference chart 400 obtained by the image capturing. The amount of positional deviation in the image calculated by the positional-deviation-amount calculating unit 532 is sent to the host CPU 107. A specific example of a process performed by the positional-deviation-amount calculating unit 532 will be described in detail later.

The timing signal generating unit 54 generates a timing signal for controlling timing at which the sensor unit 430 of the color measuring camera 42 performs imaging, and supplies the timing signal to the color measuring camera 42.

The light source drive control unit 55 generates the light source driving signal for driving the illumination light sources 426 of the color measuring camera 42, and supplies the light source driving signal to the color measuring camera 42.

Specific Example of a Process Performed by the Correction Data Generating Unit

Figure 8:
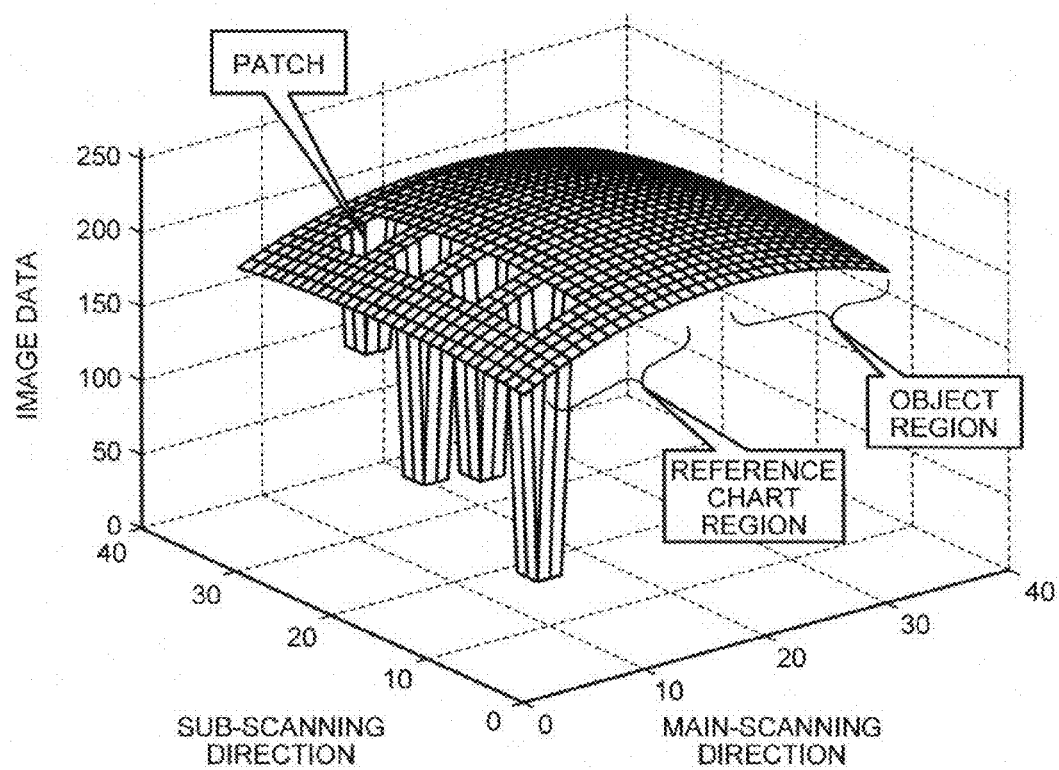
FIG. 8 is a three-dimensional diagram illustrating an example of image data obtained by a sensor unit of the color measuring camera by simultaneously capturing images of the reference chart and a white reference member.
Figure 9:
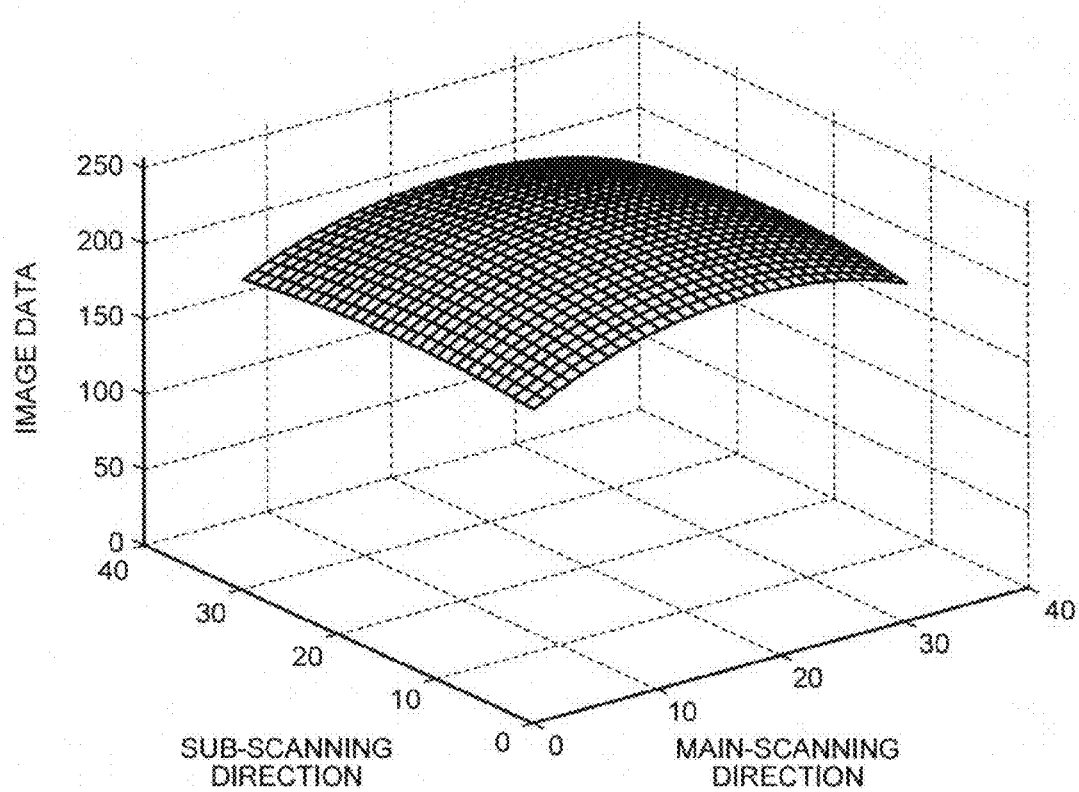
FIG. 9 is a three-dimensional diagram illustrating an example of correction data generated by a correction data generating unit.

With reference to FIG. 8 and FIG. 9, a specific example of a process performed by the correction data generating unit 52 of the color measurement control unit 50 will be explained. In this example, when the correction data generating unit 52 generates the correction data, the sensor unit 430 of the color measuring camera 42 captures an image of the reference chart 400 disposed inside the housing 421 and an image of an object colored in white that is the same color as the background region of the reference chart 400 (hereinafter, the object is described as a white reference member). The extracting unit 521 of the correction data generating unit 52 specifies the positions of the patches arranged in the reference chart 400 (including the dot-diameter measurement pattern array 406 and the distance measurement line 405) from the image data output by the sensor unit 430, and extracts image data of the background region of the reference chart 400 and image data of the white reference member excluding regions of the patches, as image data of the surrounding region. The interpolating unit 522 of the correction data generating unit 52 assumes that each of the patches is in white and interpolates image data of the regions of the patches based on the image data of the background region of the reference chart 400 and the image data of the white reference member, to thereby generate the correction data.

FIG. 8 is a three-dimensional diagram illustrating an example of the image data obtained by simultaneously capturing images of the reference chart 400 and the white reference member by the sensor unit 430 of the color measuring camera 42. FIG. 9 is a three-dimensional diagram illustrating an example of the correction data generated by the correction data generating unit 52. The image data output by the sensor unit 430 is RGB image data; however, in FIG. 8 and FIG. 9, data of only one color is illustrated. In FIG. 8, for simplicity, image data obtained when only four patches are arranged in the reference chart 400 is illustrated by way of example.

The image data obtained by simultaneously capturing images of the reference chart 400 and the white reference member by the sensor unit 430 of the color measuring camera 42 naturally becomes flat image data because captured portions other than the regions of the patches of the reference chart 400 are uniformly colored in white. However, intensity of the illumination light differs depending on positions in the image-capturing range of the sensor unit 430 illuminated by the illumination light sources 426 (illuminance unevenness);

therefore, in actuality, as illustrated in FIG. 8 for example, values of the image data in a center portion of the image-capturing range become greater than values of the image data in surrounding portions. Such illuminance unevenness in the image-capturing range of the sensor unit 430 is generally moderate in degree and can be approximated by a low-order polynomial. By using the state of the illuminance unevenness as the correction data and performing the shading correction to obtain flat image data, an error in the image data caused by the illuminance unevenness can be corrected.

If the sensor unit 430 can capture only an image of the white reference member, the image data output by the sensor unit 430 can be used as it is as the correction data for the shading correction. However, in the color measuring device according to the embodiment, the reference chart 400 is always disposed within the image-capturing range of the sensor unit 430 in order to accurately perform color measurement on the patch image 200 being a color measurement target. Therefore, the sensor unit 430 cannot capture only an image of the white reference member. Therefore, in this example, the correction data generating unit 52 generates the same image data as that obtained when the sensor unit 430 captures only the image of the white reference member, from the image data obtained by simultaneously capturing images of the reference chart 400 and the white reference member by the sensor unit 430. Thereafter, the correction data generating unit 52 stores the generated image data in the correction data storage memory 47 as the correction data.

Specifically, the extracting unit 521 specifies regions of the patches of the reference chart 400 from the image data obtained by simultaneously capturing images of the reference chart 400 and the white reference member by the sensor unit 430, and extracts the image data of the background region of the reference chart 400 and the image data of the white reference member excluding the regions of the patches, that is, image data of the surrounding region in a predetermined color (in this example, white as a high-luminance achromatic color).

As a method for specifying the regions of the patches of the reference chart 400, for example, there is a method in which image data of all the regions in the image-capturing range is compared with a predetermined threshold and regions corresponding to image data equal to or lower than the threshold is determined as the regions of the patches. In the example illustrated in FIG. 8, the threshold is set to a value around 150 and pieces of image data of all the regions in the image-capturing range are compared with the threshold to specify the regions of the patches. Alternatively, for example, there may be a method in which a sample pattern in the same color as that of the regions of the patches is provided and a region that matches the sample pattern is searched for from pieces of the image data of all the regions in the image-capturing range to specify the regions of the patches from the image data.

The interpolating unit 522 assumes that the patches of the reference chart 400 are in the predetermined color (in this example, white as a high-luminance achromatic color), and interpolates image data of the regions of the patches in the image data of the surrounding region extracted by the extracting unit 521. Specifically, the interpolating unit 522 obtains an approximate equation by approximating the image data extracted by the extracting unit 521 by a low-order (secondary or tertiary) polynomial and applies the approximate equation to the regions of the patches or the patterns, thereby interpolating image data of the regions of the patches and the patterns on the assumption that the patches are in the predetermined color.

The interpolating unit 522 may interpolate the image data of the regions of the patches by linear interpolation based on image data of the background region near the patches of the reference chart 400. In the method using the approximate equation for interpolating the image data of the regions of the patches, the image data can be interpolated with high accuracy but processing load in calculations is increased. On the other hand, in the method using the liner interpolation for interpolating the image data of the regions of the patches, calculations can extremely be simplified compared with those in the interpolation using the approximate equation but the accuracy of the interpolation is reduced. Therefore, it is preferable to select the most appropriate method in consideration of the required accuracy and the processing capability for calculations by the color measuring device.

As another method for interpolating the image data of the regions of the patches with respect to the image data of the surrounding region, for example, two-dimensional spline interpolation or the like may be used.

By the interpolation of the image data of the regions of the patches by the interpolating unit 522, image data illustrated in FIG. 9 is generated from the image data illustrated in FIG. 8. The image data illustrated in FIG. 9 is the same as the image data obtained when the sensor unit 430 captures only an image of the white reference member. The storage control unit 523 stores the image data generated as above in the correction data storage memory 47 of the color measuring camera 42. When color measurement is performed on the patch image 200, the shading correcting unit 452 of the image processing unit 45 performs shading correction on the image data output by the sensor unit 430 by using the correction data stored in the correction data storage memory 47.

The above explanation is given based on the assumption that the sensor unit 430 captures an image of the white reference member as an object colored in white that is the same color as the background region of the reference chart 400, together with an image of the reference chart 400. However, an object to be captured together with the reference chart 400 does not necessarily have the same color as the background region of the reference chart 400. In this case, image data of the region of the reference chart 400 and image data of the region of the object greatly differ in the image data output by the sensor unit 430. Therefore, the image data of the reference chart 400 and the image data of the object are separated and two pieces of correction data for the respective regions are generated. If a uniformly-colored member is captured as an object, image data of the object output by the sensor unit 430 can be used as it is as the correction data for the region of the object. On the other hand, the correction data for the region of the reference chart 400 is generated by the same process as described in the above example.

Specifically, the extracting unit 521 specifies regions of the patches from the image data of the reference chart 400 output by the sensor unit 430, and extracts image data of the background region of the reference chart 400 excluding the regions of all the patches.

Subsequently, the interpolating unit 522 interpolates image data of the regions of the patches by assuming that the patches are colored in white, with respect to the image data of the background region of the reference chart 400 extracted by the extracting unit 521. Specifically, the interpolating unit 522 calculates an approximate equation by approximating the image data extracted by the extracting unit 521 by a low-order polynomial and applies the approximate equation to the regions of the patches to thereby interpolate the image data of the regions of the patches on the assumption that the patches are colored in white. Alternatively, similarly to the above example, it may be possible to perform linear interpolation on the image data of the regions of the patches based on the image data of the background region near the patches of the reference chart 400. The image data obtained by the interpolation is used as the correction data for the region of the reference chart 400.

Color Measurement Method for a Patch Image

Figure 10:
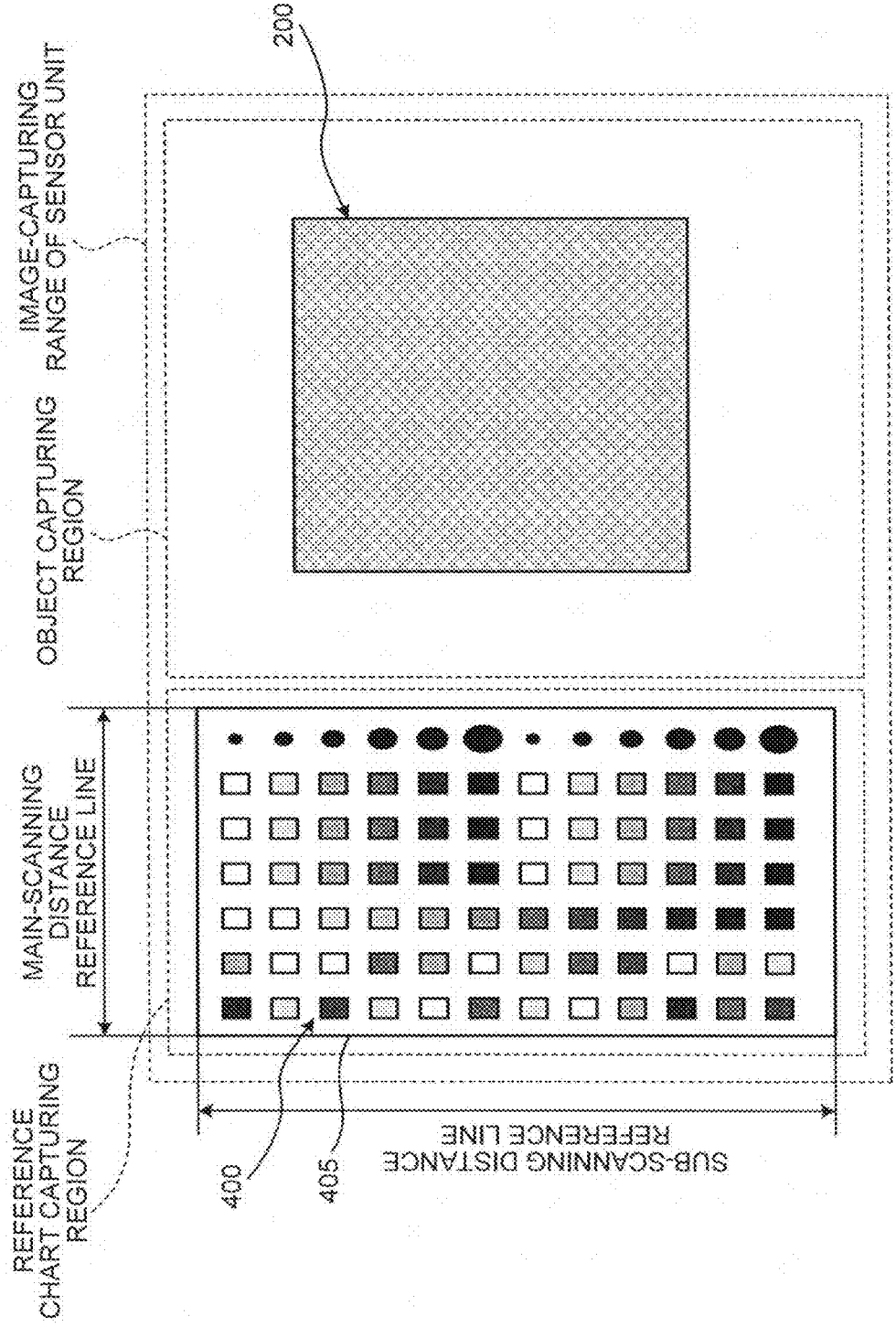
FIG. 10 is a diagram illustrating an example of image data obtained by simultaneously capturing images of the reference chart and a patch image being a color measurement target by the sensor unit.
Figure 11:
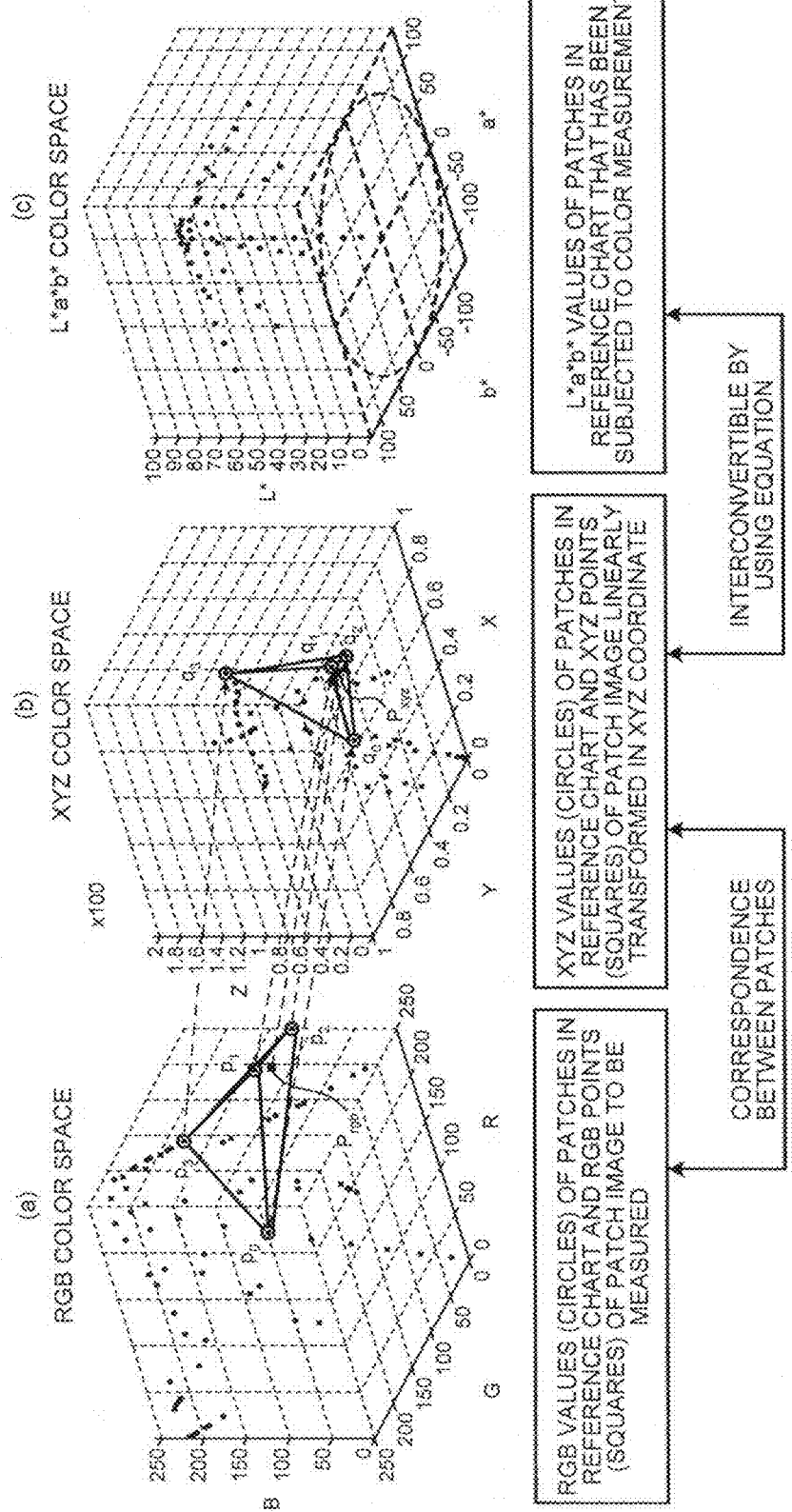
FIG. 11 is a diagram for explaining a specific example of a color measurement method for a patch image.
Figure 13:
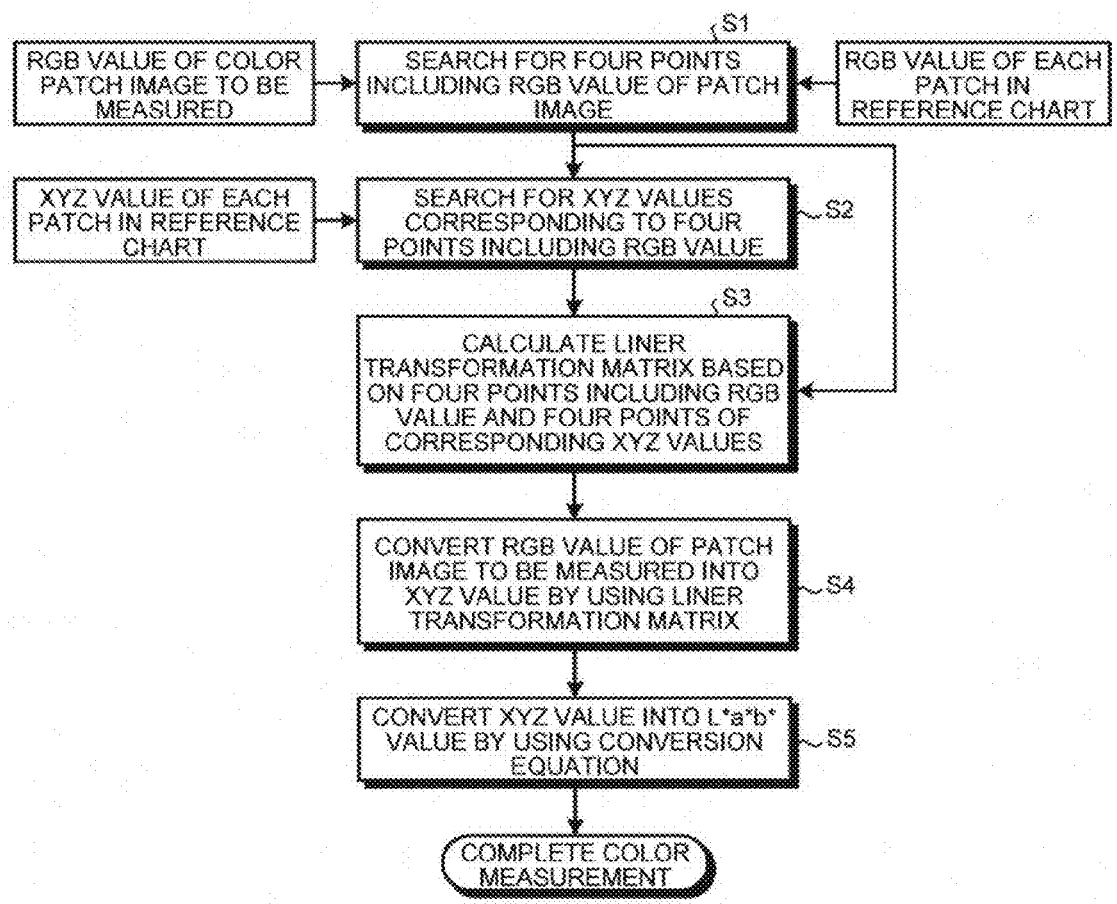
FIG. 13 is a flowchart illustrating the flow of color measurement performed on the patch image.
Figure 14:
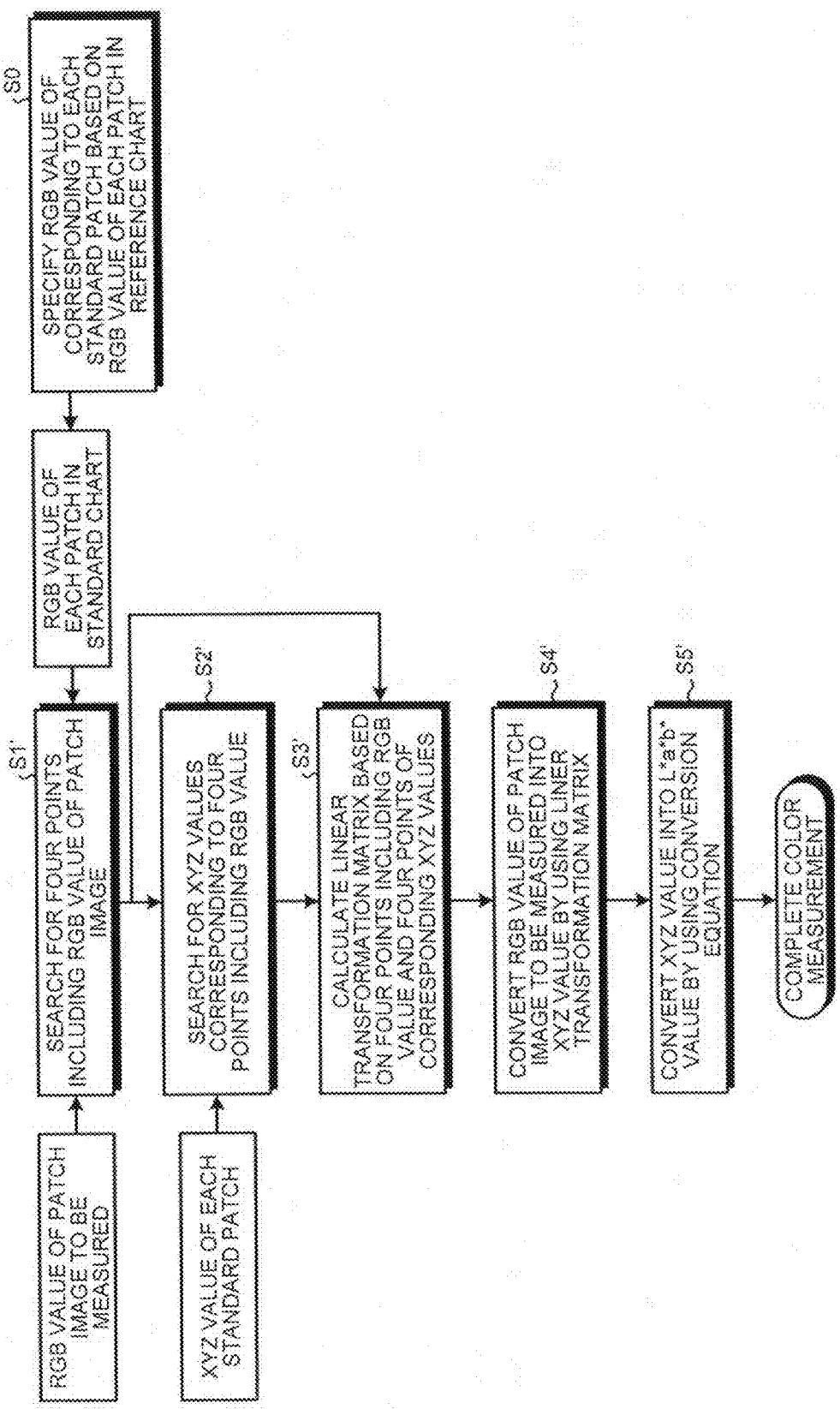
FIG. 14 is a flowchart illustrating a modification of the flow of color measurement performed on the patch image.
Figure 15:
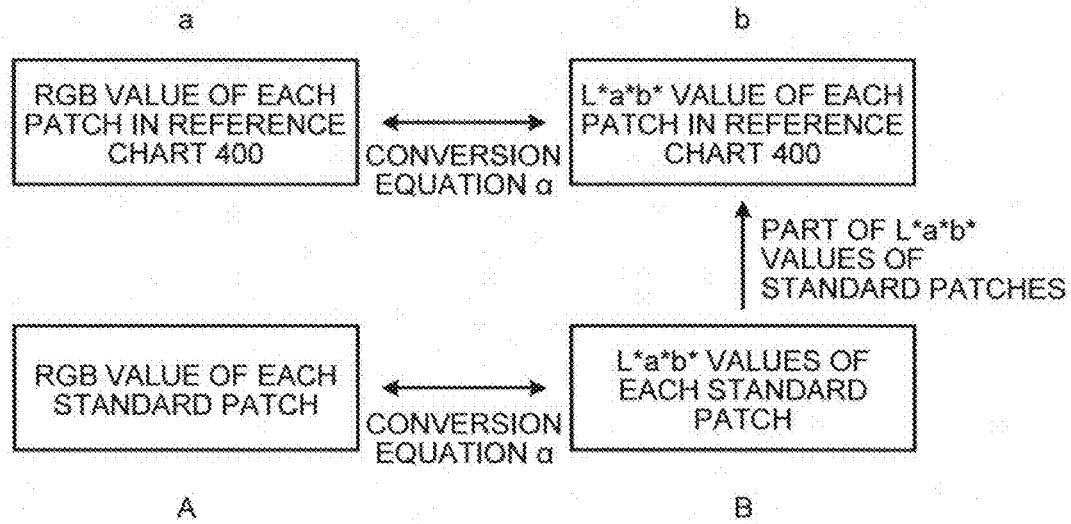
FIG. 15 is a diagram for explaining a method for specifying an RGB value corresponding to an L*a*b* value of each standard patch.

With reference to FIG. 10 to FIG. 15, a specific example of a color measurement method performed on the patch image 200 by using the color measuring device according to the embodiment will be described in detail below. FIG. 10 is a diagram illustrating an example of the image data obtained by simultaneously capturing images of the reference chart 400 and the patch image 200 being a color measurement target by the sensor unit 430. FIG. 11 is a diagram for explaining a specific example of a color measurement method performed on the patch image 200. FIGS. 12A and 12B illustrate conversion equations used for conversion between an L*a*b* value and an XYZ value. FIG. 13 is a flowchart illustrating the flow of color measurement performed on the patch image 200. FIG. 14 is a flowchart illustrating a modification of the flow of color measurement performed on the patch image 200. FIG. 15 is a diagram for explaining a method for specifying an RGB value corresponding to an L*a*b* value of each standard patch.

To perform color measurement on the patch image 200, the image forming apparatus 100 outputs an arbitrary patch to the recording medium P to form the patch image 200. Then, the sensor unit 430 included in the color measuring camera 42 of the color measuring device simultaneously captures the reference chart 400 disposed inside the housing 421 of the color measuring camera 42 and the patch image 200 being a color measurement target. As a result, image data of the reference chart 400 and image data of the patch image 200 as illustrated in FIG. 10 for example are acquired. The image-capturing range of the sensor unit 430 contains a reference chart capturing region, in which an image of the reference chart 400 is captured, and an object capturing region, in which an image of the patch image 200 as an object being the color measurement target is captured. Image data output from pixels corresponding to the reference chart capturing region is the image data of the reference chart 400 and image data output from pixels corresponding to the object capturing region is the image data of the patch image 200. In this example, only one patch image 200 is captured as the object being a color measurement target; however, it is possible to simultaneously capture image of a plurality of the patch images 200.

The image data of the reference chart 400 and the patch image 200 captured by the sensor unit 430 is processed by the image processing unit 45, is sent from the color measuring camera 42 to the color measurement control unit 50 via the interface unit 46, and is stored in the frame memory 51 of the color measurement control unit 50. The colorimetric value calculating unit 531 of the arithmetic unit 53 reads the image data stored in the frame memory 51 and performs color measurement on the patch image 200.

The colorimetric value calculating unit 531 specifies the positions of the chart position specification markers 407 at the four corners of the distance measurement line 405 of the reference chart 400 from the image data read from the frame memory 51 by performing pattern matching or the like. As a result, the position of the reference chart 400 in the image data can be specified. After specifying the position of the reference chart 400, the colorimetric value calculating unit 531 specifies the positions of each of the patches of the reference chart 400.

Subsequently, the colorimetric value calculating unit 531 converts the image data (RGB value) of the patch image 200 being a color measurement target into the L*a*b* value being a color value in the L*a*b* color space by using the image data (RGB value) of each of the patches of the reference chart 400. A specific method for the conversion is explained in detail below.

Illustrated in (c) of FIG. 11 are plots of the L*a*b* values of each patch of the patch array 401 in the primary color (YMC) and the patch array 402 in the secondary color (RGB) in the reference chart 400 illustrated in FIG. 5 on the L*a*b* color space. The L*a*b* values of each patch are measured in advance as described above, and are stored in, for example, a non-volatile memory in the color measurement control unit 50.

Illustrated in (a) of FIG. 11 are plots of the RGB values of each patch of the patch array 401 in the primary color (YMC) and the patch array 402 in the secondary color (RGB) in the reference chart 400 illustrated in FIG. 5 (image data obtained by image capturing performed by the sensor unit 430) on the RGB color space.

Illustrated in (b) of FIG. 11 are plots of XYZ values obtained by converting the L*a*b* values illustrated in (c) of FIG. 11 by using a predetermined conversion equation, on the XYZ color space. The L*a*b* value can be converted into the XYZ value by using a conversion equation (from Lab to XYZ) illustrated in FIG. 12B. The XYZ value can be converted into the L*a*b* value by using a conversion equation (from XYZ to Lab) illustrated in FIG. 12A. That is, the L*a*b* value illustrated in FIG. 11(c) and the XYZ value illustrated in FIG. 11(b) can be interconverted by using the conversion equations illustrated in FIGS. 12A and 12B.

With reference to the flowchart in FIG. 13, the flow for converting the RGB value of the patch image 200 being the color measurement target obtained from the object capturing region illustrated in FIG. 10 into the L*a*b* value will be explained. It is assumed that the RGB value of the patch image 200 being the color measurement target is located at a point $P_{rgb}$ in the RGB color space illustrated in (a) of FIG. 11. In this case, four points in the nearest neighborhood capable of forming a tetrahedron including the point $P_{rgb}$ are searched for from among the L*a*b* values of the patches of the reference chart 400 illustrated in FIG. 10 (Step S1). In the example in (a) of FIG. 11, four points $p_0$, $p_1$, $p_2$, $p_3$ are selected. The coordinate values of the four points $p_0$, $p_1$, $p_2$ and $p_3$ in the RGB color space illustrated in (a) of FIG. 11 are represented by $p_0$ ($x_{01}$, $x_{02}$, $x_{03}$), $p_1$ ($x_1$, $x_2$, $x_3$), $p_2$ ($x_4$, $x_5$, $X_6$), and $p_3$($x_7$, $x_8$, $x_9$), respectively.

Subsequently, four points $q_0$, $q_1$, $q_2$, $q_3$ in the XYZ color space illustrated in (b) of FIG. 11 corresponding to the four points $p_0$, $p_1$, $p_2$, $p_3$ in the RGB color space illustrated in (a) of FIG. 11 are searched for (Step S2). The coordinate values of the four points $q_0$, $q_1$, $q_2$, and $q_3$ in the XYZ color space are represented by $q_0$($y_{01}$, $y_{02}$, $y_{03}$), $q_1$($y_1$, $y_2$, $y_3$), $q_2$ ($y_4$, $y_5$, $y_6$), and $q_3$($y_7$, $y_8$, $y_9$) respectively.

Subsequently, a linear transformation matrix for linearly transforming a local space in the tetrahedron is obtained (Step S3). Specifically, an arbitrary pair of corresponding points (in the embodiment, $p_0$ and $q_0$ closest to an achromatic color) is determined from among the four points $p_0$, $p_1$, $p_2$, $p_3$ in the RGB color space, and the corresponding point ($p_0$, $q_0$) is set as the origin (the coordinate values of $p_1$ to $p_3$ and $q_1$ to $q_3$ are represented by relative values with respect to $p_0$ and $q_0$).

Assuming that the RGB color space illustrated in (a) of FIG. 11 and the XYZ color space illustrated in (b) of FIG. 11 can be linearly transformed by using the conversion equation of Y=AX, the equation can be represented by Equation (1) below.

$$Y = \begin{pmatrix} a_{11} & a_{12} & a_{13} \\ a_{21} & a_{22} & a_{23} \\ a_{31} & a_{32} & a_{33} \end{pmatrix} X \quad (1)$$

where X is a point in the RGB space and Y is a point in the XYZ space.

Assuming that the point $p_1$ is mapped into $q_1$, $p_2$ is mapped into $q_2$, and $p_3$ is mapped into $q_3$, each coefficient a is obtained by Equations (2) to (10) below.

$$a_{13} = \frac{(x_4 y_1 - x_1 y_4)(x_2 x_7 - x_1 x_8) - (x_7 y_1 - x_1 y_7)(x_2 x_4 - x_1 x_5)}{(x_3 x_4 - x_1 x_6)(x_2 x_7 - x_1 x_8) - (x_3 x_7 - x_1 x_9)(x_2 x_4 - x_1 x_5)} \quad (2)$$

$$a_{23} = \frac{(x_4 y_2 - x_1 y_5)(x_2 x_7 - x_1 x_8) - (x_7 y_2 - x_1 y_8)(x_2 x_4 - x_1 x_5)}{(x_3 x_4 - x_1 x_6)(x_2 x_7 - x_1 x_8) - (x_3 y_7 - x_1 x_9)(x_2 x_4 - x_1 x_5)} \quad (3)$$

$$a_{33} = \frac{(x_4 y_3 - x_1 y_6)(x_2 x_7 - x_1 x_8) - (x_7 y_3 - x_1 y_9)(x_2 x_4 - x_1 x_5)}{(x_3 x_4 - x_1 x_6)(x_2 x_7 - x_1 x_8) - (x_3 y_7 - x_1 x_9)(x_2 x_4 - x_1 x_5)} \quad (4)$$

$$a_{12} = \frac{(x_4 y_1 - x_1 y_4)(x_3 x_7 - x_1 x_4) - (x_7 y_1 - x_1 y_7)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (5)$$

$$a_{22} = \frac{(x_4 y_2 - x_1 y_5)(x_3 x_7 - x_1 x_9) - (x_7 y_2 - x_1 y_8)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (6)$$

$$a_{32} = \frac{(x_4 y_3 - x_1 y_6)(x_3 x_7 - x_1 x_9) - (x_7 y_3 - x_1 y_9)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (7)$$

$$a_{11} = \frac{y_1 - a_{12} x_1 - a_{13} x_3}{x_1} \quad (8)$$

$$a_{21} = \frac{y_2 - a_{22} x_2 - a_{23} x_3}{x_1} \quad (9)$$

$$a_{31} = \frac{y_3 - a_{32} x_2 - a_{33} x_3}{x_1} \quad (10)$$

Subsequently, by using the linear transformation matrix (Y=AX), the point Prgb (whose coordinate value is ($P_r$, $P_g$, $P_b$)) as the RGB value of the patch image 200 being the color measurement target in the RGB color space illustrated in (a) of FIG. 11 is mapped into the XYZ color space illustrated in (b) of FIG. 11 (Step S4). The XYZ value thus obtained is a relative value with respect to the origin $q_0$. Therefore, the actual XYZ value $P_{xyz}$ (whose coordinate value is ($P_x$, $P_y$, $P_z$)) corresponding to the RGB value $P_{rgb}$ of the patch image 200 being a color measurement target is represented as an offset value with respect to the origin $q_0$ ($y_{01}$, $y_{02}$, $y_{03}$) by Equations (11) to (13) below.

$$P_x = y_{01} + a_{11} \times P_r + a_{12} \times P_g + a_{13} \times P_b \quad (11)$$

$$P_y = y_{02} + a_{21} \times P_r + a_{22} \times P_g + a_{23} \times P_b \quad (12)$$

$$P_z = y_{03} + a_{31} \times P_r + a_{32} \times P_g + a_{33} \times P_b \quad (13)$$

The XYZ value Pxyz of the patch image 200 obtained as described above is converted into the L*a*b* value by the conversion equation illustrated in FIG. 12A, so that the L*a*b* value corresponding to the RGB value $P_{rgb}$ of the patch image 200 being a color measurement target is obtained (Step S5). Therefore, even when the sensitivity of the sensor unit 430 changes or even when the wavelength or the intensity of the illumination light sources 426 changes, the colorimetric value of the patch image 200 being a color measurement target can accurately be obtained. As a result, it is possible to perform color measurement with high accuracy. In the embodiment, the patch image 200 formed by the image forming apparatus 100 is used as a color measurement target; however, an arbitrary image output by the image forming apparatus 100 may be used as a color measurement target. For example, the image forming apparatus 100 can output an image while performing color measurement on a part of the image to adjust the output characteristics of the image forming apparatus 100 in real time.

In (c) of FIG. 11 used in the processing described above, the L*a*b* value of each of the patches of the patch array 401 in the primary color (YMC) and the patch array 402 in the secondary color (RGB) in the reference chart 400 illustrated in FIG. 5 are plotted on the L*a*b* color space. Because the reference chart 400 illustrated in FIG. 5 is disposed in the housing 421 of the color measuring camera 42, the number of patches in the reference chart 400 is limited. Therefore, the reference chart 400 illustrated in FIG. 5 is formed by using a part of patches selected from standard patches. For example, Japan Color has 928 colors and the reference chart 400 illustrated in FIG. 5 is formed by using a part (for example, 72 colors) selected from the 928 colors. However, when the color measurement is performed by using patches selected from the standard patches, the accuracy in the color measurement may be reduced. Therefore, it is desirable to estimate the RGB values of the standard patches based on the RGB values of the patches contained in the reference chart 400, and perform color measurement on the patch image 200 being a color measurement target by using the RGB values of the standard patches.

Specifically, the L*a*b* values of the standard patches are stored, and, as illustrated in FIG. 14, the RGB value of each of the standard patches is specified based on the RGB values of the patches of the reference chart 400 obtained by image capturing performed by the sensor unit 430 (Step S0). Then, four points including the RGB value of the patch image 200 being a color measurement target are searched for based on the specified RGB value of each of the standard patches (Step S1').

As illustrated in FIG. 15, the RGB value (a) of each of the patches of the reference chart 400 corresponds to the L*a*b* value (b) of each of the patches of the reference chart 400 by a conversion equation a (b=a×α). Therefore, the conversion equation α is calculated based on the RGB value of each of the patches of the reference chart 400. Furthermore, the L*a*b* value of each of the patches of the reference chart 400 is a part of the L*a*b* value of each of the standard patches. Therefore, the RGB value (A) of each of the standard patches corresponds to the L*a*b* value (B) of each of the standard patches by the above conversion equation a (B=A×α). Therefore, the RGB value corresponding to the L*a*b* value of each of the standard patches can be specified based on the conversion equation a calculated as above. As a result, the RGB value corresponding to the L*a*b* value of each of the standard patches can be specified based on the RGB value of each of the patches of the reference chart 400.

Subsequently, corresponding XYZ values at the four points including the RGB value of the patch image 200 being a color measurement target are searched for based on the XYZ value corresponding to the L*a*b* value of each of the standard patches (Step S2').

Subsequently, the linear transformation matrix is calculated based on the XYZ values corresponding to the patches at the four points searched for at Step S2' (Step S3'). The RGB value of the patch image 200 being a color measurement target is converted into the XYZ value based on the calculated linear transformation matrix (Step S4'). The XYZ value converted at Step S4' is converted into the L*a*b* value by using the conversion equation described above (Step S5'). As a result, the L*a*b* value of the patch image 200 being a color measurement target can be obtained based on the RGB value and the XYZ value of each of the standard patches. Therefore, it is possible to perform color measurement on the patch image 200 with high accuracy. The standard patches are not limited to Japan Color. For example, standard colors, such as Specifications for Web Offset Publications (SWOP) used in the United States or Euro Press used in Europe, may be used.

Meanwhile, the image forming apparatus 100 according to the embodiment forms an image on the recording medium P by a dot matrix and reproduces a desired color by superimposing ink of YMCK. However, if positional deviation occurs in the image, image degradation occurs and the colorimetric value obtained from the patch image 200 is changes.

When a color of the image changes because of the positional deviation in the image formed on the recording medium P, and if the color of the image is corrected by only controlling the ejection amount of ink, the balance between the ejection amounts of ink is disturbed. As a result, it becomes impossible to obtain an image of good quality. Therefore, it is desirable to measure the positional deviation in an image and correct the positional deviation before color measurement is performed on the patch image 200.

Method for Measuring Positional Deviation in the Image

Figure 19:
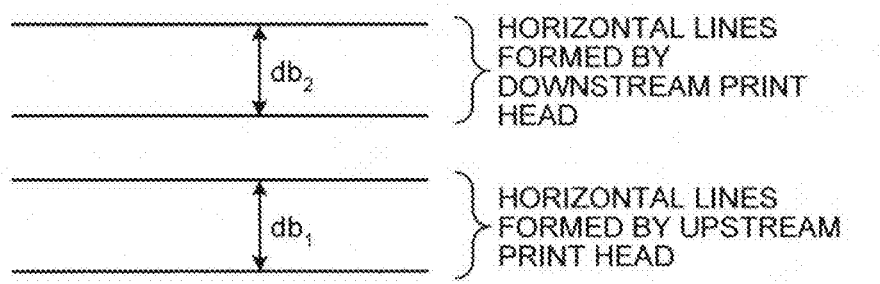
FIG. 19 is a diagram for explaining a method for measuring positional deviation in the image in a sub-scanning direction.
Figure 20:
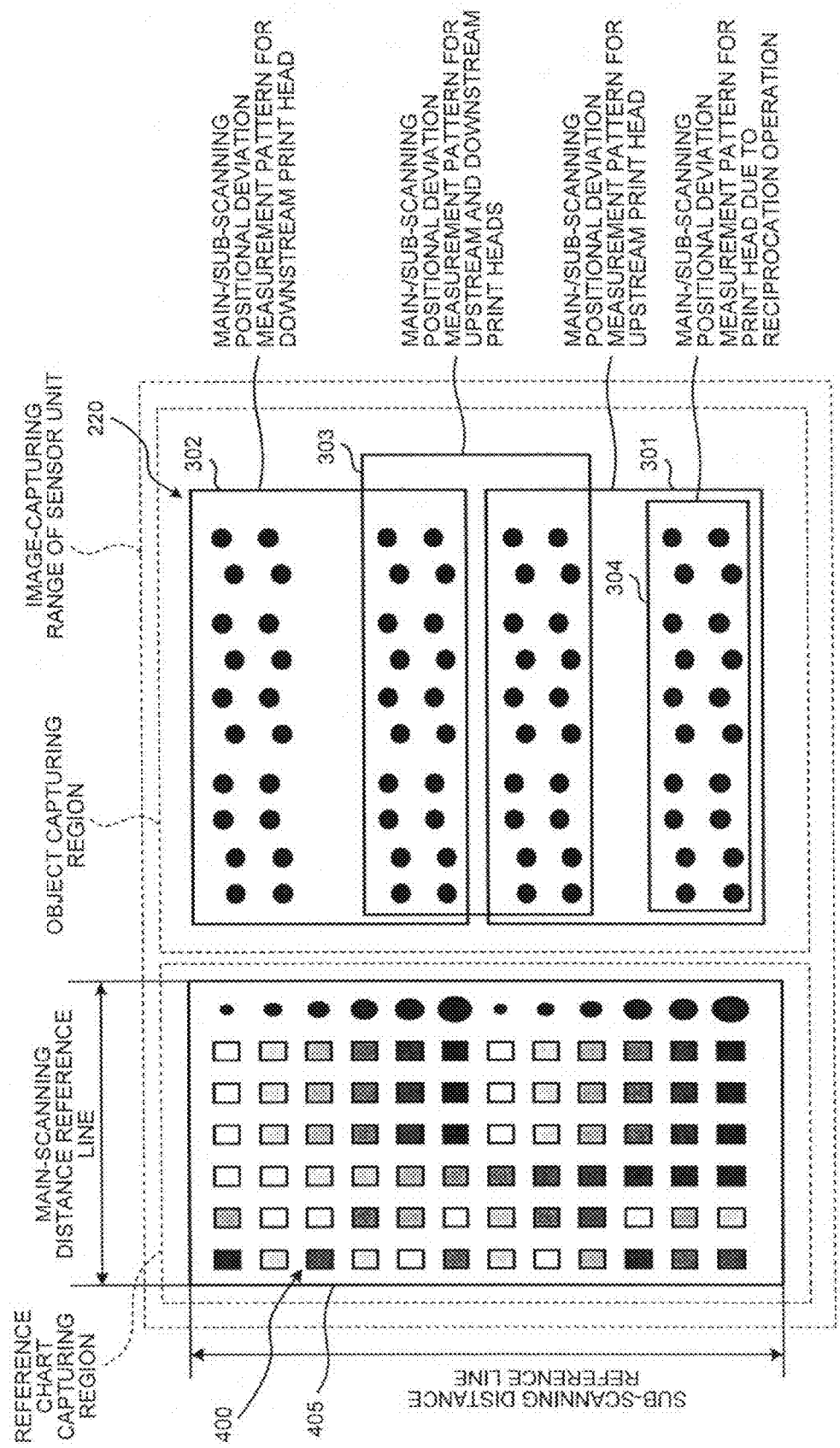
FIG. 20 is a diagram illustrating an example of image data obtained by simultaneously capturing images of the reference chart and the test pattern by the sensor unit.

With reference to FIG. 16 to FIG. 20, a specific example of a method for measuring positional deviation in an image by using the color measuring device according to the embodiment will be explained below. FIG. 16 is a diagram illustrating an example of image data obtained by simultaneously capturing images of the reference chart 400 and a test pattern 210 by the sensor unit 430. FIG. 17 and FIG. 18 are diagrams for explaining a method for measuring positional deviation in the image in the main-scanning direction. FIG. 19 is a diagram for explaining a method for measuring positional deviation in the image in the sub-scanning direction. FIG. 20 is a diagram illustrating an example of image data obtained by simultaneously capturing images of the reference chart 400 and a test pattern 220 by the sensor unit 430.

To measure positional deviation in an image, the image forming apparatus 100 forms the test pattern 210, which is a predetermined image for measuring positional deviation, on the recording medium P. Subsequently, the sensor unit 430 included in the color measuring camera 42 of the color measuring device simultaneously captures the reference chart 400 and the test pattern 210 formed on the recording medium P. As a result, image data of the reference chart 400 and the test pattern 210 as illustrated in FIG. 16 for example is obtained.

The image data of the reference chart 400 and the test pattern 210 captured by the sensor unit 430 is processed by the image processing unit 45. Subsequently, the image data is sent from the color measuring camera 42 to the color measurement control unit 50 via the interface unit 46 and stored in the frame memory 51 of the color measurement control unit 50. The positional-deviation-amount calculating unit 532 of the arithmetic unit 53 reads the image data stored in the frame memory 51 and measures positional deviation in the image.

Vertical lines (solid lines) in the lower region of the test pattern 210 illustrated in FIG. 16 are patterns for measuring relative positional deviation of the upstream print head 6 in the main-scanning direction. Vertical lines (solid lines) in the upper region of the test pattern 210 are patterns for measuring relative positional deviation of the downstream print head 6 in the main-scanning direction. Horizontal lines (solid lines) in the middle of the test pattern 210 are patterns for measuring relative positional deviation between the upstream print head 6 and the downstream print head 6 in the sub-scanning direction. Vertical dotted lines illustrated in FIG. 16 indicate ideal positions of the vertical lines to be recorded on the recording medium P when no positional deviation occurs in the main-scanning direction. The vertical dotted lines are not actually recorded on the recording medium P.

To measure the relative positional deviation of the upstream print head 6 in the main-scanning direction, gaps between the vertical lines (solid lines) actually formed on the recording medium P are measured by shifting the print head 6 by a predetermined dap α by using the image data of the test pattern 210 captured by the sensor unit 430, and a difference between the actual positions of the vertical lines (solid lines) formed on the recording medium P and the ideal positions of the vertical lines (dotted lines) to be formed on the recording medium P when no positional deviation occurs in the main-scanning direction is calculated as the amount of positional deviation in the main-scanning direction. The gaps between the vertical lines (solid lines) actually formed on the recording medium P are measured by using a black vertical line formed on the leftmost side as a reference line for measuring positional deviation in the main-scanning direction.

Specifically, as illustrated in FIG. 17, the first black vertical line formed on the leftmost side is used as the reference line for measuring positional deviation in the main-scanning direction, and gaps ($dx_1$, $dx_2$, $dx_3$) between the reference line and the actually-formed vertical lines are measured. As a result, the actual positions of the vertical lines can be obtained. Subsequently, differences ($\Delta dx_1$, $\Delta dx_2$, $\Delta dx_3$) between the actual positions of the vertical lines (solid line) and the ideal positions of the vertical line (dotted line) are measured. The difference ($\Delta dx_1$) between the actual position of the second vertical line and the ideal position of the vertical line is obtained such that $\Delta dx_1 = dx_1 - da$. The difference ($\Delta dx_2$) between the actual position of the third vertical line and the ideal position of the vertical line is obtained such that $\Delta dx_2 = dx_2 - 2da$. The difference ($\Delta dx_3$) between the actual position of the fourth vertical line and the ideal position of the vertical line is obtained such that $\Delta dx_3 = dx_3 - 3da$. The differences ($\Delta dx_1$, $\Delta dx_2$, $\Delta dx_3$) represent the relative positional deviation of the upstream print head 6 in the main-scanning direction. Therefore, by correcting the positional deviation of the upstream print head 6 in the main-scanning direction based on the differences ($\Delta dx_1$, $\Delta dx_2$, $\Delta dx_3$), the positions of the vertical lines (solid lines) actually recorded on the recording medium P coincide with the ideal positions of the vertical lines (dotted lines).

To measure the relative positional deviation of the downstream print head 6 in the main-scanning direction, the method described above with reference to FIG. 17 is used. However, as illustrated in FIG. 18, the position of the first black vertical line formed on the leftmost side may be deviated from the position of the reference line for measuring the positional deviation in the main-scanning direction. Therefore, a difference ($\Delta dx_0$) between the position of the first black vertical line recorded on the leftmost side and the position of the reference line for measuring positional deviation in the main-scanning direction is obtained, and the position of the first black vertical line formed on the leftmost side is corrected to the position of the reference line for measuring positional deviation in the main-scanning direction based on the difference ($\Delta dx_0$). Thereafter, the relative positional deviation of the downstream print head 6 in the main-scanning direction is measured by using the method illustrated in FIG. 17, so that the positional deviation in the main-scanning direction is corrected.

To measure the deviation between the upstream print head 6 and the downstream print head 6 in the sub-scanning direction, four horizontal lines arranged in the middle in FIG. 16 are used. Among the four horizontal lines, two horizontal lines on the lower side are formed on the recording medium P by using the upstream print head 6, and two horizontal lines on the upper side are formed on the recording medium P by using the downstream print head 6. As illustrated in FIG. 19, distances ($db_1$, $db_2$) between the horizontal lines are measured and a difference ($\Delta db = db_1 - db_2$) is calculated as the amount of positional deviation between the upstream print head 6 and the downstream print head 6 in the sub-scanning direction. By correcting the positional deviation between the upstream print head 6 and the downstream print head 6 in the sub-scanning direction based on the difference ($\Delta db$), the distances ($db_1$, $db_2$) between the horizontal lines become the same.

The distances of a sub-scanning distance reference line and a main-scanning distance reference line of the reference chart 400 are absolute distances. Therefore, the absolute distances of the sub-scanning distance reference line and the main-scanning distance reference line are measured in advance and stored in a non-volatile memory in the color measurement control unit 50 for example. Then, the distances of the sub-scanning distance reference line and the main-scanning distance reference line on the image illustrated in FIG. 16 obtained by capturing the image of the reference chart 400 are compared with the stored absolute distances of the sub-scanning distance reference line and the main-scanning distance reference line, respectively, to calculate a ratio between the distances on the image and the absolute distances. Thereafter, the amount of positional deviation obtained from a test pattern 110 in the object capturing region described above is multiplied by the ratio, so that the amount of actual positional deviation can be calculated. By correcting the positional deviation based on the amount of actual positional deviation, it is possible to correct the positional deviation with high accuracy.

The method for measuring positional deviation described above is a method for measuring the positional deviation in the image by using the test pattern 210 being a line pattern illustrated in FIG. 16. However, the method for measuring the positional deviation in the image is not limited to the method described above, and various methods may be applied. For example, it may be possible to measure geometric positional deviation between the print heads 6 by using the test pattern 220 being a dot pattern illustrated in FIG. 20.

In the case of the test pattern 220 illustrated in FIG. 20, the amount of positional deviation of the upstream print head 6 in the main-scanning direction and sub-scanning direction can be measured by using dots in a first frame 301. Furthermore, the amount of positional deviation of the downstream print head 6 in the main-scanning direction and sub-scanning direction can be measured by using dots in a second frame 302. Moreover, the amount of positional deviation between the upstream print head 6 and the downstream print head 6 in the main-scanning direction and sub-scanning direction can be measured by using dots in a third frame 303. Furthermore, the amount of positional deviation of the print head 6 in the main-scanning direction and sub-scanning direction caused by the reciprocation operation of the carriage 5 can be measured by using dots in a fourth frame 304.

As described above in detail with specific examples, the color measuring device according to the embodiment simultaneously captures images of the reference chart 400 and the patch image 200 being a color measurement target by using the sensor unit 430 and performs color measurement on the patch image 200 by using the image data of the reference chart 400. Furthermore, the color measuring device generates the correction data by using the image data output from the sensor unit 430 and corrects (shading correction) an error in the image data caused by the illuminance unevenness of illumination provided in the image-capturing range of the sensor unit 430 by using the correction data. Therefore, the color measuring device according to the embodiment can perform color measurement with high accuracy independent of the imaging conditions used for the color measurement. Furthermore, even when there is illuminance unevenness of the illumination in the image-capturing range of the sensor unit 430, it is possible to perform color measurement with high accuracy.

Furthermore, the color measuring device according to the embodiment generates the correction data by extracting image data of the surrounding region in a predetermined color from the image data output by the sensor unit 430, and interpolating image data of a region of a patch or an object by assuming that the region of the patch or the object is in a predetermined color with respect to the image data of the surrounding region. Therefore, it is not necessary to replace the reference chart 400 disposed in the housing 421 of the color measuring camera 42 with a white reference member in order to generate the correction data. As a result, it is possible to easily generate the correction data and to prevent adverse effects on the alignment of optical elements of the color measuring camera 42.

Moreover, the image forming apparatus according to the embodiment includes the color measuring device according to the embodiment. Therefore, it is possible to perform color measurement on an image with accuracy while the image being a color measurement target is output, and it is possible to appropriately adjust the output characteristics.

Modifications of the Color Measuring Camera

Modifications of the color measuring camera 42 will be explained below. In the following, the color measuring camera 42 according to a first modification is described as a color measuring camera 42A, the color measuring camera 42 according to a second modification is described as a color measuring camera 42B, the color measuring camera 42 according to a third modification is described as a color measuring camera 42C, the color measuring camera 42 according to a fourth modification is described as a color measuring camera 42D, the color measuring camera 42 according to a fifth modification is described as a color measuring camera 42E, the color measuring camera 42 according to a sixth modification is described as a color measuring camera 42F, the color measuring camera 42 according to a seventh modification is described as a color measuring camera 42G, and the color measuring camera 42 according to an eighth modification is described as a color measuring camera 42H. In the modifications, components common to those of the color measuring camera 42 described above are denoted by the same reference symbols and the same explanation is not repeated.

First Modification

Figure 21:
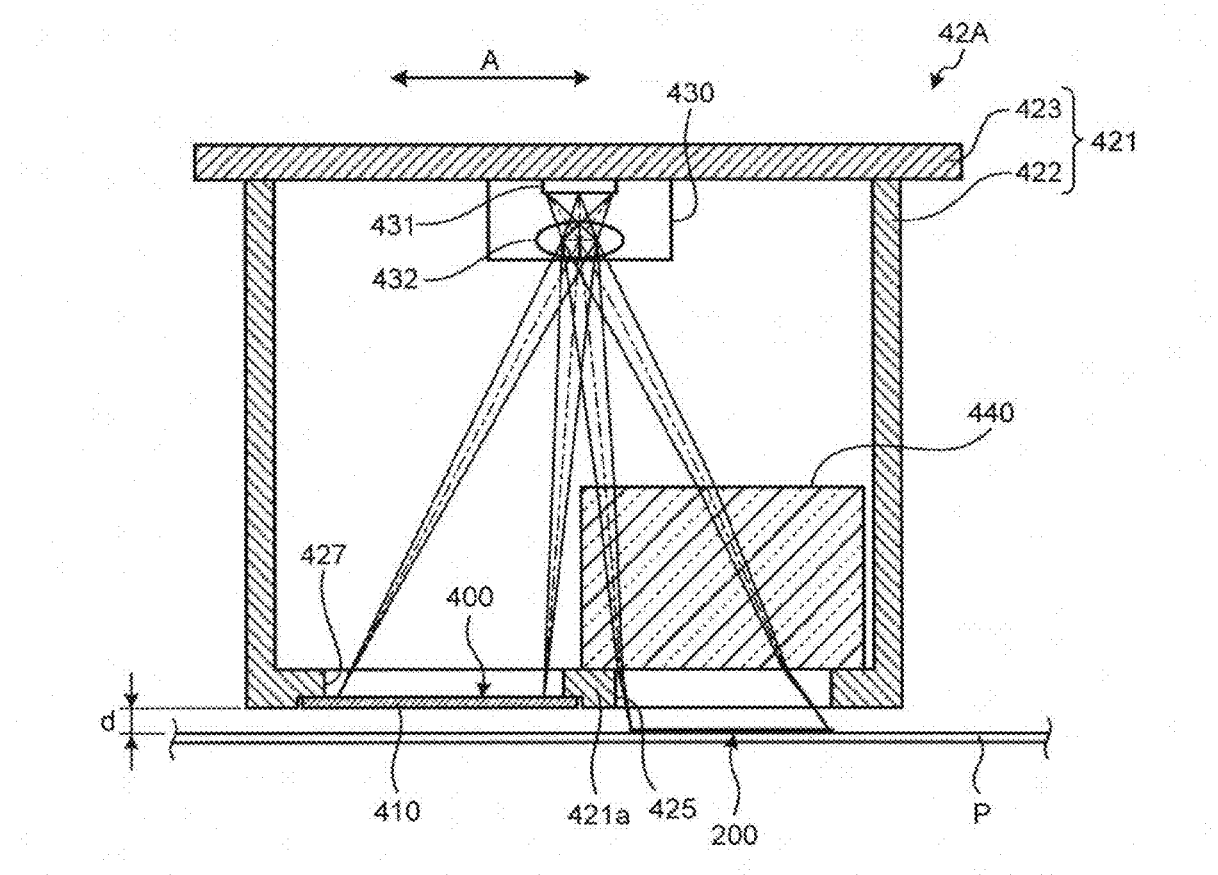
FIG. 21 is a vertical cross-sectional view of a color measuring camera according to a first modification.

FIG. 21 is a vertical cross-sectional view of the color measuring camera 42A according to the first modification, taken at the same position as the vertical cross-sectional view of the color measuring camera 42 illustrated in FIG. 4A.

The color measuring camera 42A according to the first modification includes an opening 427 different from the opening 425 for capturing an image of the patch image 200. The opening 427 is disposed on the bottom surface 421a of the housing 421. The chart plate 410 is disposed so as to close the opening 427 from the outside of the housing 421. That is, while the chart plate 410 of the color measuring camera 42 described above is disposed on the inner side of the bottom surface 421a of the housing 421 so as to face the sensor unit 430, the chart plate 410 of the color measuring camera 42A according to the first modification is disposed on the outer surface of the bottom surface 421a of the housing 421 so as to face the recording medium P.

Specifically, for example, a concave portion with a depth corresponding to the thickness of the chart plate 410 is formed on the outer surface of the bottom surface 421a of the housing 421 such that the concave portion communicates with the opening 427. In the concave portion, the chart plate 410 is disposed such that the surface on which the reference chart 400 is formed faces the sensor unit 430. For example, end portions of the chart plate 410 are bonded to the bottom surface 421a of the housing 421 by an adhesive agent nears the edges of the opening 427 so that the chart plate 410 is integrated with the housing 421.

In the color measuring camera 42A according to the first modification configured as described above, the chart plate 410 on which the reference chart 400 is formed is disposed on the outer surface of the bottom surface 421a of the housing 421. Therefore, compared with the color measuring camera 42 described above, it becomes possible to reduce a difference between the optical path length from the sensor unit 430 to the patch image 200 and the optical path length from the sensor unit 430 to the reference chart 400.

Second Modification

Figure 22:
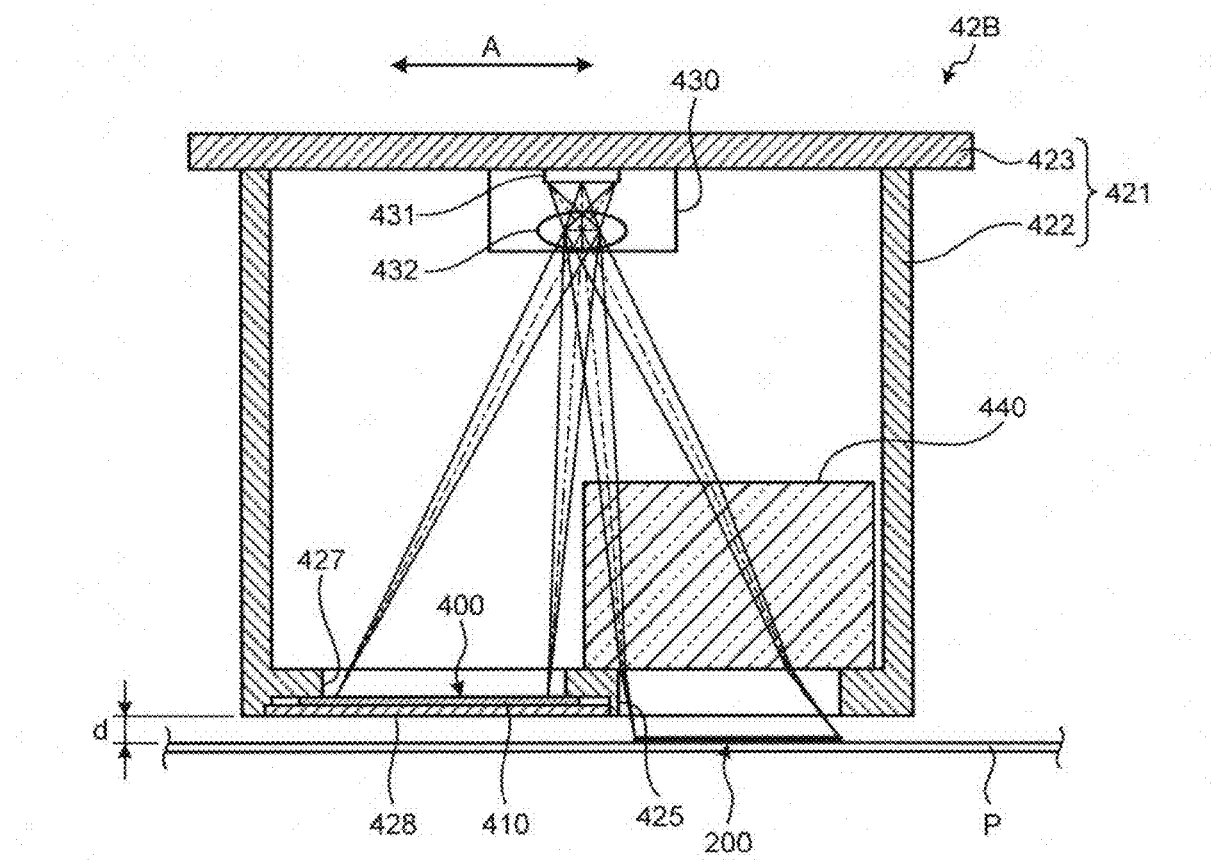
FIG. 22 is a vertical cross-sectional view of a color measuring camera according to a second modification.

FIG. 22 is a vertical cross-sectional view of the color measuring camera 42B according to the second modification, taken at the same position as the vertical cross-sectional view of the color measuring camera 42 illustrated in FIG. 4A.

In the color measuring camera 42B according to the second modification, similarly to the color measuring camera 42A according to the first modification, the chart plate 410 is disposed on the outer surface of the bottom surface 421a of the housing 421. However, while the chart plate 410 of the color measuring camera 42A according to the first modification is bonded to the bottom surface 421a of the housing 421 with an adhesive agent or the like so as to be integrated with the housing 421, the chart plate 410 of the color measuring camera 42B according to the second modification is detachably attached to the housing 421.

Specifically, for example, similarly to the color measuring camera 42A according to the first modification, a concave portion communicating with the opening 427 is formed on the outer surface of the bottom surface 421a of the housing 421, and the chart plate 410 is disposed in the concave portion. The color measuring camera 42B according to the second modification includes a holding member 428 that holds the chart plate 410 disposed in the concave portion by pressing the chart plate 410 from the outer side of the bottom surface 421a of the housing 421. The holding member 428 is detachably attached to the bottom surface 421a of the housing 421. Therefore, in the color measuring camera 42B according to the second modification, the chart plate 410 can easily be detached by detaching the holding member 428 from the bottom surface 421a of the housing 421.

As described above, in the color measuring camera 42B according to the second modification, the chart plate 410 is detachably attached to the housing 421 and can easily be detached. Therefore, when the chart plate 410 is deteriorated because of dirt or the like on the reference chart 400, the chart plate 410 can easily be replaced. Furthermore, when the shading correcting unit 452 described above obtains shading data for correcting the illuminance unevenness of illumination provided by the illumination light sources 426, by removing the chart plate 410 to dispose a white reference plate as a replacement and capturing an image of the white reference plate by the sensor unit 430, the shading data can easily be obtained.

Third Modification

Figure 23:
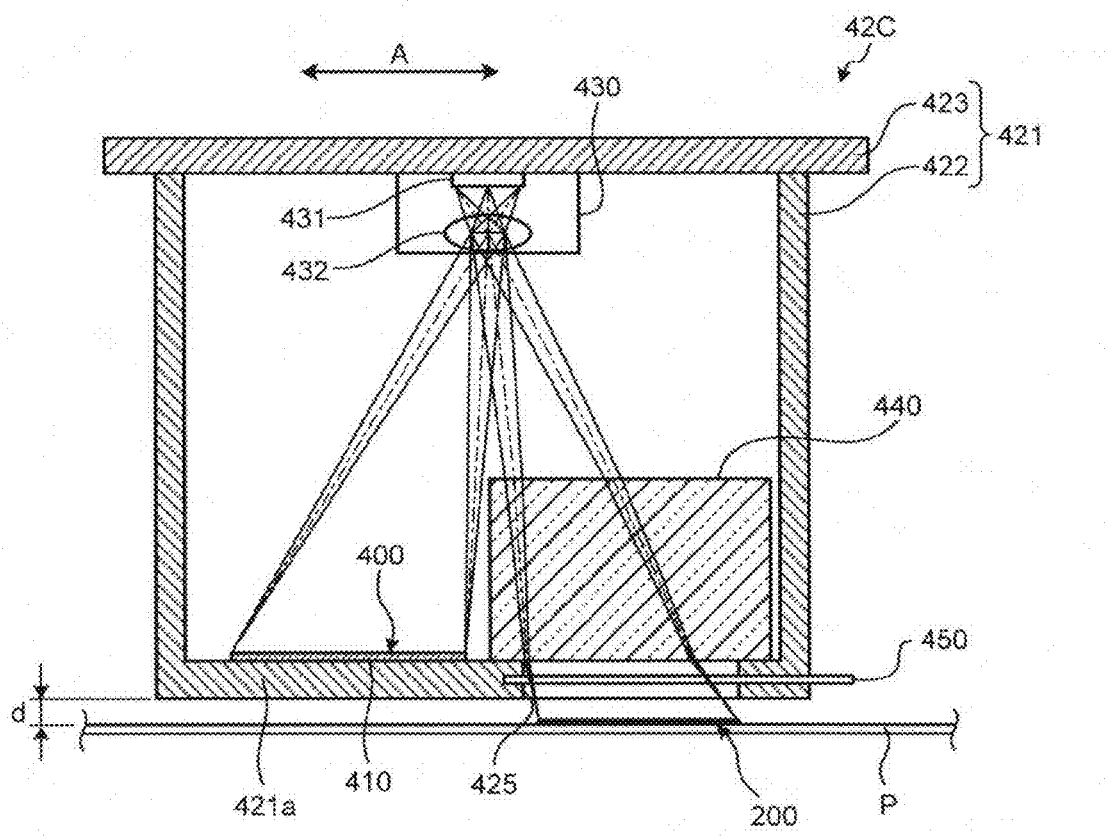
FIG. 23 is a vertical cross-sectional view of a color measuring camera according to a third modification.

FIG. 23 is a vertical cross-sectional view of the color measuring camera 42C according to the third modification, taken at the same position as the vertical cross-sectional view of the color measuring camera 42 illustrated in FIG. 4A.

In the color measuring camera 42C according to the third modification, a mist preventive transmission member 450 that closes the opening 425 is provided. As described above, the image forming apparatus 100 according to the embodiment is configured to form an image on the recording medium P by ejecting ink from the nozzle arrays of the print heads 6 mounted on the carriage 5 onto the recording medium P placed on the platen 22. Therefore, when ink is ejected from the nozzle arrays of the print head 6, minute ink particles in a mist form (hereinafter, the minute ink particles are described as "mist") are generated. If the mist generated by image formation is introduced to the inside of the housing 421 from the outside of the housing 421 of the color measuring camera 42 fixed to the carriage 5 via the opening 425, the mist introduced to the inside of the housing 421 may be attached to the sensor unit 430, the illumination light sources 426, or the optical-path-length changing member 440. As a result, it may become impossible to obtain accurate image data when color adjustment is performed for color measurement of the patch image 200. Therefore, in the color measuring camera 42C according to the third modification, the opening 425 arranged on the bottom surface 421a of the housing 421 is covered by the mist preventive transmission member 450 in order to prevent the mist generated by the image formation from being introduced into the housing 421.

The mist preventive transmission member 450 is a transparent optical element having a sufficient transmittance with respect to the illumination light sources 426, and is formed in a plate shape large enough to cover the entire opening 425. The mist preventive transmission member 450 is attached to a slit formed along the bottom surface 421a of the housing 421, and closes the entire surface of the opening 425 arranged on the bottom surface 421a of the housing 421. The slit to which the mist preventive transmission member 450 is attached is opened on the side surface of the housing 421. The mist preventive transmission member 450 is attached to the slit by being inserted through the side surface of the housing 421. The mist preventive transmission member 450 can be detached from the side surface of the housing 421, and therefore can be replaced appropriately when it gets dirty.

Fourth Modification

Figure 24:
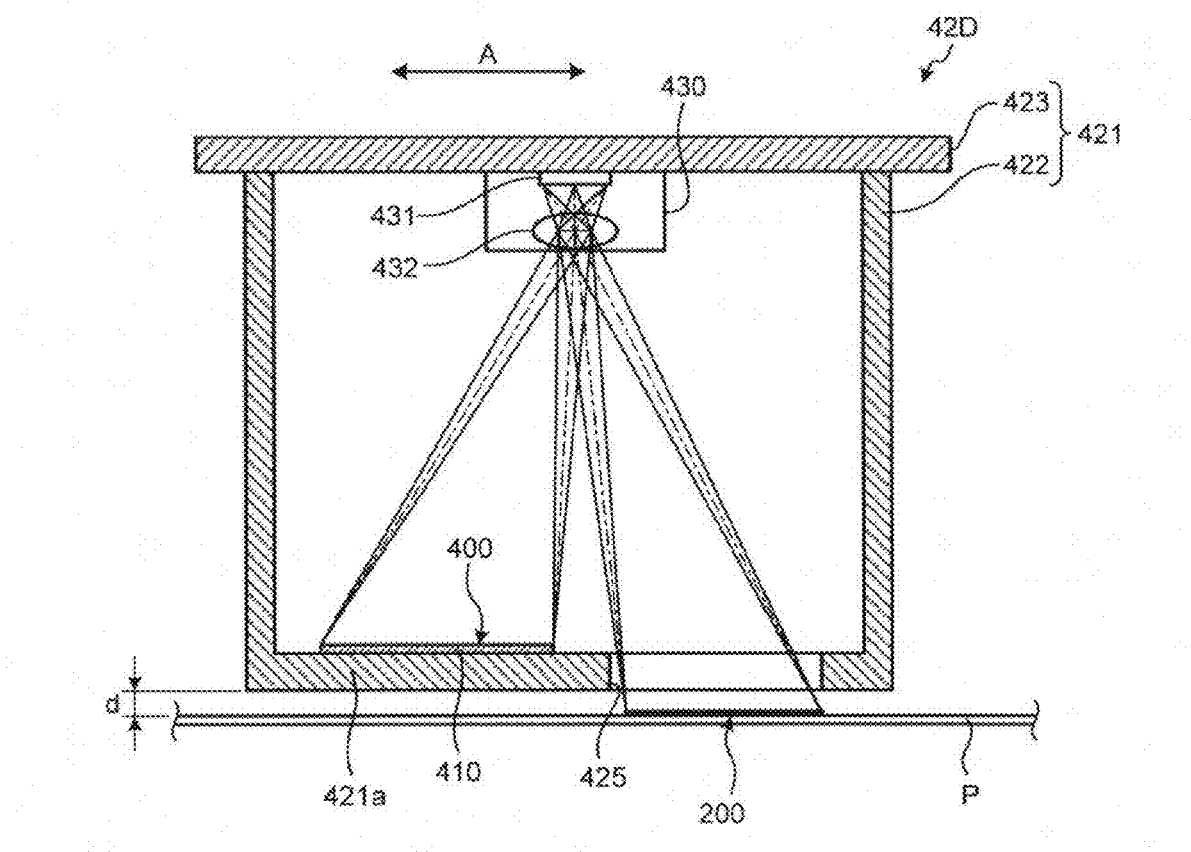
FIG. 24 is a vertical cross-sectional view of a color measuring camera according to a fourth modification.

FIG. 24 is a vertical cross-sectional view of the color measuring camera 42D according to the fourth modification, taken at the same position as the vertical cross-sectional view of the color measuring camera 42 illustrated in FIG. 4A.

The color measuring camera 42D according to the fourth modification does not include the optical-path-length changing member 440 inside the housing 421. As described above, the optical-path-length changing member 440 has a function to adjust the optical path length from the sensor unit 430 to the object (the patch image 200) to the optical path length from the sensor unit 430 to the reference chart 400. However, if a difference between the optical path lengths is within a range of the depth of field of the sensor unit 430, it is possible to capture an image in which both the object (the patch image 200) and the reference chart 400 are focused on even when there is a difference between the optical path lengths.

The difference between the optical path length from the sensor unit 430 to the object (the patch image 200) and the optical path length from the sensor unit 430 to the reference chart 400 becomes approximately a value obtained by adding the gap d to the thickness of the bottom surface 421a of the housing 421. Therefore, if the gap d is set to a sufficiently small value, the difference between the optical path length from the sensor unit 430 to the object (the patch image 200) and the optical path length from the sensor unit 430 to the reference chart 400 can fall within the range of the depth of field of the sensor unit 430. As a result, it becomes possible to remove the optical-path-length changing member 440 and reduce costs of the components.

The depth of field of the sensor unit 430 is a characteristic specific to the sensor unit 430 and is determined based on the aperture value of the sensor unit 430, a focal length of the imaging lens 432, the distance between the sensor unit 430 and an object, or other factors. In the color measuring camera 42D according to the fourth modification, the sensor unit 430 is designed such that when the gap d between the bottom surface 421a of the housing 421 and the recording medium P is set to a sufficiently small value of, for example, approximately 1 mm to 2 mm, the difference between the optical path length from the sensor unit 430 to the object (the patch image 200) and the optical path length from the sensor unit 430 to the reference chart 400 falls within the range of the depth of field.

Fifth Modification

Figure 25B:
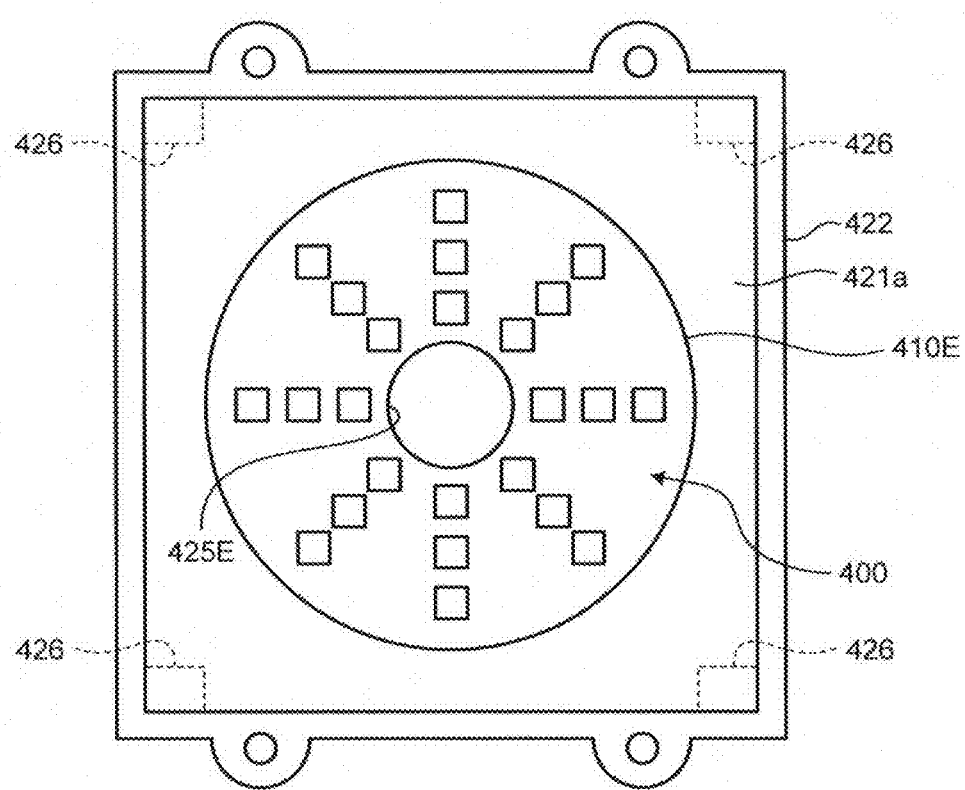
FIG. 25B is a plan view of a bottom surface of a housing of the color measuring camera according to the fifth modification viewed in X3 direction in FIG. 25A.

FIG. 25A is a vertical cross-sectional view of the color measuring camera 42E according to the fifth modification, taken at the same position as the vertical cross-sectional view of the color measuring camera 42 illustrated in FIG. 4A. FIG. 25B is a plan view of the bottom surface 421a of the housing 421 viewed in X3 direction in FIG. 25A. In FIG. 25B, vertically projected positions of the illumination light sources 426 on the bottom surface 421a of the housing 421 (the projected positions on the bottom surface 421a when vertically viewed) are indicated by dashed lines.

In the color measuring camera 42E according to the fifth modification, an opening 425E is arranged at a position in the vertical line extending from the sensor unit 430 toward the bottom surface 421a (that is, the center of the optical axis of the sensor unit 430) on the bottom surface 421a of the housing 421, and an image of the object (the patch image 200) is captured via the opening 425E. That is, in the color measuring camera 42E according to the fifth modification, the opening 425E for capturing an image of the object (the patch image 200) disposed outside the housing 421 is arranged at a position in approximately the center of the image-capturing range of the sensor unit 430.

Furthermore, in the color measuring camera 42E according to the fifth modification, a chart plate 410E on which the reference chart 400 is formed is disposed on the bottom surface 421a of the housing 421 so as to surround the periphery of the opening 425E. For example, the chart plate 410E is formed in a circular ring shape around the opening 425E, is bonded to the inner side of the bottom surface 421a of the housing 421 with an adhesive member or the like such that the surface opposite the surface on which the reference chart 400 is formed is used as a bonding surface, and is fixed to the housing 421.

In the color measuring camera 42E according to the fifth modification, four LEDs arranged at four corners of the inner periphery of the frame body 422 that forms a side wall of the housing 421 are used as the illumination light sources 426. The four LEDs used as the illumination light sources 426 are mounted on, for example, the inner surface of the base plate 423 together with the two-dimensional image sensor 431 of the sensor unit 430. By disposing the four LEDs used as the illumination light sources 426 in this manner, the object (the patch image 200) and the reference chart 400 can be illuminated under approximately the same conditions.

In the color measuring camera 42E according to the fifth modification configured as described above, the opening 425E for capturing an image of the object (the patch image 200) disposed outside the housing 421 is arranged in the vertical line extending from the sensor unit 430 on the bottom surface 421a of the housing 421, and the chart plate 410E on which the reference chart 400 is formed is disposed so as to surround the periphery of the opening 425E. Therefore, it is possible to reduce the size of the color measuring camera 42E and to appropriately capture images of the object (the patch image 200) and the reference chart 400.

Sixth Modification

Figure 26:
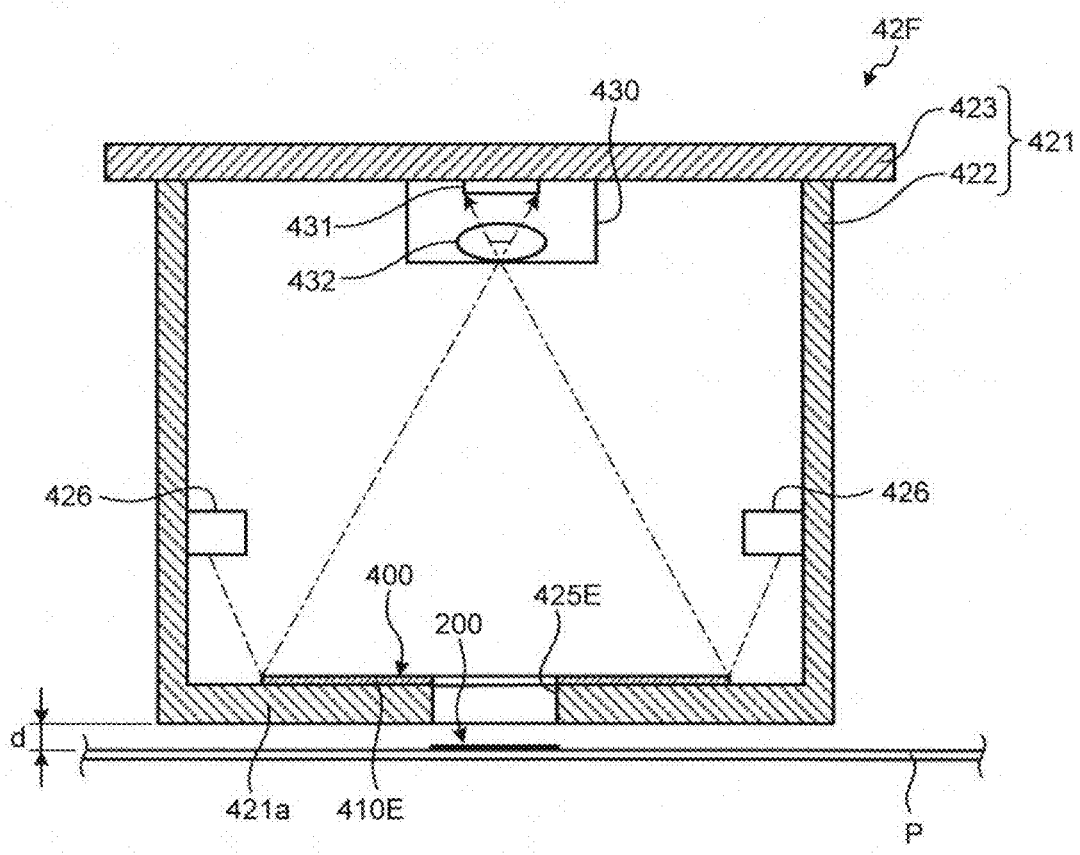
FIG. 26 is a vertical cross-sectional view of a color measuring camera according to a sixth modification.

FIG. 26 is a vertical cross-sectional view of the color measuring camera 42F according to the sixth modification, taken at the same position as the vertical cross-sectional view of the color measuring camera 42 illustrated in FIG. 4A.

In the color measuring camera 42F according to the sixth modification, similarly to the color measuring camera 42E according to the fifth modification, four LEDs disposed at four corners of the inner periphery of the frame body 422 are used as the illumination light sources 426. However, in the color measuring camera 42F according to the sixth modification, the four LEDs used as the illumination light sources 426 are disposed at the positions closer to the bottom surface 421a of the housing 421 than the positions of the LEDs of the color measuring camera 42E according to the fifth modification so that specular reflected light that is specularly reflected from the object (the patch image 200) or the reference chart 400 does not enter the two-dimensional image sensor 431 on the sensor unit 430.

At the position at which the specular reflected light from the illumination light sources 426 is incident on the sensor surface of the two-dimensional image sensor 431 of the sensor unit 430, it may be impossible to obtain accurate information because of saturation of pixel values. Therefore, if the illumination light sources 426 are arranged at the positions at which the specular reflected light specularly reflected from the object (the patch image 200) or the reference chart 400 is incident on the two-dimensional image sensor 431 of the sensor unit 430, it may be impossible to obtain information needed to perform color measurement on the object (the patch image 200). Therefore, in the color measuring camera 42F according to the sixth modification, as illustrated in FIG. 26, the four LEDs used as the illumination light sources 426 are disposed at the positions close to the bottom surface 421a of the housing 421 to prevent the specular reflected light specularly reflected from the object (the patch image 200) or the reference chart 400 from entering the two-dimensional image sensor 431 of the sensor unit 430. A dashed-line arrow in FIG. 26 indicates optical paths of the specular reflected light.

As described above, in the color measuring camera 42F according to the sixth modification, the illumination light sources 426 are disposed at the positions at which specular reflected light specularly reflected from the object (the patch image 200) or the reference chart 400 does not enter the two-dimensional image sensor 431 of the sensor unit 430. Therefore, it is possible to effectively prevent saturation of pixel values at the position at which an optical image of the object (the patch image 200) or the reference chart 400 is formed on the sensor surface of the two-dimensional image sensor 431. As a result, it is possible to appropriately capture images of the object (the patch image 200) and the reference chart 400.

Seventh Modification

Figure 27A:
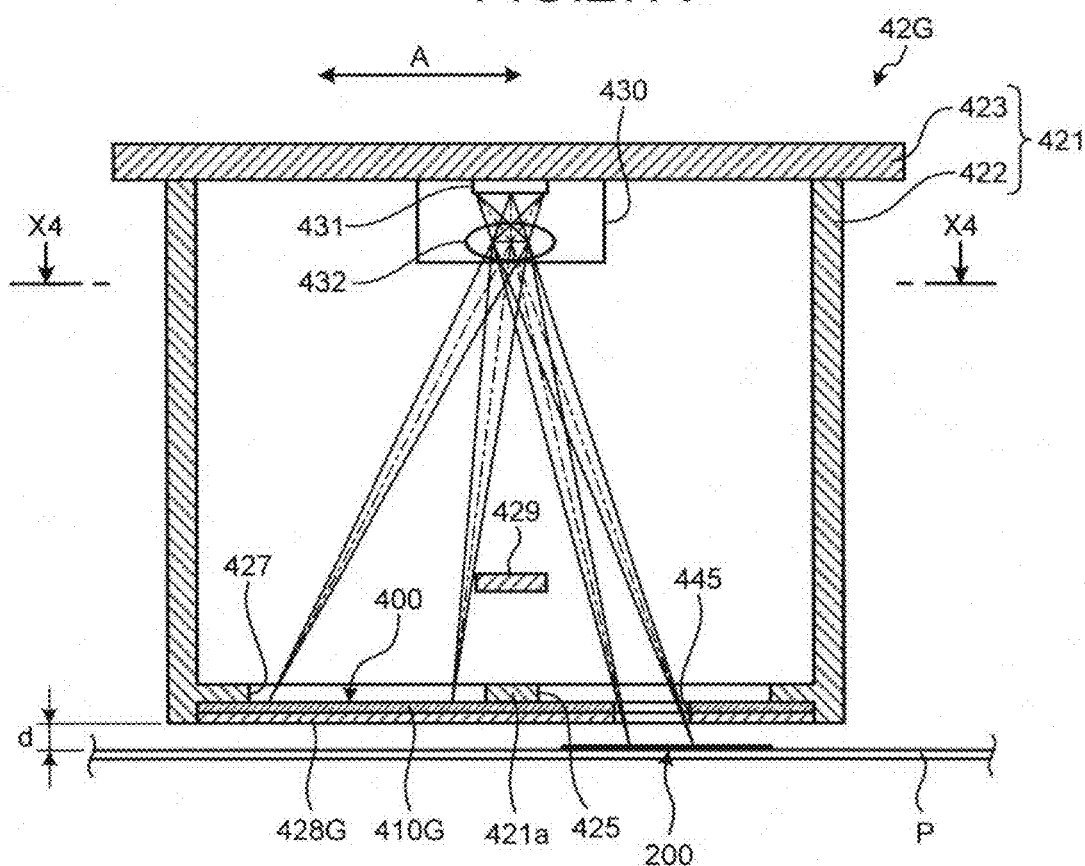
FIG. 27A is a vertical cross-sectional view of a color measuring camera according to a seventh modification.
Figure 27B:
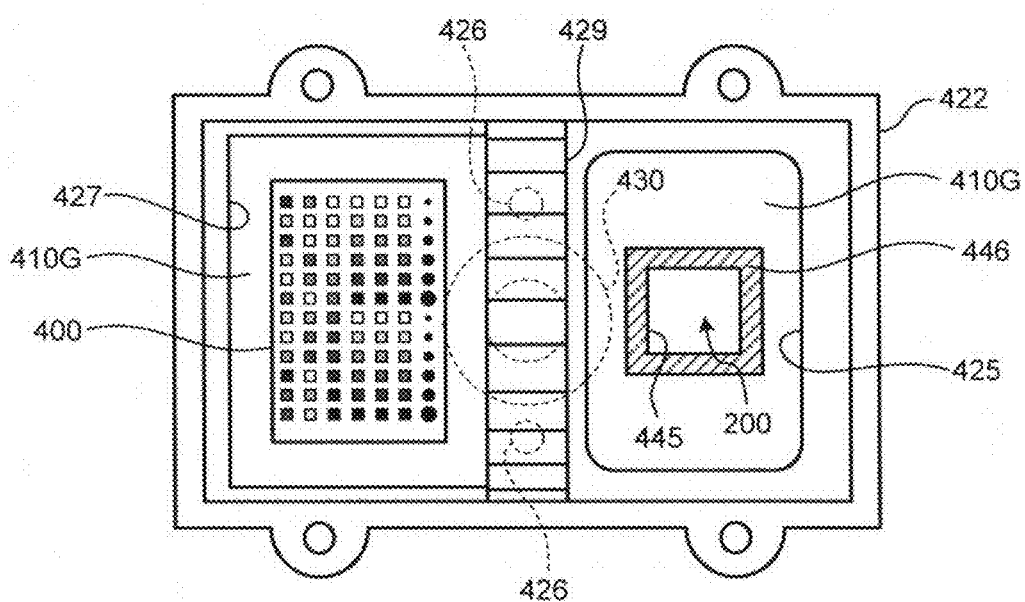
FIG. 27B is a plan view of a bottom surface of a housing of the color measuring camera according to the seventh modification viewed in X4 direction in FIG. 27A.

FIG. 27A is a vertical cross-sectional view of the color measuring camera 42G according to the seventh modification, taken at the same position as the vertical cross-sectional view of the color measuring camera 42 illustrated in FIG. 4A. FIG. 27B is a plan view of the bottom surface 421a of the housing 421 viewed in X4 direction in FIG. 27A. In FIG. 27B, vertically projected positions of the illumination light sources 426 and the sensor unit 430 on the bottom surface 421a of the housing 421 (the projected position on the bottom surface 421a when viewed vertically) are illustrated by dashed lines.

In the color measuring camera 42G according to the seventh modification, a chart plate 410G on which the reference chart 400 is formed has approximately the same size as that of the bottom surface 421a of the housing 421. The chart plate 410G is, similarly to the color measuring camera 42B according to the second modification, disposed on the outer surface of the bottom surface 421a and held by a holding member 428G. The holding member 428G has, similarly to the chart plate 410G, approximately the same size as that of the bottom surface 421a and is detachably attached to the bottom surface 421a. As described above, in the color measuring camera 42G according to the seventh modification, the chart plate 410G and the holding member 428G having approximately the same sizes as that of the bottom surface 421a of the housing 421 are disposed on the outer surface of the bottom surface 421a, and the chart plate 410G and the holding member 428G closes the opening 425 and the opening 427.

The reference chart 400 is formed at a position opposite the opening 427 on the chart plate 410G. Therefore, similarly to the color measuring camera 42B according to the second modification, the sensor unit 430 can capture an image of the reference chart 400 formed on the chart plate 410G via the opening 427. Furthermore, an opening 445 communicating with the chart plate 410G and the holding member 428G is arranged at a position opposite the opening 425 on the chart plate 410G and the holding member 428G. Therefore, the sensor unit 430 can capture an image of the patch image 200 as an object being a color measurement target via the opening 425 and the opening 445. As illustrated in FIG. 27B, a black region 446 colored in black for preventing flare is provided on the periphery of the opening 445 of the chart member 410G. A region excluding the reference chart 400, the opening 445, and the black region 446 in the chart plate 410G has a predetermined color (for example, white as a high-luminance achromatic color) similarly to the background region of the reference chart 400.

In the color measuring camera 42G according to the seventh modification, a diffusion plate 429 is disposed between the bottom surface 421a of the housing 421 and both of the sensor unit 430 and the illumination light sources 426 in order to prevent illumination light (specular reflected light) which is emitted from the illumination light sources 426 and specularly reflected by the bottom surface 421a from entering the two-dimensional image sensor 431 of the sensor unit 430. For example, the diffusion plate 429 is formed in a long shape extending along an arrangement direction of two LEDs used as the illumination light sources 426, and both end portions of the diffusion plate 429 in the longitudinal direction are fixed to the side surface of the frame body 422. The diffusion plate 429 includes a plurality of diffusing surfaces on the surface opposite the sensor unit 430 and the illumination light source 426. The diffusing surfaces are inclined for diffusing the illumination light emitted by the illumination light sources 426 in directions different from the direction toward the sensor unit 430. It is sufficient that the diffusion plate 429 can prevent the specular reflected light from entering the two-dimensional image sensor 431 of the sensor unit 430. Therefore, for example, instead of providing the diffusing surfaces, the surface of the diffusion plate 429 opposite the sensor unit 430 and the illumination light source 426 may be processed to absorb light by being colored in black or may be processed to diffusely reflect light by being formed as a rough surface with fine fibers.

Furthermore, similarly to the color measuring camera 42D according to the fourth modification, the color measuring camera 42G according to the seventh modification does not include the optical-path-length changing member 440 inside the housing 421.

In the color measuring camera 42G according to the seventh modification, the chart plate 410G having approximately the same size as that of the bottom surface 421a of the housing 421 occupies most of the image-capturing range of the sensor unit 430. Furthermore, in the chart plate 410G, a region excluding the reference chart 400, the opening 445, and the black region 446 is colored in a predetermined color. Accordingly, the image-capturing range of the sensor unit 430 contains a number of regions in the predetermined color. Therefore, it is possible to obtain the correction data used for the shading correction performed by the shading correcting unit 452 by using the image data output by the sensor unit 430 with higher accuracy.

Figure 28:
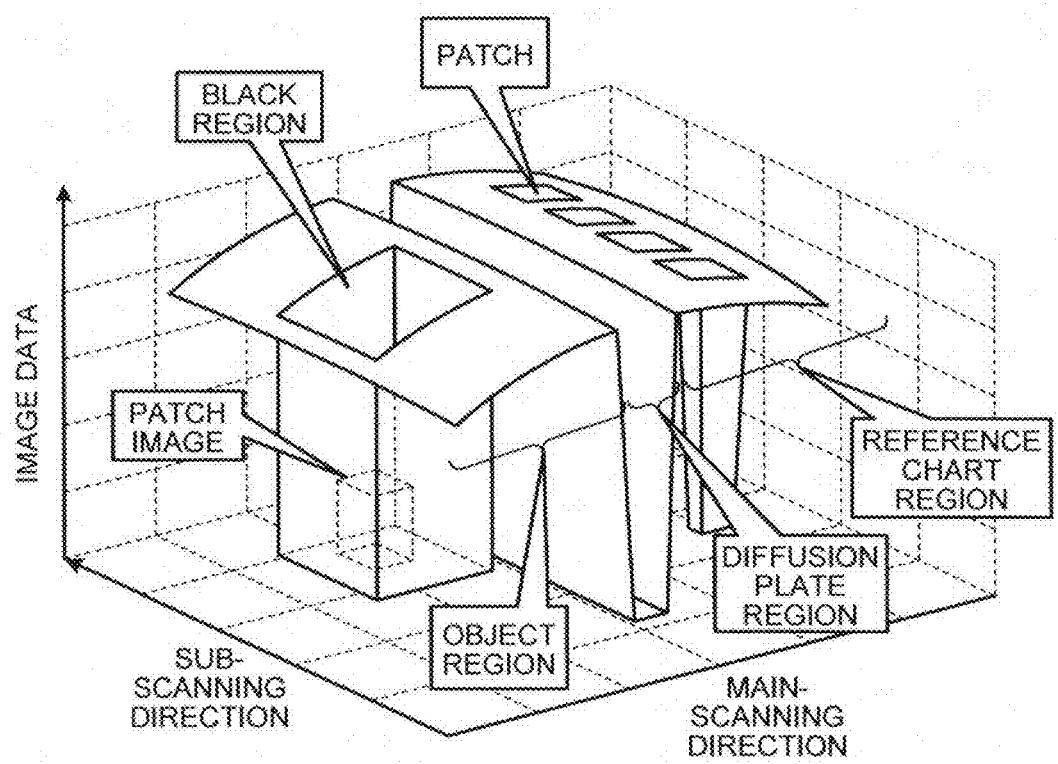
FIG. 28 is a three-dimensional diagram illustrating an example of image data obtained by capturing an image of a patch image as an object by the color measuring camera of the seventh modification.

With reference to FIG. 28, a specific example of a method of generating the correction data by using the color measuring camera 42G according to the seventh modification will be explained. In the example, when the correction data generating unit 52 of the color measurement control unit 50 generates the correction data, it is not necessary to capture an image of the white reference member by using the sensor unit 430 of the color measuring camera 42G. That is, in the example, the correction data is generated by interpolating the image data of the object region, and therefore, the correction data does not depend on the object. In the following, for convenience of explanation, it is assumed that an image of the patch image 200 is captured as the object.

FIG. 28 is a three-dimensional diagram illustrating an example of image data obtained by capturing an image of the patch image 200 as the object by the color measuring camera 42G according to the seventh modification. The image data output by the sensor unit 430 is RGB image data; however, image data of only one color is illustrated in FIG. 28. In FIG. 28, for simplicity, image data obtained when only four patches are arranged in the reference chart 400 is illustrated by way of example. In FIG. 28, for convenience, the position of a reference chart region and the position of an object region in the main-scanning direction are interchanged from those illustrated in FIG. 8.

The extracting unit 521 of the correction data generating unit 52 extracts image data of a surrounding region in the predetermined color, which is used as a basis for the correction data, from the image data output by the sensor unit 430. Specifically, the extracting unit 521 removes image data of a region stored in advance (a predetermined region in the image-capturing range of the sensor unit 430) from the image data output by the sensor unit 430. As described above, in the color measuring camera 42G according to the seventh modification, the diffusion plate 429 is disposed between the bottom surface 421a of the housing 421 and both of the sensor unit 430 and the illumination light source 426. Therefore, in the image-capturing range of the sensor unit 430, a region where the illumination light is diffused by the diffusion plate 429 (hereinafter, described as a diffusing plate region) is present between a reference chart capturing region for capturing an image of the reference chart 400 and an object capturing region for capturing an image of the patch image 200 as an object being a color measurement target. The position of the diffusing plate region in the image-capturing range of the sensor unit 430 can be obtained based on the position of the diffusion plate 429 in the color measuring camera 42G. Therefore, by storing the position of the diffusing plate region in advance, the image data of the diffusing plate region can be removed from the image data output by the sensor unit 430.

Subsequently, the extracting unit 521 specifies the position of each of the patches of the reference chart 400 (including the dot-diameter measurement pattern array 406 and the distance measurement line 405) by using the chart position specification markers 407 of the reference chart 400, and removes the image data of the region of each of the patches from the image data output by the sensor unit 430. Furthermore, the extracting unit 521 detects the black region 446 arranged on the periphery of the opening 445 of the chart plate 410G and removes image data of the black region 446 and image data of the inside of the black region 446 from the image data output by the sensor unit 430. As a result, the image data of the surrounding region formed of only the regions in the predetermined color in the chart plate 410G is extracted. Similarly to the above example, the extracting unit 521 may extract the image data of the surrounding region by comparing image data of all the regions in the image-capturing range output by the sensor unit 430 with a predetermined threshold and removing regions in which image data is less than the threshold.

The interpolating unit 522 of the correction data generating unit 52 generates the correction data by assuming that the diffusing plate region, the regions of the patches of the reference chart 400, the black region 446, and the region inside the black region 446 are in the predetermined color and by interpolating image data of these regions with respect to the image data of the surrounding region extracted by the extracting unit 521. Specifically, the interpolating unit 522 obtains, for example, an approximate equation by approximating the image data of the surrounding region extracted by the extracting unit 521 by a low-order (secondary or tertiary) polynomial, and applying the approximate equation to the diffusing plate region, the regions of the patches of the reference chart 400, the black region 446, and the region inside the black region 446 to interpolate the image data in the regions on the assumption that the regions are in the predetermined color. The interpolating unit 522 may interpolate the image data in the regions of the patches of the reference chart 400, the black region 446, and the region inside the black region 446 by using, for example, secondary spline interpolation.

Through the interpolation of the image data by the interpolating unit 522, the correction data similar to the correction data illustrated in FIG. 9 is generated from the image data illustrated in FIG. 28. The storage control unit 523 stores the correction data in the correction data storage memory 47 of the color measuring camera 42. When color measurement is performed on the patch image 200, the shading correcting unit 452 of the image processing unit 45 performs the shading correction on the image data output by the sensor unit 430 by using the correction data stored in the correction data storage memory 47.

In the above example, the image data of the surrounding region is obtained by removing the image data of the regions of the patches arranged in the reference chart 400 from the image data output by the sensor unit 430. However, when intervals between the patches arranged in the reference chart 400 are so narrow that the image data of the regions between the patches cannot appropriately be obtained, it may be possible to remove the image data of the entire region of the reference chart 400 enclosed by the distance measurement line 405 from the image data output by the sensor unit 430 to extract the image data of the surrounding region.

Furthermore, in the above example, the image data of the surrounding region including both the reference chart region and the object region is extracted from the image data output by the sensor unit 430 to generate the correction data. However, in the color measuring camera 42G according to the seventh modification, as described above, the illumination light sources 426 are disposed between the reference chart region and the object region and the reference chart region and the object region are uniformly illuminated by the illumination light sources 426, so that the illuminance unevenness occurs in both of the regions in an approximately symmetric manner. Therefore, it may be possible to generate the correction data by using one of the reference chart region and the object region as a target and interpolate the correction data in the other region by using the generated correction data.

As described above, in the color measuring camera 42G according to the seventh modification, similarly to the color measuring camera 42B according to the second modification, the chart plate 410G is detachably attached to the housing 421 and the chart plate 410G can easily be removed. Therefore, when the chart plate 410G is deteriorated because of dirt or the like of the reference chart 400, the chart plate 410G can easily be replaced. Furthermore, in the color measuring camera 42G according to the seventh modification, the diffusion plate 429 is disposed between the bottom surface 421a of the housing 421 and both of the sensor unit 430 and the illumination light source 426 so that the specular reflected light can be prevented from entering the two-dimensional image sensor 431 of the sensor unit 430. Therefore, it is possible to appropriately capture images of the object (the patch image 200) and the reference chart 400 and to perform color measurement on the patch image 200 with higher accuracy.

Moreover, in the color measuring camera 42G according to the seventh modification, a number of regions in the predetermined color are contained in the image-capturing range of the sensor unit 430. Therefore, the correction data generating unit 52 of the color measurement control unit 50 generates the correction data used for the shading correction performed by the shading correcting unit 452 by using the image data of the surrounding region in the predetermined color obtained from the image data output by the sensor unit 430. As a result, it is possible to obtain the correction data with higher accuracy compared with the case that the color measuring camera 42 described above is used.

Eighth Modification

Figure 29:
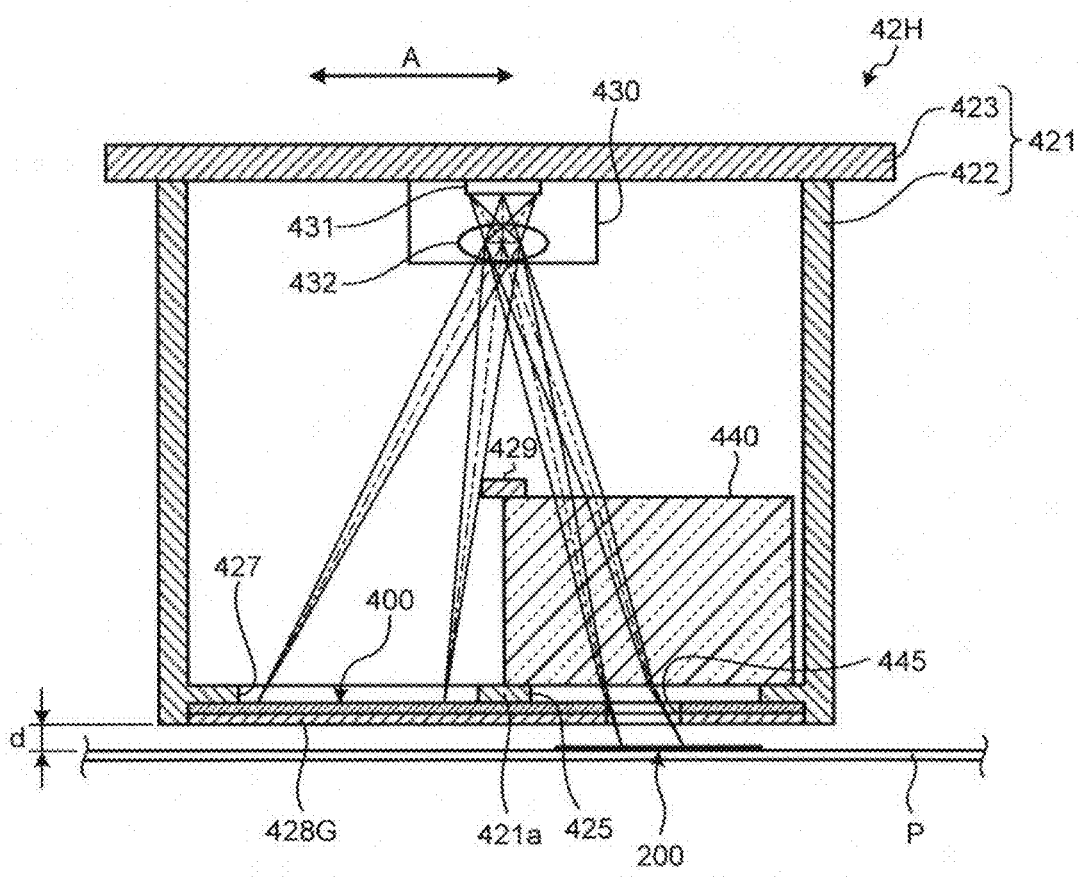
FIG. 29 is a vertical cross-sectional view of a color measuring camera according to an eighth modification.

FIG. 29 is a vertical cross-sectional view of the color measuring camera 42H according to the eighth modification, taken at the same position as the vertical cross-sectional view of the color measuring camera 42 illustrated in FIG. 4A.

The color measuring camera 42H according to the eighth modification includes the optical-path-length changing member 440 in addition to the configuration of the color measuring camera 42G according to the seventh modification. Similarly to the color measuring camera 42 described above, the optical-path-length changing member 440 is arranged so as to close the opening 425 from the inside of the housing 421. The color measuring camera 42H according to the eighth modification includes the diffusion plate 429 on an upper edge portion of the optical-path-length changing member 440. By providing the diffusion plate 429 on the upper edge portion of the optical-path-length changing member 440, it is possible to prevent specular reflected light from entering the two-dimensional image sensor 431 of the sensor unit 430 and to prevent the edge of the optical-path-length changing member 440 from being captured as a line in the image captured by the sensor unit 430.

Even in the color measuring camera 42H according to the eighth modification, similarly to the color measuring camera 42G according to the seventh modification described above, a number of regions in a predetermined color are contained in the image-capturing range of the sensor unit 430. Therefore, similarly to the color measuring camera 42G according to the seventh modification, image data of the surrounding region in the predetermined color is extracted from the image data output by the sensor unit 430 and image data in regions having colors other than the predetermined color is interpolated so that the correction data used for the shading correction performed by the shading correcting unit 452 can be obtained with high accuracy.

Furthermore, in the color measuring camera 42H according to the eighth modification, the shading correction is performed on the image data output by the sensor unit 430 by using the acquired correction data. Therefore, the reduction in the light intensity caused by the optical-path-length changing member 440 can also be corrected appropriately. Specifically, in the color measuring camera 42H according to the eighth modification, because the optical-path-length changing member 440 is provided so as to close the opening 425, the light intensity in the object region becomes lower than that in the reference chart region in the image-capturing range of the sensor unit 430. However, the correction data generated by the above method reflects the reduction in the light intensity in the object region caused by the optical-path-length changing member 440. Therefore, by performing the shading correction for correcting the illuminance unevenness by using the correction data, it is possible to appropriately correct the reduction in the light intensity caused by the optical-path-length changing member 440.

When the optical-path-length changing member 440 is highly transparent, and the level of the reduction in the light intensity caused by the optical-path-length changing member 440 is negligible, it may be possible to generate the correction data by using only one of the reference chart region and the object region as a target and interpolate the correction data in the other region by using the generated correction data, similarly to the seventh modification described above.

Modification of the Color Measurement Method on Patch Image

With reference to FIG. 30 to FIG. 36, a modification of the color measurement method performed on the patch image 200 by the image forming apparatus 100 according to the embodiment will be explained in detail below. The color measurement method according to the modification includes a pre-process that is performed when the image forming apparatus 100 is in the initial state (the initial state due to manufacturing or overhaul) and a color measurement process that is performed for adjusting colors of the image forming apparatus 100.

Figure 30:
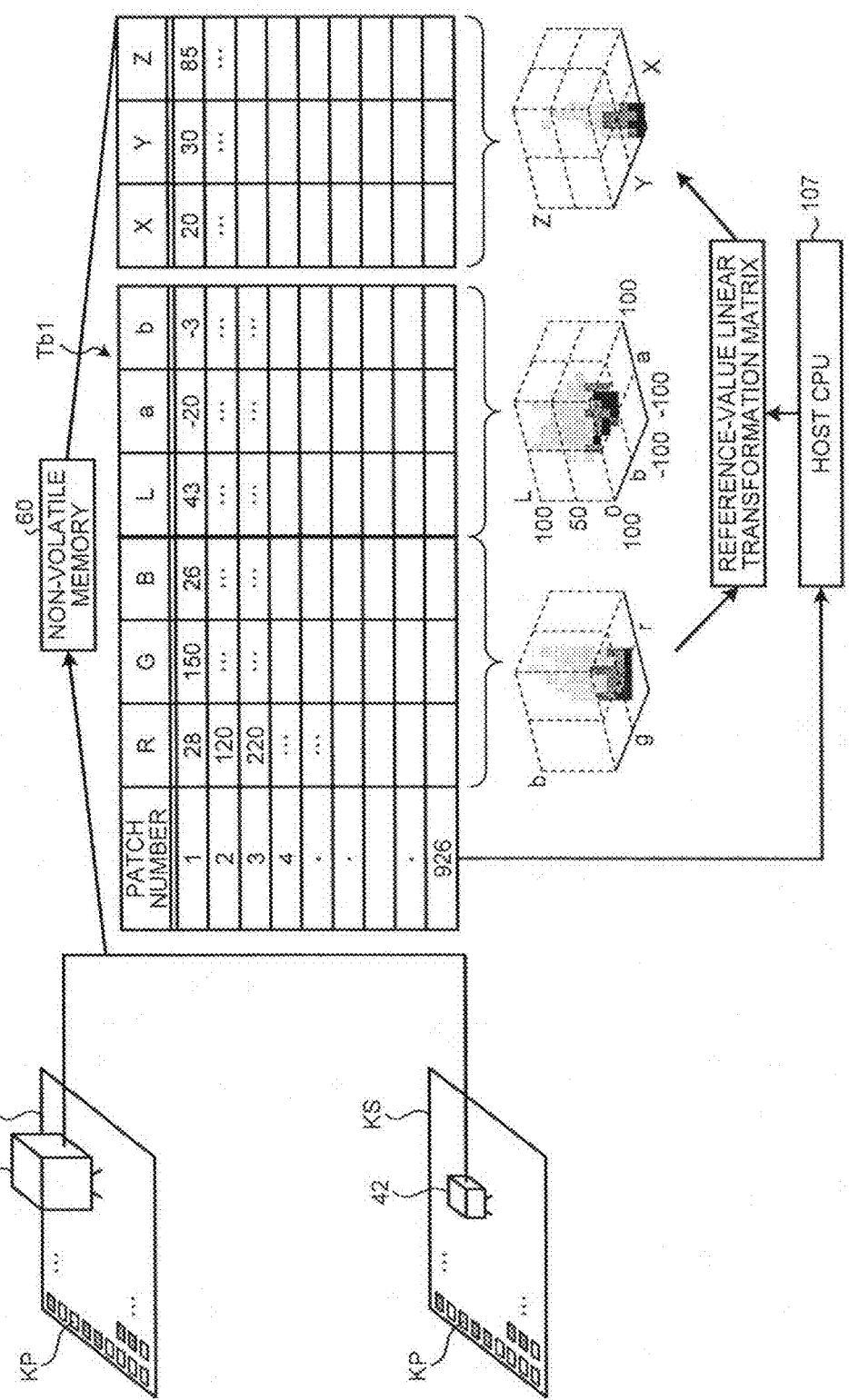
FIG. 30 is a diagram for explaining a process for acquiring a reference colorimetric value and a reference RGB value and a process for generating a reference-value linear transformation matrix.

FIG. 30 is a diagram for explaining a process for acquiring a reference colorimetric value and a reference RGB value and a process for generating a reference-value linear transformation matrix. The process illustrated in FIG. 30 is performed as the pre-process. In the pre-process, a reference sheet KS in which a plurality of reference patches KP are arranged is used. The reference patches KP in the reference sheet KS are the same as the patches in the reference chart 400 provided in the color measuring camera 42.

At least one of the Lab value and the XYZ value that are the colorimetric values of each of the reference patches KP of the reference sheet KS (in the example in FIG. 30, both of the Lab value and the XYZ value) is stored in, for example, a memory table Tb1 provided in a non-volatile memory 60 in the color measurement control unit 50 in association with a patch number. The colorimetric value of each of the reference patches KP is obtained in advance by color measurement using a spectroscope BS. When the colorimetric value of the reference patch KP is already obtained, the value can be used as it is. Hereinafter, the colorimetric value of the reference patch KP stored in the memory table Tb1 is described as a "reference colorimetric value".

The reference sheet KS is set on the platen 22 and the movement of the carriage 5 is controlled so that the color measuring camera 42 captures images of the reference patches KP in the reference sheet KS as objects. Then, the RGB value of the reference patches KP obtained by image capturing performed by the color measuring camera 42 is stored in the memory table Tb1 in the non-volatile memory in association with the patch numbers. Specifically, in the memory table Tb1, the colorimetric value and the RGB value of each of the reference patches KP arranged in the reference sheet KS are stored in association with the patch number of each of the reference patches KP. Hereinafter, the RGB values of the reference patches KP stored in the memory table Tb1 are described as "reference RGB values". The reference RGB values reflect the characteristics of the color measuring camera 42.

When the reference colorimetric values and the reference RGB values of the reference patches KP are stored in the memory table Tb1 of the non-volatile memory 60, the host CPU 107 of the image forming apparatus 100 generates a reference-value linear transformation matrix for interconverting the XYZ value being the reference colorimetric value associated with the same patch number and the reference RGB value, and stores the reference-value linear transformation matrix in the non-volatile memory 60. When only the Lab value is stored in the memory table Tb1 as the reference colorimetric value, the Lab value is converted into the XYZ value by using a known conversion equation for converting the Lab value into the XYZ value, and then the reference-value linear transformation matrix is generated.

Figures 31A, 31B:
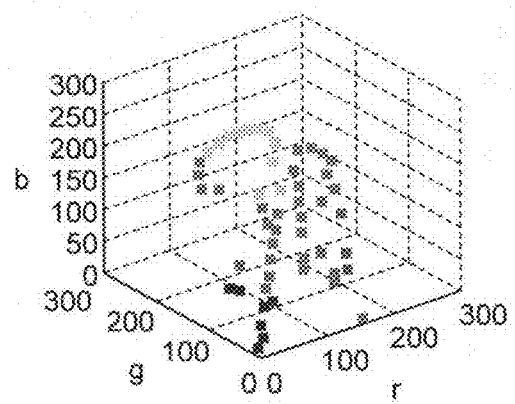
FIGS. 31A and 31B are diagrams illustrating an example of an initial reference RGB value.

When the color measuring camera 42 captures images of the reference patches KP in the reference sheet KS, an image of the reference chart 400 arranged in the color measuring camera 42 is simultaneously captured. The RGB value of each of the patches of the reference chart 400 obtained by image capturing is also stored in the memory table Tb1 of the non-volatile memory 60 in association with the patch number. The RGB values of the patches of the reference chart 400 stored in the memory table Tb1 through the pre-process are described as "initial reference RGB values". FIGS. 31A and 31B are diagrams illustrating an example of the initial reference RGB value. FIG. 31A illustrates the initial reference RGB value $(R_d G_d B_d)$ stored in the memory table Tb1, in which the initial reference RGB value $(R_d G_d B_d)$, an initial reference Lab value $(L_d a_d b_d)$ obtained by converting the initial reference RGB value $(R_d G_d B_d)$ into the Lab value, and an initial reference XYZ value $(X_d Y_d Z_d)$ obtained by converting the XYZ value are stored in an associated manner. FIG. 31B is a scatter diagram, in which the initial reference RGB values of the patches of the reference chart 400 are plotted.

After the pre-process described above is completed, the image forming apparatus 100 causes the host CPU 107 to control movement of the carriage 5 in the main-scanning direction, causes the sheet conveying unit 112 to control conveyance of the recording medium P and drive of the print head 6 to intermittently convey the recording medium P, and controls ejection of ink from the print head 6 to output an image onto the recording medium, based on image data or print settings input from an external apparatus. At this time, the ejection amount of ink from the print head 6 may change depending on the characteristics specific to the devices or a temporal change of the devices. If the ejection amount of ink changes, an image is formed in a color different from a color desired by a user, so that the color reproducibility is reduced. Therefore, the image forming apparatus 100 performs a color measurement process for obtaining the colorimetric value of the patch image 200 at a predetermined timing for the color adjustment. The image forming apparatus 100 performs the color adjustment based on the colorimetric value obtained by the color measurement process in order to improve the color reproducibility.

Figure 32:
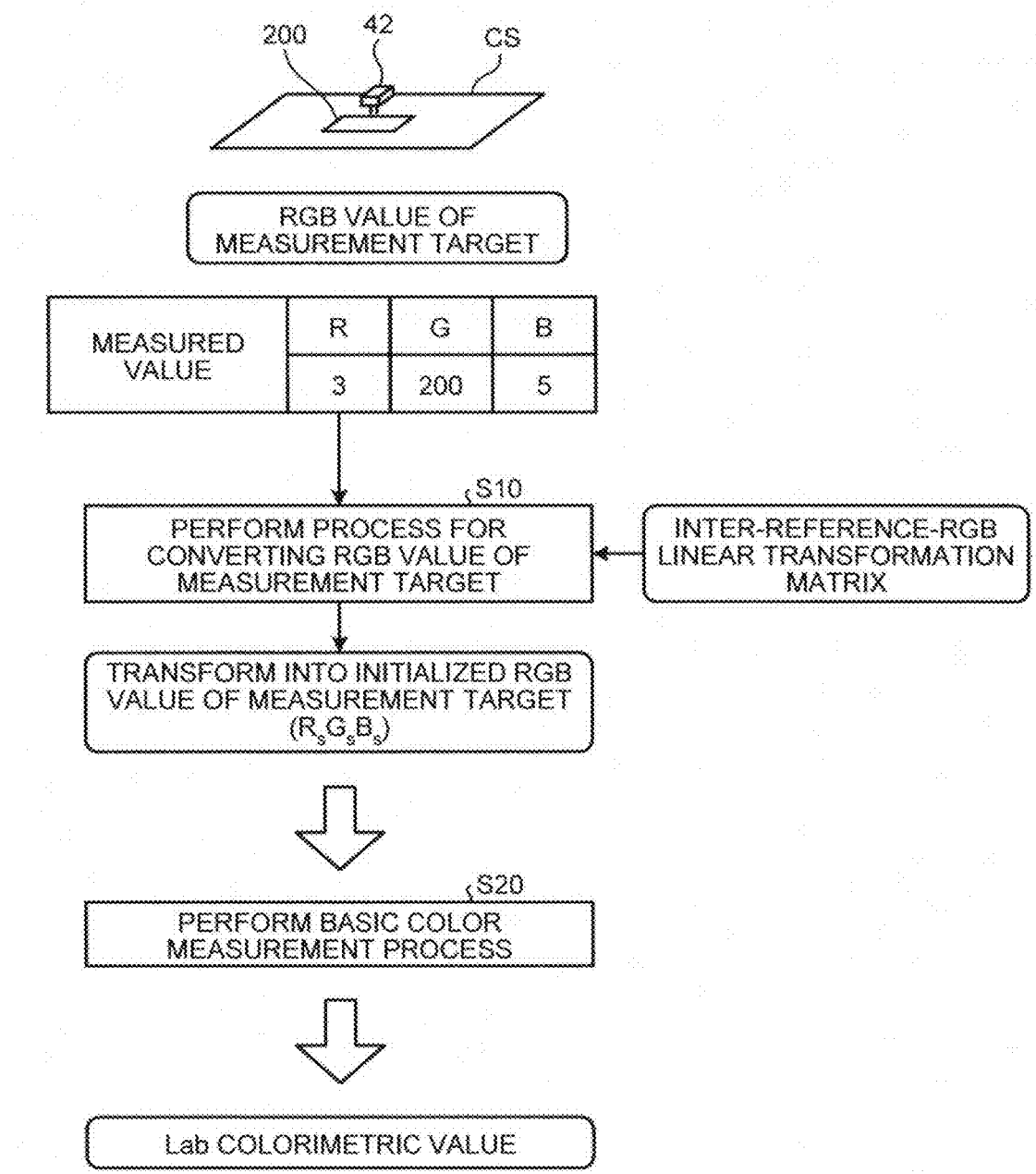
FIG. 32 is a diagram for explaining the overview of a color measurement process.

FIG. 32 is a diagram for explaining the overview of the color measurement process. When performing color adjustment, the image forming apparatus 100 ejects ink from the print head 6 onto the recording medium P set on the platen 22 so as to form the patch image 200 being a color measurement target. In the following, the recording medium P on which the patch image 200 is formed is referred to as an "adjustment sheet CS". On the adjustment sheet CS, the patch image 200 is formed, in which the output characteristics of the image forming apparatus 100 at the time of adjustment are reflected, and in particular, the output characteristics of the print head 6 are reflected. The image data used for forming the patch image 200 being a color measurement target is stored in advance in the non-volatile memory 60 or the like.

As illustrated in FIG. 32, when the adjustment sheet CS is set on the platen 22 or when the adjustment sheet CS is maintained on the platen 22 without being discharged after being generated, the image forming apparatus 100 controls movement of the carriage 5 to move the color measuring camera 42 to a position opposite the patch image 200 formed on the adjustment sheet CS placed on the platen 22. Then, the color measuring camera 42 simultaneously captures images of the patch image 200 and the reference chart 400 provided on the color measuring camera 42. The image data of the patch image 200 and the image data of the reference chart 400 that are simultaneously captured by the color measuring camera 42 are subjected to necessary image processing by the image processing unit 45. Thereafter, the pieces of the image data are sent to the color measurement control unit 50 and temporarily stored in the frame memory 51. Among the pieces of the image data simultaneously captured by the color measuring camera 42 and temporarily stored in the frame memory 51, the image data of the patch image 200 (the RGB value) is described as "a measurement target RGB value", and the image data of the patches of the reference chart 400 (the RGB value) is described as "a measurement reference RGB value $(R_{ds}G_{ds}B_{ds})$". "The measurement reference RGB value $(R_{ds}G_{ds}B_{ds})$" is stored in the non-volatile memory 60 or the like.

The colorimetric value arithmetic unit 53 1 of the color measurement control unit 50 performs a process for converting the measurement target RGB value temporarily stored in the frame memory 51 into an initialized RGB value of measurement target $(R_sG_sB_s)$ by using an inter-reference-RGB linear transformation matrix to be described later (Step S10). The initialed RGB value of measurement target $(R_sG_sB_s)$ is obtained by removing the influence of a temporal change that occurs in the imaging conditions of the color measuring camera 42 between the initial state in which the pre-process is performed and the time of adjustment at which the color measurement process is performed, for example, the influence of a temporal change in the illumination light source 426 or the two-dimensional image sensor 431, from the measurement target RGB value.

Thereafter, the colorimetric value calculating unit 531 performs a basic color measurement process to be described later on the initialized RGB value of measurement target $(R_sG_sB_s)$ converted from the measurement target RGB value (Step S20), thereby acquiring a Lab value being a colorimetric value of the patch image 200 being a color measurement target.

Figure 33:
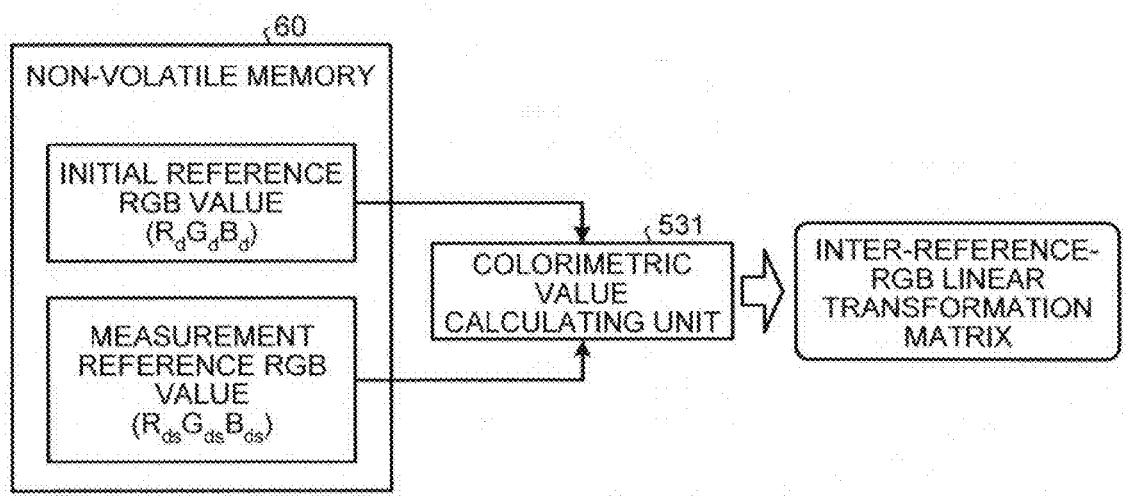
FIG. 33 is a diagram for explaining a process for generating an inter-reference-RGB linear transformation matrix.
Figure 34:
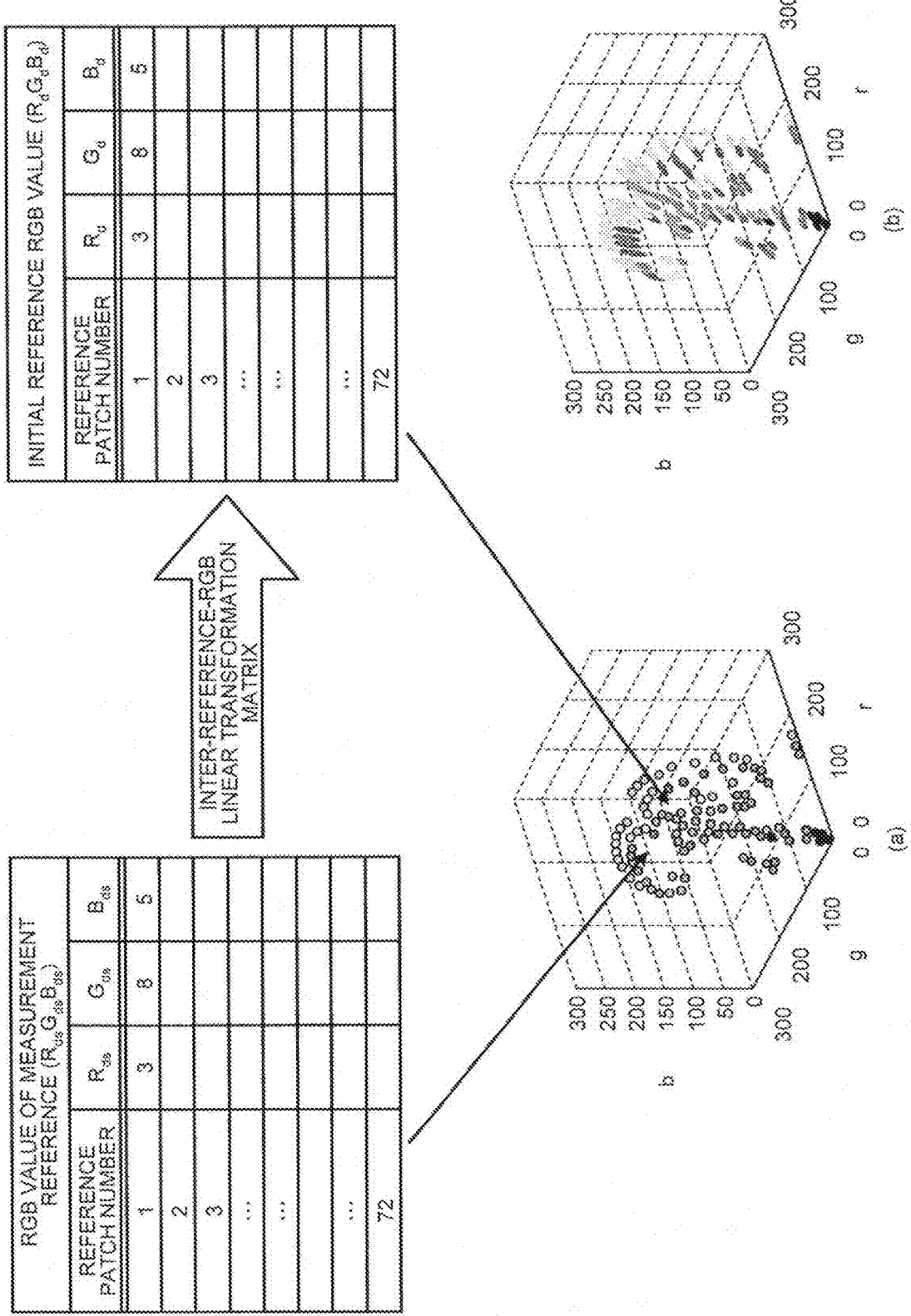
FIG. 34 is a diagram illustrating a relation between the initial reference RGB value and a colorimetric reference RGB value.

FIG. 33 is a diagram for explaining a process for generating an inter-reference-RGB linear transformation matrix. FIG. 34 is a diagram illustrating a relation between an initial reference RGB value and the measurement reference RGB value. The colorimetric value calculating unit 531 generates the inter-reference-RGB linear transformation matrix used for conversion before performing a process for converting the color measurement target RGB value into the initialized RGB value of measurement target $(R_sG_sB_s)$ (Step S10). Specifically, as illustrated in FIG. 33, the colorimetric value calculating unit 531 reads the initial reference RGB value $(R_dG_dB_d)$, which is obtained by the pre-process when the image forming apparatus 100 is in the initial state, and the measurement reference RGB value $(R_{ds}G_{ds}B_{ds})$, which is obtained by adjustment, from the non-volatile memory 60, and generates the inter-reference-RGB linear transformation matrix used for converting the measurement reference RGB value $R_{ds}G_{ds}B_{ds}$ into the initial reference RGB value $R_dG_dB_d$. Then, the colorimetric value calculating unit 531 stores the generated inter-reference-RGB linear transformation matrix in the non-volatile memory 60.

In FIG. 34, white points illustrated in (a) of FIG. 34 are points at which the initial reference RGB values RdGdBd are plotted on the rgb space, and black points are points at which the measurement reference RGB values $R_{ds}G_{ds}B_{ds}$ are plotted on the rgb space. As can be seen from (a) of FIG. 34, the measurement reference RGB values $R_{ds}G_{ds}B_{ds}$ are changed from the initial reference RGB values $R_dG_dB_d$. As illustrated in (b) of FIG. 34, the directions of the change in the rgb space are approximately the same but the directions of deviation are different depending on the hue. A temporal change in the illumination light source 426 or a temporal change in the two-dimensional image sensor 431A may be a cause of the change that occurs in the RGB value even when the same patch of the reference chart 400 is captured.

As described above, when the RGB value obtained by image capturing performed by the color measuring camera 42 has changed, and if the colorimetric value is obtained by using the measurement target RGB value obtained by capturing an image of the patch image 200, an error may occur in the colorimetric value by the amount of the change. Therefore, the inter-reference-RGB linear transformation matrix for converting the measurement reference RGB value $R_{ds}G_{ds}B_{ds}$ into the initial reference RGB value $R_dG_dB_d$ is obtained by using an estimation method such as a least squares method between the initial reference RGB value $R_dG_dB_d$ and the measurement reference RGB value $R_{ds}G_{ds}B_{ds}$, and the measurement target RGB value obtained by capturing an image of the patch image 200 by the color measuring camera 42 is converted into the initialized RGB value of measurement target $R_sG_sB_s$ by using the inter-reference-RGB linear transformation matrix. Thereafter, the basic color measurement process to be described later is performed on the converted initialized RGB value of measurement target $R_sG_sB_s$. Therefore, the colorimetric value of the patch image 200 being a color measurement target can be obtained with high accuracy.

The inter-reference-RGB linear transformation matrix is not necessarily a primary matrix but may be a non-linear high-order matrix. When the non-linearity between the rgb space and the XYZ space is high, it is possible to improve the conversion accuracy by using a high-order matrix.

As described above, the colorimetric value arithmetic unit 53 1 converts the measurement target RGB value obtained by capturing an image of the patch image 200 into the initialized RGB value of measurement target $(R_sG_sB_s)$ by using the inter-reference-RGB linear transformation matrix (Step S10), and performs the basic color measurement process at Step S20 on the initialized RGB value of measurement target $(R_sG_sB_s)$.

Figure 35:
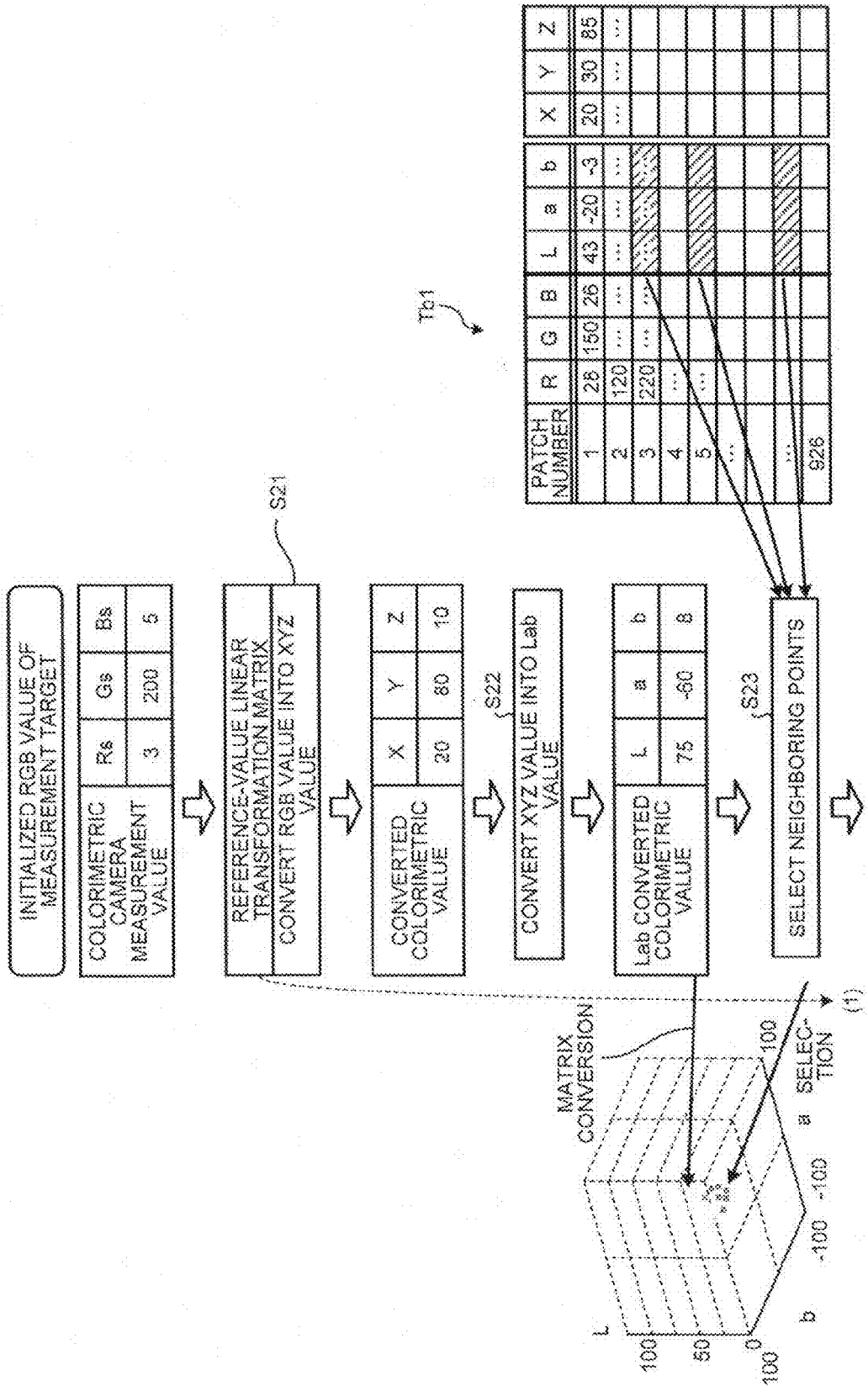
FIG. 35 is a diagram for explaining a basic color measurement process.
Figure 36:
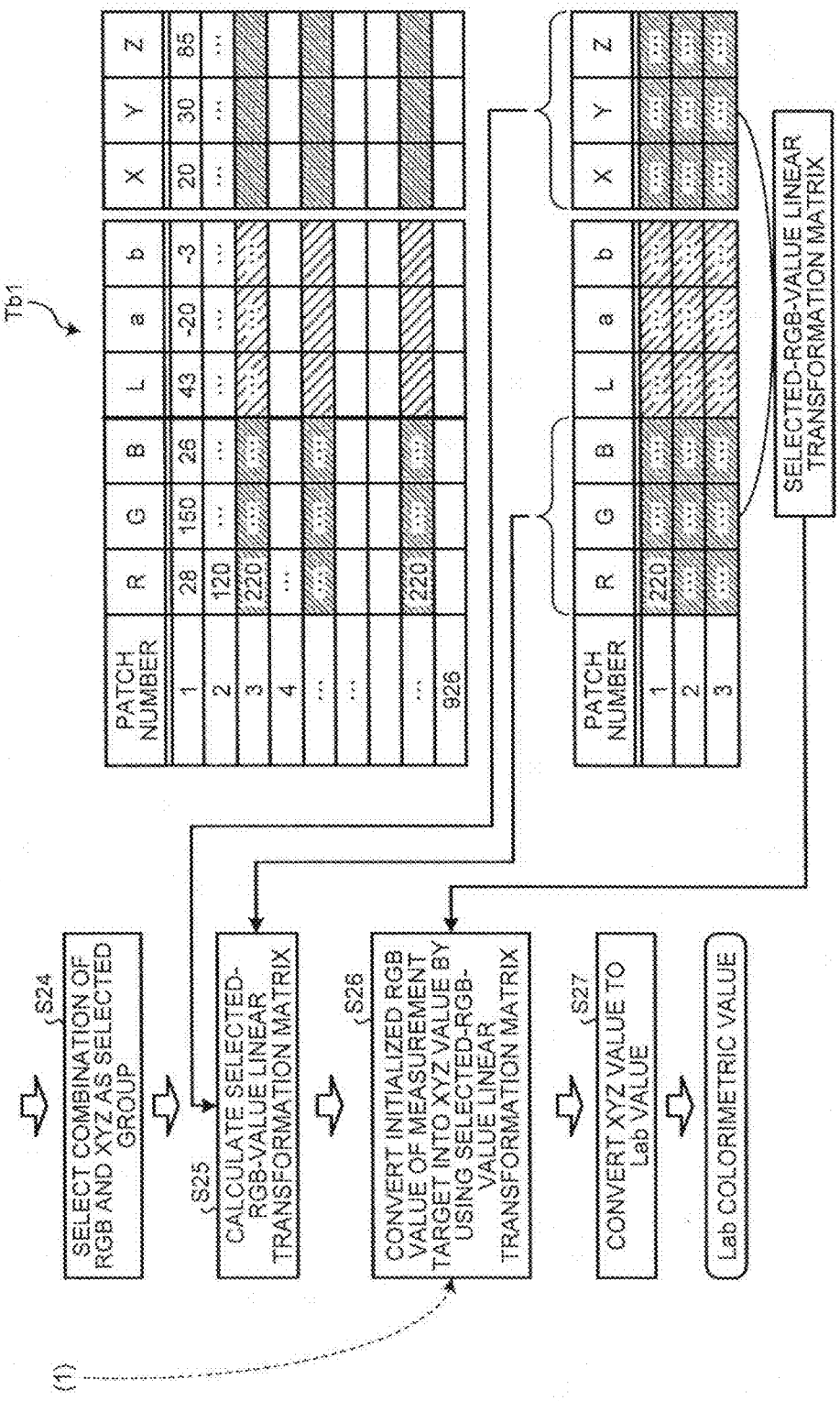
FIG. 36 is a diagram for explaining the basic color measurement process.

FIG. 35 and FIG. 36 are diagrams for explaining the basic color measurement process. The colorimetric value arithmetic unit 53 1 reads the reference-value linear transformation matrix that is generated in the pre-process and stored in the non-volatile memory 60, converts the initialized RGB value of measurement target $(R_sG_sB_s)$ into first XYZ value by using the reference-value linear transformation matrix, and stores the converted value in the non-volatile memory 60 (Step S21). In FIG. 35, an example is illustrated in which the initialized RGB value of measurement target (3, 200, 5) is converted in the first XYZ value (20, 80, 10) by the reference-value linear transformation matrix.

Subsequently, the colorimetric value calculating unit 531 converts the first XYZ value, which is converted from the initialized RGB value of measurement target $(R_sG_sB_s)$ at Step S21, into a first Lab value by using a known conversion equation, and stores the first Lab value in the non-volatile memory 60 (Step S22). In FIG. 35, an example is illustrated in which the first XYZ value (20, 80, 10) is converted into the first Lab value (75, −60, 8) by a known conversion equation.

The colorimetric value calculating unit 531 then searches for a plurality of reference colorimetric values (the Lab values) that are stored in the memory table Tb1 of the non-volatile memory 60 by the pre-process, and selects a plurality of combinations of patches (neighborhood color patches) having reference colorimetric values (Lab values) at close distances from the first Lab value in the Lap space from among the reference colorimetric values (the Lab values) (Step S23). As a method for selecting the patches at close distances, for example, a method may be used in which distances from the first Lab value to all the reference colorimetric values (the Lab value) stored in the memory table Tb1 are calculated and a plurality of patches having the Lab values at close distances from the first Lab (in FIG. 35, the Lab values indicated by hatching) are selected.

As illustrated in FIG. 36, the colorimetric value arithmetic unit 53 1 extracts the RGB value (the reference RGB value) and the XYZ value, each of which forms a pair with the Lab value, for each of the neighborhood color patches selected at Step S23, by referring to the memory table Tb1, and selects a combination of the RGB value and the XYZ value from a plurality of combinations of the RGB values and the XYZ values (Step S24). Then, the colorimetric value arithmetic unit 53 1 obtains a selected-RGB-value linear transformation matrix for converting the RGB value of the selected combination (a selected group) into the XYZ value by using a least squares method, and stores the obtained selected-RGB-value linear transformation matrix in the non-volatile memory 60 (Step S25).

Subsequently, the colorimetric value arithmetic unit 53 1 converts the initialized RGB value of measurement target $(R_sG_sB_s)$ into a second XYZ value by using the selected-RGB-value linear transformation matrix generated at Step S25 (Step S26). Furthermore, the colorimetric value calculating unit 531 converts the second XYZ value obtained at Step S26 into a second Lab value by using a known conversion equation (Step S27), and determines the obtained second Lab value as a final colorimetric value of the patch image 200 being a color measurement target. The image forming apparatus 100 performs color adjustment based on the colorimetric value obtained by the above color measurement process, so that the color reproducibility can be improved.

The embodiments of the present invention are explained in detail above. However, the present invention is not limited to the embodiments. The present invention may be embodied with various modifications or changes within the scope of the claimed invention.

The control functions of the components included in the image forming apparatus 100 or the color measuring device according to the embodiments described above can be realized by using hardware, software, or a combination of hardware and software.

For example, the functions of the correction data generating unit 52 of the color measuring device can be realized by causing a processor included in the color measurement control unit 50 to execute a program containing a process sequence. The program executed by the processor is provided by being installed in, for example, a ROM inside the color measurement control unit 50. The program executed by the processor may be provided by being recorded in a computer-readable recording medium, such as a CD-ROM, a flexible disk (FD), a CD-R, or a digital versatile disc (DVD).

The program executed by the processor may be stored in a computer connected to a network, such as the Internet, and provided by being downloaded via the network. The program executed by the processor may be provided or distributed via a network, such as the Internet.

The program for implementing the functions of the correction data generating unit 52 has a module structure including the components of the correction data generating unit 52 (the extracting unit 521, the interpolating unit 522, and the storage control unit 523). The processor reads and executes the program from a memory, such as a ROM, so that the above units are loaded on a main storage device and the extracting unit 521, the interpolating unit 522, and the storage control unit 523 are generated on the main storage device.

According to the embodiments, it is possible to appropriately correct an error in image data and perform color measurement with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing device comprising:
a reference chart including a plurality of patches;
an image capturing unit configured to capture an image of an image-capturing range containing the reference chart and an object outside of the image capturing device, and to output two-dimensional image data of the image;
an illuminating unit configured to illuminate the image-capturing range of the image capturing unit;
an extracting unit configured to extract a background region of the patches of the reference chart from the two-dimensional image data output by the image capturing unit, the background region being in a predetermined color;
an interpolating unit configured to interpolate image data regions of the patches in the two-dimensional image data output by the image capturing unit by assuming that the regions of the patches are in the predetermined color;

a storage unit configured to store therein, as correction data, interpolating data that is interpolated by the interpolating unit;

a correcting unit configured to correct the image data output by the image capturing unit by using the correction data; and a calculating unit configured to calculate a colorimetric value of the object based on the image data of the regions of the patches and image data of a region of the object contained in the image data corrected by the correcting unit.

2. The image capturing device according to claim 1, wherein an approximate equation is obtained from two-dimensional image data of the extracted background region of the predetermined color and the image data of the regions of the patches is interpolated by using the approximate equation.

3. An image forming apparatus comprising:

the image capturing device according to claim 1; and an image output unit configured to output an image to a recording medium, wherein the object is the image formed on the recording medium.

4. An image capturing device comprising:

a reference chart including a plurality of patches;

an image capturing unit configured to capture an image of an image-capturing range containing the reference chart and an object outside of the image capturing device, and to output two-dimensional image data of the image;

an illuminating unit configured to illuminate the image-capturing range of the image capturing unit;

an extracting unit configured to extract either a background region of the patches of the reference chart or a surrounding region of an object image capturing region of the image capturing unit, from the two-dimensional image data output by the image capturing unit, the background region and the surrounding region being in a predetermined color;

an interpolating unit configured to interpolate image data of regions of the patches in the two-dimensional image data output by the image capturing unit by assuming that a region other than in the predetermined color is in the predetermined color;

a storage unit configured to store therein, as correction data, interpolating data that is interpolated by the interpolating unit;

a correcting unit configured to correct the image data output by the image capturing unit by using the correction data; and a calculating unit configured to calculate a colorimetric value of the object based on the image data of the regions of the patches and image data of a region of the object contained in the image data corrected by the correcting unit.

5. The image capturing device according to claim 4, wherein an approximate equation is obtained from two-dimensional image data of the extracted background region of the predetermined color, and the image data of the regions of the patches is interpolated by using the approximate equation.

6. An image forming apparatus comprising:

the image capturing device according to claim 4; and an image output unit configured to output an image to a recording medium, wherein the object is the image formed on the recording medium.

* * * * *